United States Patent [19]
Huang et al.

[11] Patent Number: 5,962,992
[45] Date of Patent: Oct. 5, 1999

[54] LIGHTING CONTROL SYSTEM

[75] Inventors: Shih-Wei Huang; Irene H. Lin, both of Taipei, Taiwan

[73] Assignee: Chaw Khong Co., Ltd., Taipei, Taiwan

[21] Appl. No.: 08/950,378

[22] Filed: Oct. 14, 1997

[51] Int. Cl.$^6$ ..................................................... H05B 37/00
[52] U.S. Cl. .......................... 315/312; 315/318; 315/361; 315/294; 315/DIG. 4
[58] Field of Search ..................................... 315/294, 295, 315/297, 308, 307, 312, 314, 318, 361, 362, 158, 149, DIG. 4

[56] References Cited

U.S. PATENT DOCUMENTS

| | | | |
|---|---|---|---|
| 4,508,997 | 4/1985 | Woodnutt | 315/360 |
| 4,733,138 | 3/1988 | Pearlman et al. | 315/307 |
| 5,327,048 | 7/1994 | Troy | 315/240 |
| 5,463,286 | 10/1995 | D'Aleo et al. | 315/295 |
| 5,637,964 | 6/1997 | Hakkarainen et al. | 315/295 |

*Primary Examiner*—Don Wong
*Assistant Examiner*—Haissa Philogene
*Attorney, Agent, or Firm*—Christensen O'Connor Johnson & Kindness PLLC

[57] ABSTRACT

A lighting control system (LCS) (50) is provided to remotely and centrally control the operation of lamps and other electrical appliances. The LCS (50) includes a master controller (100), zone controllers (110), slave units (120), an IR controller (160). The master controller (100), zone controllers (110), and slave units (120) are electrically linked together over a common powerline through a process of installation. A process of verification is provided to confirm that the master controller (100), zone controllers (110), and slave units (120) are installed properly. The slave units (120) are further linked with a corresponding electrical appliance. Appropriate commands applied by a user of the LCS (50) to the master controller (100), the zone controllers (110), the slave units (120), and the IR controller (160) control the operation of electrical appliances individually or collectively. The LCS (50) allows the program and recall of configurations of operating levels of the electrical appliances. The master controller (100) includes optical wave guides (406) to illuminate a front panel (300) of the master controller (100) to the user. The zone controller (110) includes a PIR detector (930) and a dawn and dusk sensor (932). The IR controller (160) allows the user to remotely control the operation of the zone controller (110) and the slave units (120). In alternative embodiments of the present invention, the master controller (100) and the zone controllers (110) have direct link interfaces (224, 926) to communicate with the slave units (120) over a direct link rather than the powerline during the installation process.

50 Claims, 46 Drawing Sheets

| | | 01 | 02 | i1 | i2 |
|---|---|---|---|---|---|
| Z1 | $t_1$ | 0 | 1 | 0 | 0 |
| Z1 | $t_2$ | 1 | 0 | 1 | 0 |
| Z2 | $t_1$ | 0 | 1 | 0 | 0 |
| Z2 | $t_2$ | 1 | 0 | 0 | 0 |
| Z3 | $t_1$ | 0 | 1 | 0 | 1 |
| Z3 | $t_2$ | 1 | 0 | 0 | 0 |

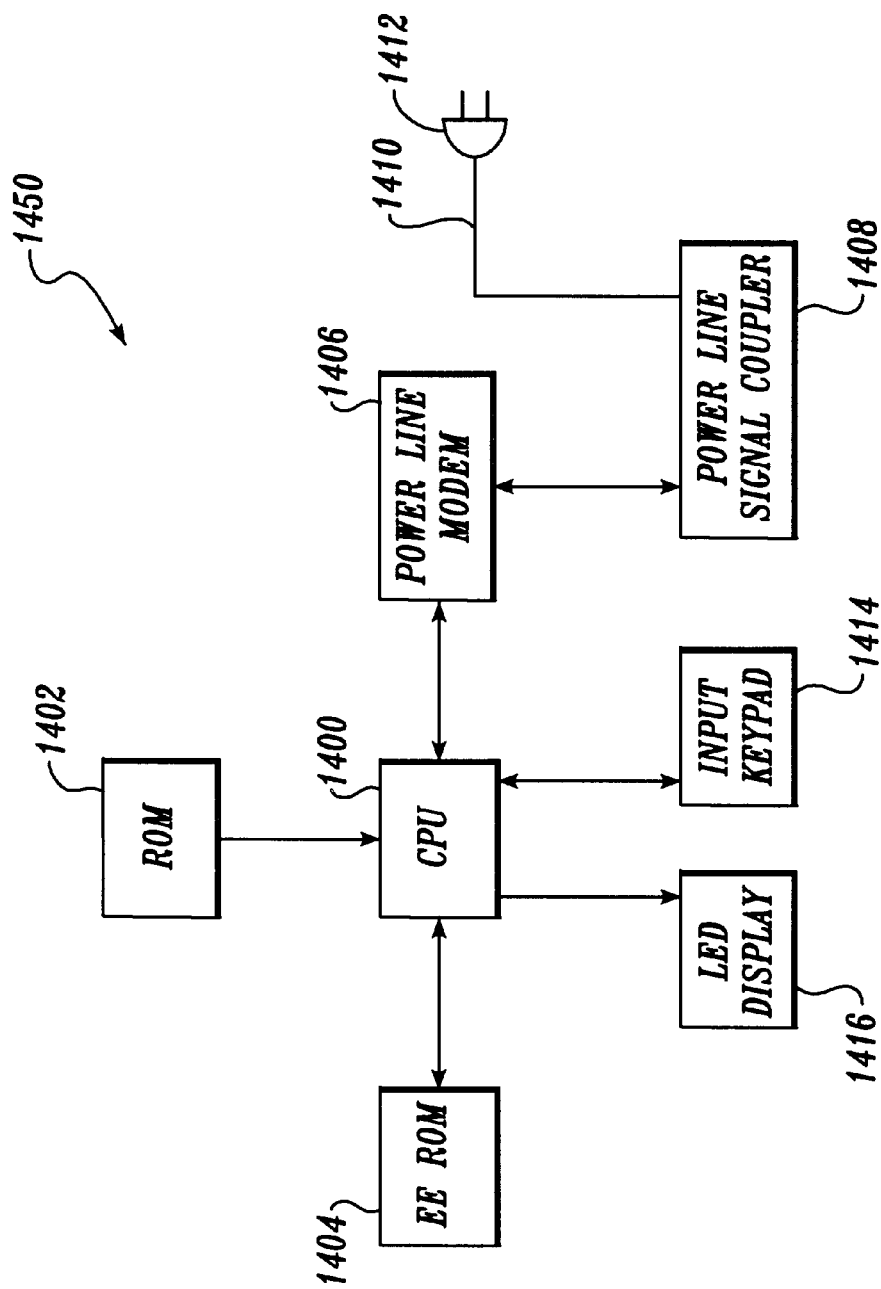

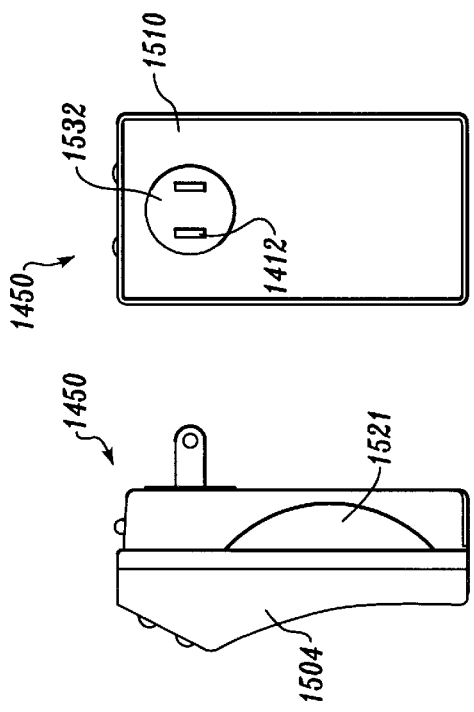
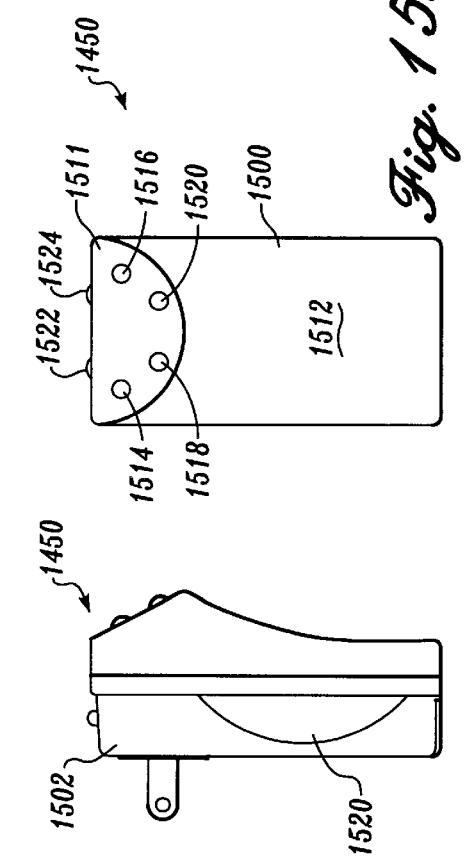
Fig. 15F
Fig. 15C
Fig. 15D
Fig. 15A
Fig. 15E
Fig. 15B

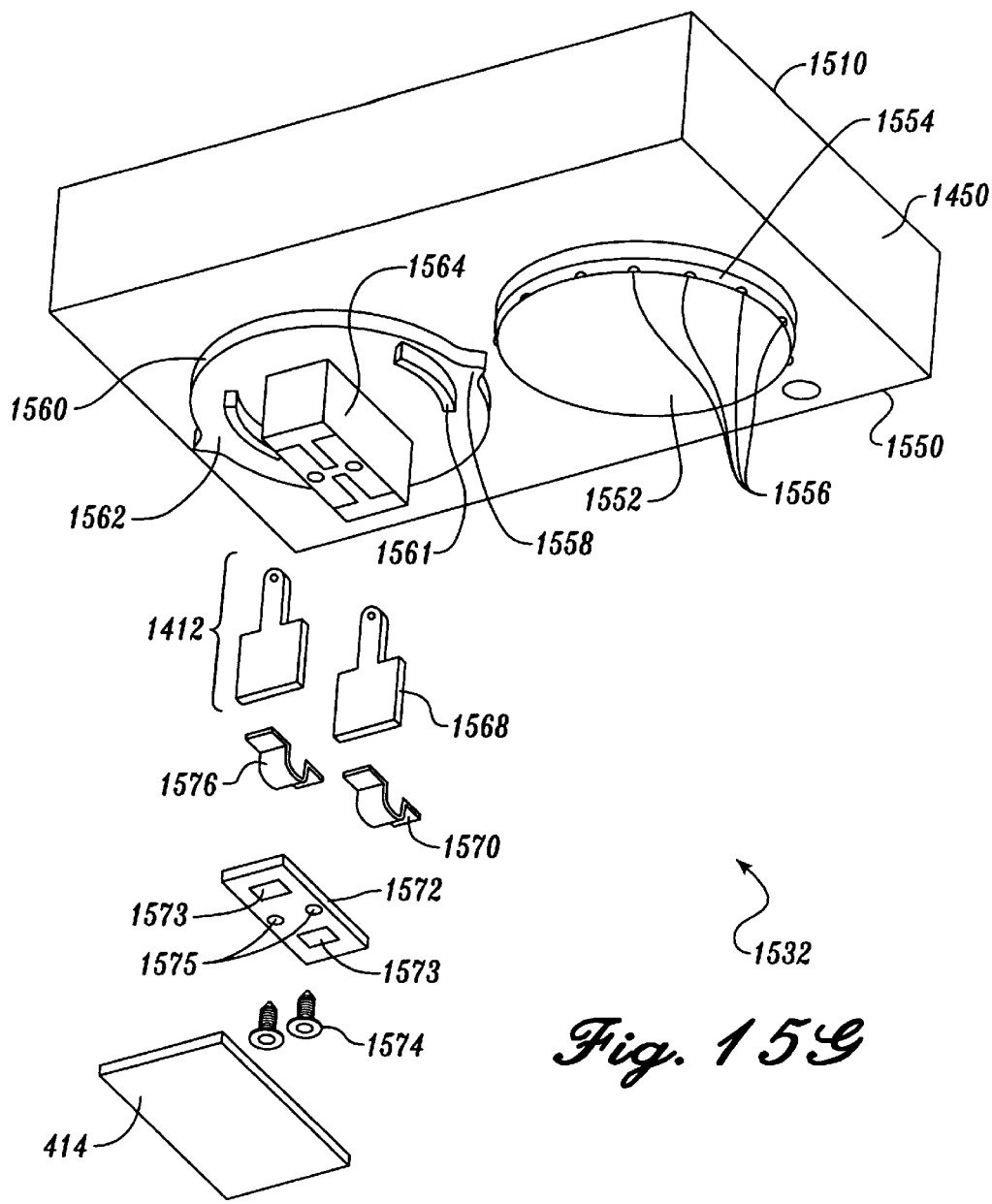
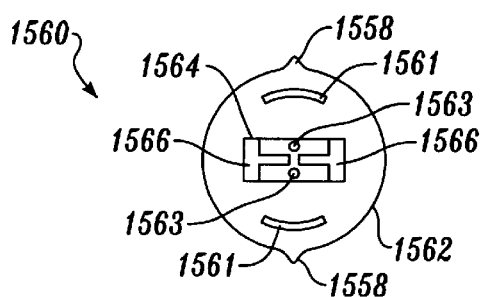
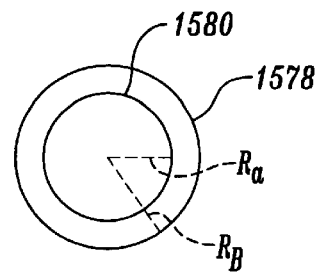

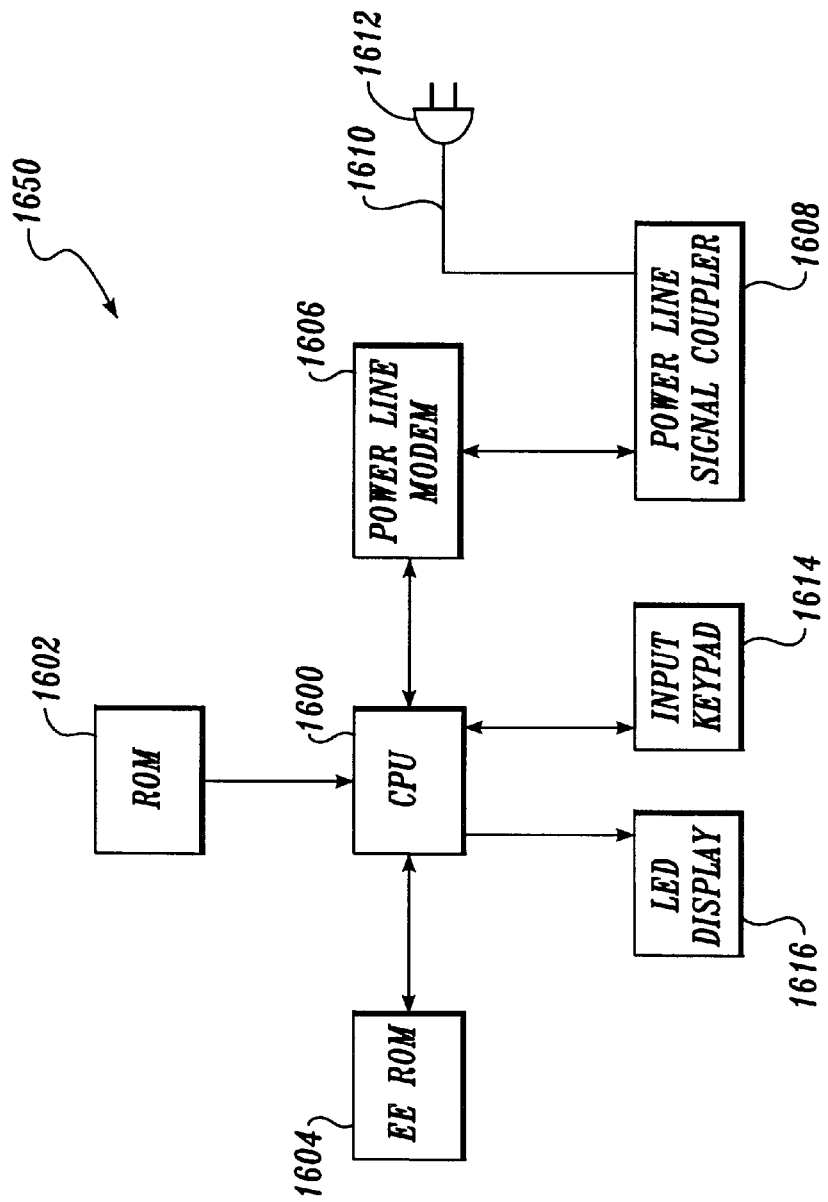

A → ACK

LIGHTING CONTROL SYSTEM

FIELD OF THE INVENTION

The present invention relates to a control system and, more particularly, to a control system for selectively controlling the operation of electrical appliances.

BACKGROUND OF THE INVENTION

In recent years, lighting control systems (LCSs) have become increasingly popular, despite their prohibitive cost. A conventional LCS, or similar system for controlling electrical appliances, is used in a local environment, such as a home. The utility of the conventional LCS is to allow a user to control a distributed network of lights or other electrical appliances from a central location within the local environment. The ability to control electrical appliances from a central location, remote from the actual site of many of the electrical appliances, is convenient and otherwise advantageous.

Prior to use, the conventional LCS must be installed. Installation involves the initial configuration of a central control module and numerous appliance modules. Each of the various electrical appliances in the local environment is connected to a dedicated appliance module. Typically, the appliance module is located in close proximity to the associated electrical appliance. The various appliance modules are coupled to a common communications network that is linked to the central control module. The central control module and the appliance modules can communicate over various transmission media, including a common powerline for delivering power over the communications network. Through appropriate setting of rotary switches provided as the central control module and the appliance modules, the central control module identifies the appliance modules by assigning each appliance module with a code. The provision of appropriate commands to the central control module allows the user to control the operation of the electrical appliances from the central control module. In this way, the conventional LCS obviates the need for the user to visit the location of each individual electrical appliance to control its operation.

Although it offers some advantages, the conventional LCS poses many significant drawbacks. In particular, the design of conventional LCSs results in undue inconvenience and inefficiency during use. For example, the appliance modules allow the user to control the electrical appliances from a central location. However, the appliance modules are designed so that the electrical appliances cannot be controlled locally by providing direct commands to the appliance modules. If the user is in the vicinity of a particular electrical appliance and its associated appliance module, the user would be required to relocate to the central control module to control and operate the electrical appliance. Quite apparently, the design of the conventional LCS, in many instances, sacrifices the very convenience it is designed to provide.

Many other features of the conventional LCS render its use inconvenient. For example, the conventional LCS has a variety of appliance modules under the control of a single central control module, as stated above. The provision of the single central control module only, and no other means for controlling the various appliance modules, is burdensome, especially when the conventional LCS is implemented in a physically large environment. In this regard, assume that the user is situated near a particular electrical appliance, which is remote from the central control module. To control the electrical appliance, the user would have to travel the entire distance from the electrical appliance to the central control module. In a physically large environment, the time and effort to travel that distance could be unduly burdensome. Thus, the failure to implement more than one central control module is problematic.

As a related disadvantage, the central control module of the conventional LCS fails to give an adequate indication of the operating status of the electrical appliances. To obtain such an indication, the user must travel to each electrical appliance for direct observation. Moreover, if modification of the operating status of a particular electrical appliance is desired after such observation, the user must travel from the electrical appliance to the central control module. Each time the operating status of an electrical appliance is first observed and then altered necessitates attendant travel by the user. The inefficiency associated with repeated travel between the electrical appliances and the central control module is especially grave in physically large environments.

Efficient control of the electrical appliances and associated appliance modules is also precluded by the labor-intensive design of the conventional LCS. In certain circumstances, the user will desire to set the operating levels of a variety of electrical appliances so that they will cooperate to achieve a desired configuration. For example, the user of a conventional LCS in a home environment might want to turn on all lamps in the home every evening. As stated above, the operation of each electrical appliance is controlled by the central control module. Accordingly, to set a variety of electrical appliances to a particular configuration, the user must individually and successively control each electrical appliance. The operating status of each electrical appliance must be appropriately adjusted until all of the electrical appliances are satisfactorily programmed to attain the desired configuration. However, once the electrical appliances have attained the desired configuration, the configuration cannot be saved and easily retrieved at a later time. Rather, if the desired configuration is lost, the user must reset all of the electrical appliances individually, as when first programmed, until the configuration is reproduced. Therefore, the user in the example above would have to turn on all of the lamps individually to obtain the desired configuration every evening. Accordingly, the conventional LCS fails to provide a simple, efficient way to recall configurations.

Apart from its inconvenient and inefficient design, the conventional LCS is also unreliable. During installation, the user assigns the central control module one of 16 possible central control module codes to distinguish the central control module from a central control module of another possible LCS nearby. The central control module installs the various appliance modules under its control by assigning each of them one of 16 possible appliance module codes. The central control module code is used to identify the central control module to the appliance modules, while the appliance module codes are used to identify a particular electrical appliance to the central control module.

This method of installing the appliance module with the central control module is unreliable. First, the installation of the appliance modules is "one-way", i.e., the central control module transmits the central control module code and the appliance module code to the appliance module. However, the appliance module does not acknowledge its receipt of the code. As a result, if the codes are not successfully received by the appliance module, the user of the conventional LCS is given no indication of the installation failure. In that event, the user is left with the uncertain presumption that the appliance module has been correctly installed, as well as the negative consequences of such a presumption.

The relatively small number of available installation codes also negatively impacts the operational reliability of the conventional LCS. In some instances, the identities of the central control module and the appliance modules will be confused, complicating proper operation and control of the appliance modules. It will be appreciated that, in certain undesirable circumstances, a conventional LCS may sometimes be communicatively linked to another LCS. Typically, this occurs when the LCSs are situated adjacent one another while sharing a communication medium. Because only 16 codes are possible to identify a particular central control module, it is quite possible that two neighboring central control modules, associated with the two neighboring LCSs, may share a common central control module code. In that case, the appliance modules of both LCSs would have no ability to distinguish the commands originating from one central control module from the other. The electrical appliances of one LCS would then be susceptible to the control of the other LCS, and vice versa. Consequently, the reliability in the control of the electrical appliances would be significantly compromised.

The provision of only 16 appliance module codes results in analogous disadvantages. If the number of electrical appliances in the particular region served by the conventional LCS exceeds 16, as is often the case, some of the appliance modules would have to share a common code. Accordingly, because an appliance module could not be definitively identified by a unique corresponding code, the ability to reliably control such an appliance module, and only that module, would attendantly suffer. Commands from the central control module that are intended to control one appliance module could instead be misdirected to control another appliance module.

In light of the foregoing disadvantages of the prior art, a new and improved LCS is needed. The present invention is directed to meeting this need by providing an inexpensive LCS that is both reliable and convenient to use.

SUMMARY OF THE INVENTION

In accordance with the present invention, a lighting control system (LCS) is provided to remotely and centrally control the operation of lamps and other electrical appliances. The LCS includes a master controller, zone controllers, slave units, an IR controller. The master controller, zone controllers, and slave units are electrically linked together over a common powerline through a process of installation. A process of verification is provided to confirm that the master controller, zone controllers, and slave units are installed properly. The slave units are further linked with a corresponding electrical appliance. Appropriate commands applied by a user of the LCS to the master controller, the zone controllers, the slave units, and the IR controller control the operation of electrical appliances individually or collectively. The LCS allows the program and recall of configurations of operating levels of the electrical appliances. The master controller includes optical wave guides to illuminate a front panel of the master controller to the user. The zone controller includes a PIR detector and a dawn and dusk sensor. The IR controller allows the user to remotely control the operation of the zone controller and the slave units. In alternative embodiments of the present invention, the master controller and the zone controllers have direct link interfaces to communicate with the slave units over a direct link rather than the powerline during the installation process. Many other innovative features of the present invention are described below.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 14 is block diagram of the architecture of a powerline slave unit for an electrical appliance having multiple operating levels;

FIGS. 15A–F are views of the slave unit illustrated in FIG. 14;

FIG. 15G is an exploded view of a rotatable housing of the slave unit illustrated in FIGS. 15A–F;

FIG. 15H is a simplified diagram of circular contacts of a printed circuit board of the slave unit illustrated in FIGS. 15A–F;

FIG. 15I is a bottom view of the rotatable housing;

FIG. 16 is a block diagram of the architecture of a powerline slave unit for an electrical appliance having a single operating level;

FIGS. 31A–F are block diagrams illustrating the operation of the LCS upon detection of a collision during installation;

DETAILED DESCRIPTION OF THE PREFERRED EMBODIMENT

Figure 1:
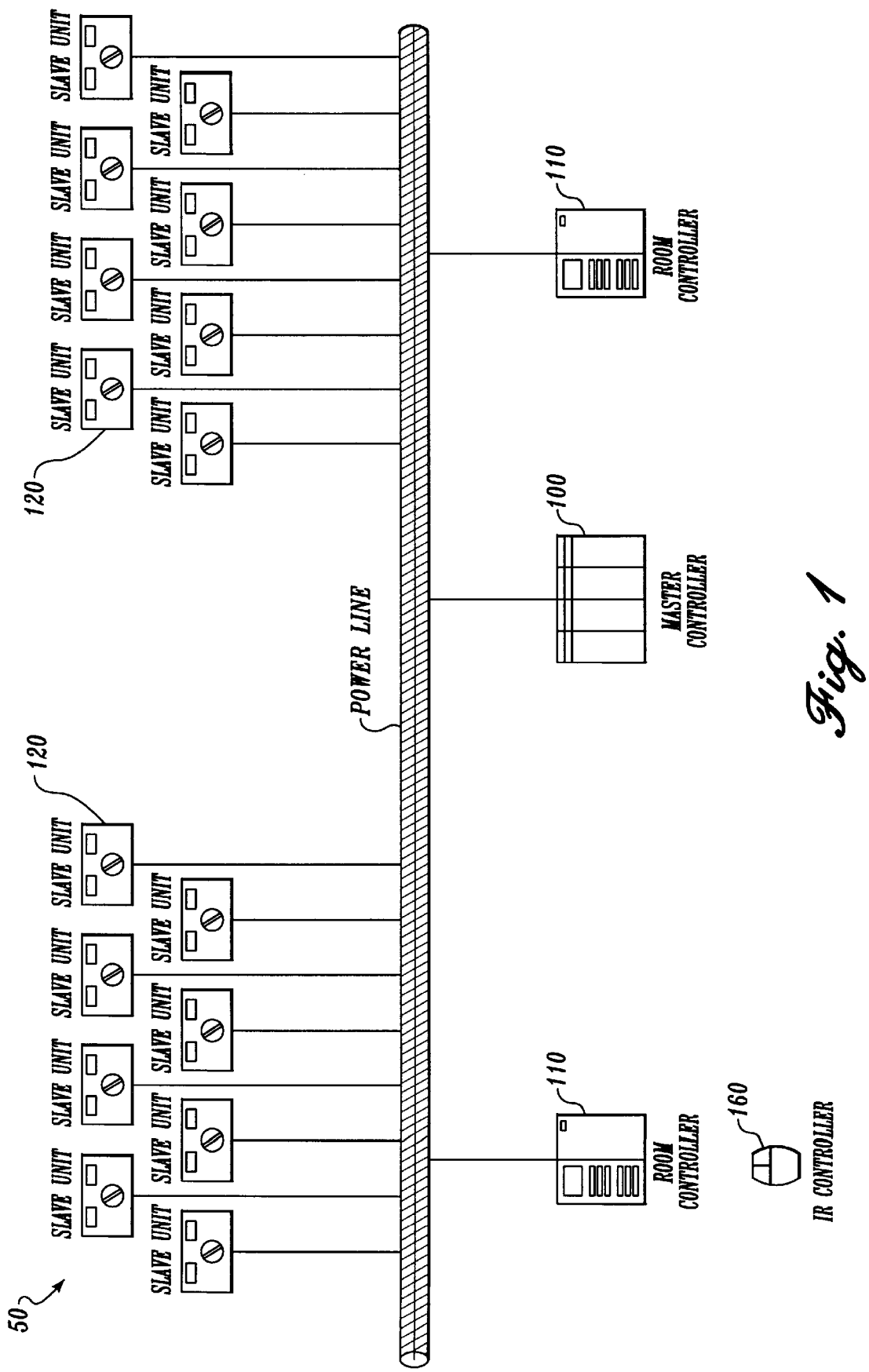
FIG. 1 is a diagram of a lighting control system (LCS) in accordance with the present invention.

A lighting control system (LCS) 50 in accordance with the present invention is illustrated in FIG. 1. The LCS 50 is used to control various electrical appliances including, for example, lamps and other lighting equipment, air conditioning units, heating units, and other devices that may be commonly found in household or other interior environments. The LCS 50 includes a master controller 100, three zone controllers 110, eight slave units 120, and an infrared (IR) controller 160. The master controller, zone controllers, slave units (herein collectively referred to as "modules"), and IR controller are communicatively linked over transmission media 150 to allow a user of the LCS 50 to selectively control the modules, and the electrical appliances ultimately. The transmission media 150 is a powerline, a dedicated wire link, and the air. The depicted master controller 100, zone controllers 110, IR controllers 160, and slave units 120 are illustrative only. The present invention can be implemented with any other suitable number of master controllers, zone controllers, and slave units. A particular master controller controls an associated group of slave units grouped into different zones. A particular zone controller controls an associated group of slave units in a zone associated with that particular zone controller. Each slave unit is a module controlling the operation of an associated electrical appliance. The IR controller transmits commands to the zone controllers to remotely control the slave units. The master controller, the zone controllers, and the slave units are communicatively coupled by installation processes described below.

Figure 2A:
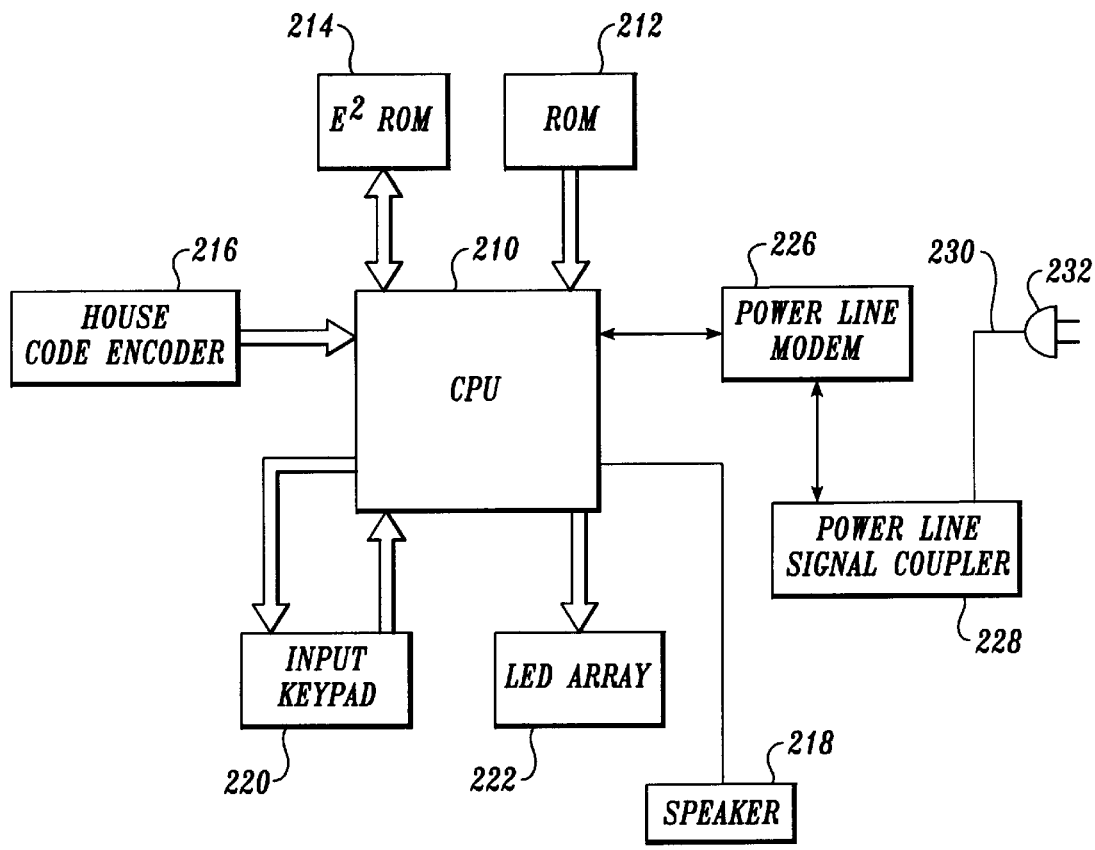
FIG. 2A is a block diagram of the architecture of a master controller of the LCS in accordance with one embodiment of the present invention.

FIG. 2A illustrates the architecture of the master controller 100. The master controller 100 includes a central processing unit (CPU) 210, a read only memory (ROM) 212, an electrically erasable read only memory (EEROM) 214, a house code encoder 216, a speaker 218, an input pad 220, an LED array 222, a powerline modem 226, a powerline signal coupler 228, an electrical cable 230, and an electrical plug 232. The CPU 210 controls the operation of the master controller 100. In the preferred embodiment, the CPU 210 includes two CPUs, the Intel 8051 and NEC UPD17149. While two CPUs are implemented in the preferred embodiment, the CPU 210 can be alternatively designed. For example, the CPU 210 could include one CPU only, for example, the Intel 80186. The CPU 210 could also constitute more than two CPUs. The EEROM 214 stores password information, configuration information, and installation information as described in more detail below. The ROM 212 stores program information directing the operation of the CPU 210. For example, the ROM 212 stores the installation procedures, as well as audio and visual guidance information that facilitates the use of the LCS 50.

The powerline modem 226, the powerline signal coupler 228, the electrical cable 230, and the electrical plug 232 are serially connected. The powerline modem 226 is preferably a consumer electronic (CE) bus powerline modem, which is now an EIA 600 standard, or other suitable powerline modem. In the preferred embodiment, the powerline signal coupler 228 is available from Echelon Corporation, Palo Alto, Calif. In accordance with the present invention, a signal communications path is defined over the CPU 210, the powerline modem 226, the powerline signal coupler 228, the electrical cable 230, the electrical plug 232, and a common powerline supplying electrical energy to the master controller, the zone controllers, and the slave units. Communications over the powerline are implemented by a technique disclosed in copending and commonly assigned U.S. patent applications Ser. No. 08/511,210, entitled Data Receiving Method For Receiving Data Through Predetermined Clear Zone Of A Powerline, and Ser. No. 08/505,834, entitled Error Sensing Method For Improving Error Control Capability In Data Communications, both herein incorporated by reference in their entireties. The techniques disclosed in the above-mentioned U.S. patent applications are employed to achieve communications over the powerline between and among any combination of master controllers, zone controllers, and slave units.

Figure 2B:
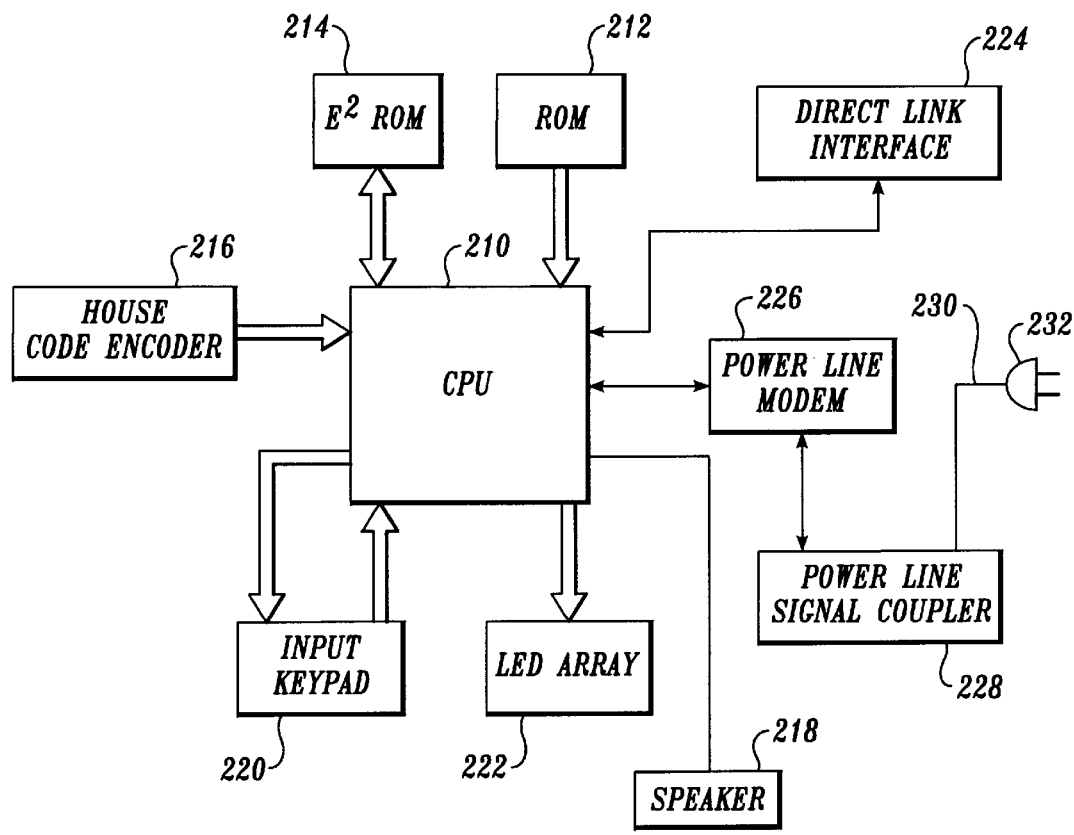
FIG. 2B is a block diagram of the architecture of a master controller of the LCS in accordance with an alternative embodiment of the present invention.

The speaker 218 provides audio information to the user. The input pad 220 includes a plurality of input devices of the master controller 100, which are discussed below, to allow the user of the master controller 100 to operate the LCS 50. In particular, the input pad 220 includes all of the buttons of the master controller 100. The LED array 222 includes all LEDs of the master controller 100. The LEDs provide visual indications to the user regarding the operating status of the electrical appliances associated with the slave units 120. Each LED of the LED array 222 is described below. The house code encoder 216 allows the user to designate a code for the master controller 100. In an alternative embodiment of the present invention illustrated in FIG. 2B, the master controller 100 further includes a direct link interface 224, which provides for direct communications between the master controller 100 and the other modules for installation purposes only. The house code encoder 216 is discussed in more detail below in connection with FIGS. 6 and 7. The direct link interface 224 is discussed below in connection with FIG. 18.

Figure 3:
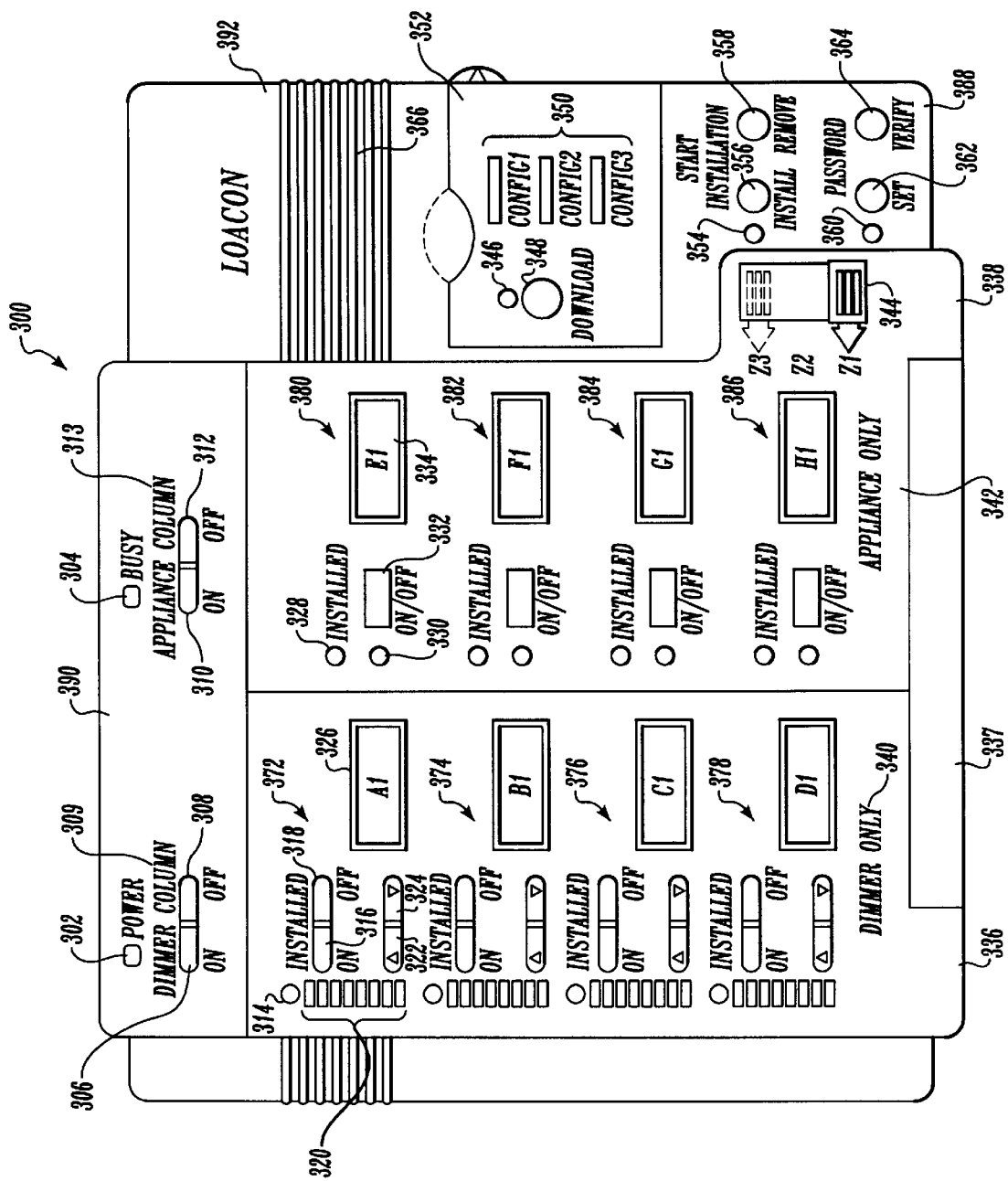
FIG. 3 is a diagram of a front panel of the master controller.
Figures 5A, 5B:
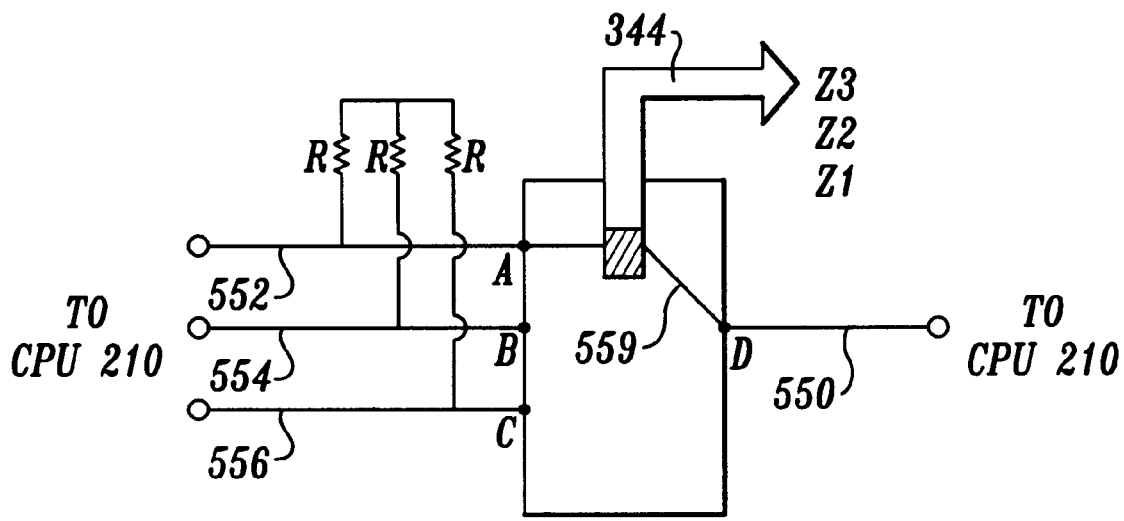
FIG. 5A is a schematic diagram of a sliding switch of the master controller in accordance with one embodiment of the present invention.
FIG. 5B is a table of input and output values used with the sliding switch illustrated in FIG. 5A.
Figure 6:
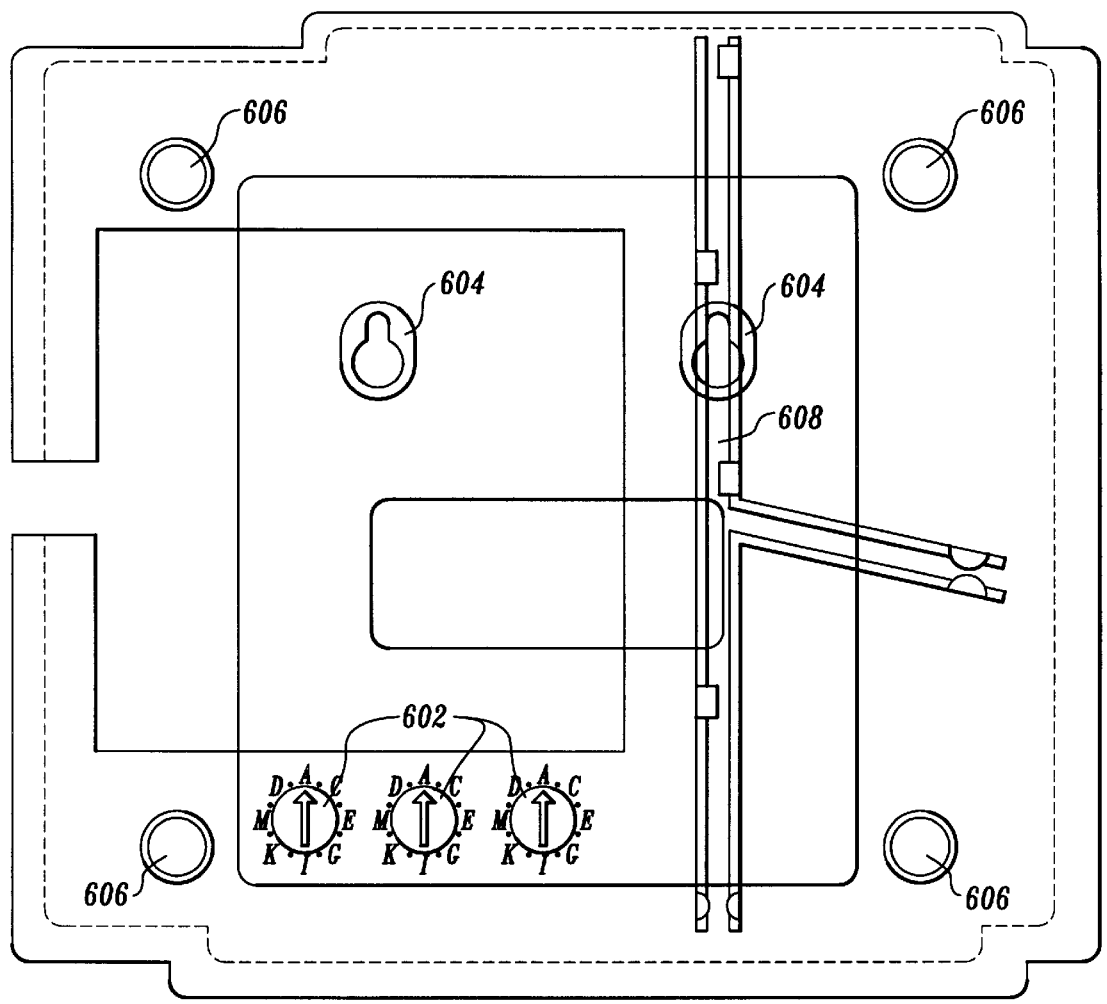
FIG. 6 is a diagram of a back panel of the master controller.

FIGS. 3 and 6 illustrate a front panel 300 and a back panel 600, respectively, of a user interface of the master controller 100. As shown in FIG. 3, the front panel 300 includes a power region 390, a dimmer region 336, a zone selector region 338, an appliance region 342, a speaker region 392, a configure region 352, a bottom region 377, and an install/password region 388. The zone selector region 338 contains a sliding switch 344. The sliding switch 344 is adjustable to one of three positions. Each position corresponds to the selection of one of three zones, zone one Z1, zone two Z2, or zone three Z3, as discussed below in connection with FIG. 5A.

The power region 390 includes a power LED 302, a busy LED 304, an on button 306 and an off button 308 associated with the dimmer region 336, and an on button 310 and an off button 312 associated with the appliance region 342. The power LED 302 is turned on when power is provided to the master controller 100. The busy LED 304 is turned on when the master controller 100 is transmitting or receiving commands over the transmission medium 150, e.g., the powerline. When it is turned on, the busy LED 304 indicates to the user that the master controller 100 is not able to respond to any user inputs to the input keypad 220. A label DIMMER COLUMN 309 is associated with the on button 306 and the off button 308. The label DIMMER COLUMN 309 refers to all of the electrical appliances associated with slave units, which are under the control of the master controller 100, having multiple operating levels in a selected zone. One example of such an electrical appliance is a dimmable lamp having a plurality of illumination settings, as discussed below. When depressed, the on button 306 turns on all of the associated slave units. The depression of the off button 308 turns off all of the associated slave units.

The slave units collectively controlled by the on button 306 and the off button 308 can be individually controlled at the dimmer region 336. The dimmer region 336 includes four panel areas 372, 374, 376, 378. Each panel area indicates the status of a corresponding slave unit in the zone selected at the zone selector region 338, and allows the user to control the operation of that slave unit. Because the operation of each of the four panel areas 372, 374, 376, 378 is identical, only the panel area 372 need be described. The panel area 372 includes an installed LED 314, an on button 316, an off button 318, a brightness indicator 320, a bright button 322, a dim button 324, and a label window 326. The installed LED 314 and the brightness indicator 320 are part of the LED array 222 (FIG. 2A). The on button 316, the off button 318, the bright button 322, and the dim button 324 are part of the input keypad 220 (FIG. 2A).

The installed LED 314 is turned on when the slave unit has been properly installed. The installed LED 314 is turned off when the slave unit has been removed or has not been installed and registered. The installed LED 314 flashes when the master controller 100 performs an update on the operating status of the corresponding slave unit and does not receive the appropriate response therefrom. When the installed LED 314 flashes, the installed LED 314 serves as an alarm to the user, indicating that the slave unit is not operating properly. When depressed, the on button 316 turns on the slave unit. Similarly, when depressed, the off button 318 turns off the slave unit.

The brightness indicator 320 includes a series of eight LEDs that indicate the current operating level of the corresponding slave unit. The number of turned-on LEDs is proportional to the operating level of the slave unit. For example, if the slave unit is a dimmable lamp, and the lamp's illumination is at a maximum level, all of the LEDs in the brightness indicator 320 will be turned on. The bright button 322 increases the operating level of the slave unit when depressed. The dim button 324 decreases the operating level of the slave unit when depressed. By selective, repeated depression of the bright button 322 and the dim button 324, the user can incrementally adjust the operating level of the slave unit. The label window 326 cooperates with the zone selector region 338 to identify the particular slave unit corresponding to the panel area 372, as discussed below in more detail in connection with FIG. 3. As shown in FIG. 3, the label window 326 displays the identification of the slave unit of zone 1 as "A1".

The power region 390 includes a label APPLIANCE COLUMN 313. The APPLIANCE COLUMN 313 is associated with the on button 310 and the off button 312. The on button 310 and the off button 312 control the operation of all of the slave units corresponding to the zone selected in the zone selector region 338. The slave units of the label APPLIANCE COLUMN 313 are associated with electrical appliances that have a single operating level. The on button 310 turns on all of the slave units within the selected zone. The off button 312 turns off all of the slave units.

The slave units collectively controlled by the on button 310 and the off button 312 can be individually controlled in the appliance region 342. The appliance region 342 includes panel areas 380, 382, 384, 386. Each panel area indicates the status of a corresponding slave unit in the selected zone, and allows the user to control the operation of the slave unit. Because each panel area operates identically, only a description of one panel need be provided.

The panel area 380 includes an installed LED 328, an on/off LED 330, an on/off button 332, and a label window 334. The installed LED button 328 operates like the installed LED button 314, as described above. The on/off button 332, when repeatedly depressed, toggles between on and off positions. When the on position is selected, the slave unit is in operation. When the off position is selected, the slave unit is disabled. The on/off LED 330 is turned on when the slave unit is in operation. The on/off LED 330 is turned off when the slave unit is disabled. The label window 334 cooperates with the zone selector region 338, identifying the slave unit corresponding to the panel area 380.

The configure region 352 includes a download LED 346, a download button 348, and a series of configuration buttons 350 labeled CONFIG.1, CONFIG.2, and CONFIG.3. The buttons of the configure region 352 allow the user of the master controller 100 to program and save the operating levels of slave units at predetermined configurations. Because the configuration buttons 350 operate identically, only the operation of the CONFIG.1 button is described. After all of the desired slave units in all zones are appropriately programmed at a particular configuration, the user can press the CONFIG.1 button for more than two seconds to save the configuration. To restore the configuration associated with the CONFIG.1 button, the user presses the CONFIG.1 button for less than two seconds.

The following example describes how the user of the master controller 100 can program, save, and restore a particular configuration associated with the CONFIG.1 button. Assume that the slave units include electrical appliances having multiple operating levels as well as appliances having a single operating level. To initiate the desired configuration, the user first sets all of the slave units under the control of the master controller 100 to the desired operating level. In the case of dimmable lamps, for example, the user sets the dimmable lamps to the desired illumination levels. The user also sets the appliances having a single operating level to either an on or off position. After the slave units are appropriately set, the CONFIG.1 button is then depressed by the user for more than two seconds to save the current configuration of slave units.

The user could, for example, define the configuration associated with the CONFIG.1 push button to be a "wake up configuration" where selected lights and other appliances are appropriately set to operating levels that are optimal for the user's morning routine. As another example, a "tea time configuration" could be associated with the CONFIG.1 button to set the lights and appliances at operating levels appropriate for taking tea. Although three configurations are possible with the three configuration buttons 350 shown, the present invention anticipates any number of such configurations. To recall a particular configuration, the user depresses the corresponding one of the configuration buttons 350 for less than two seconds. The ability to program and recall certain configurations in accordance with the present invention saves the user the burdensome time and effort required for individually programming each slave unit to a desired setting.

Figure 33:
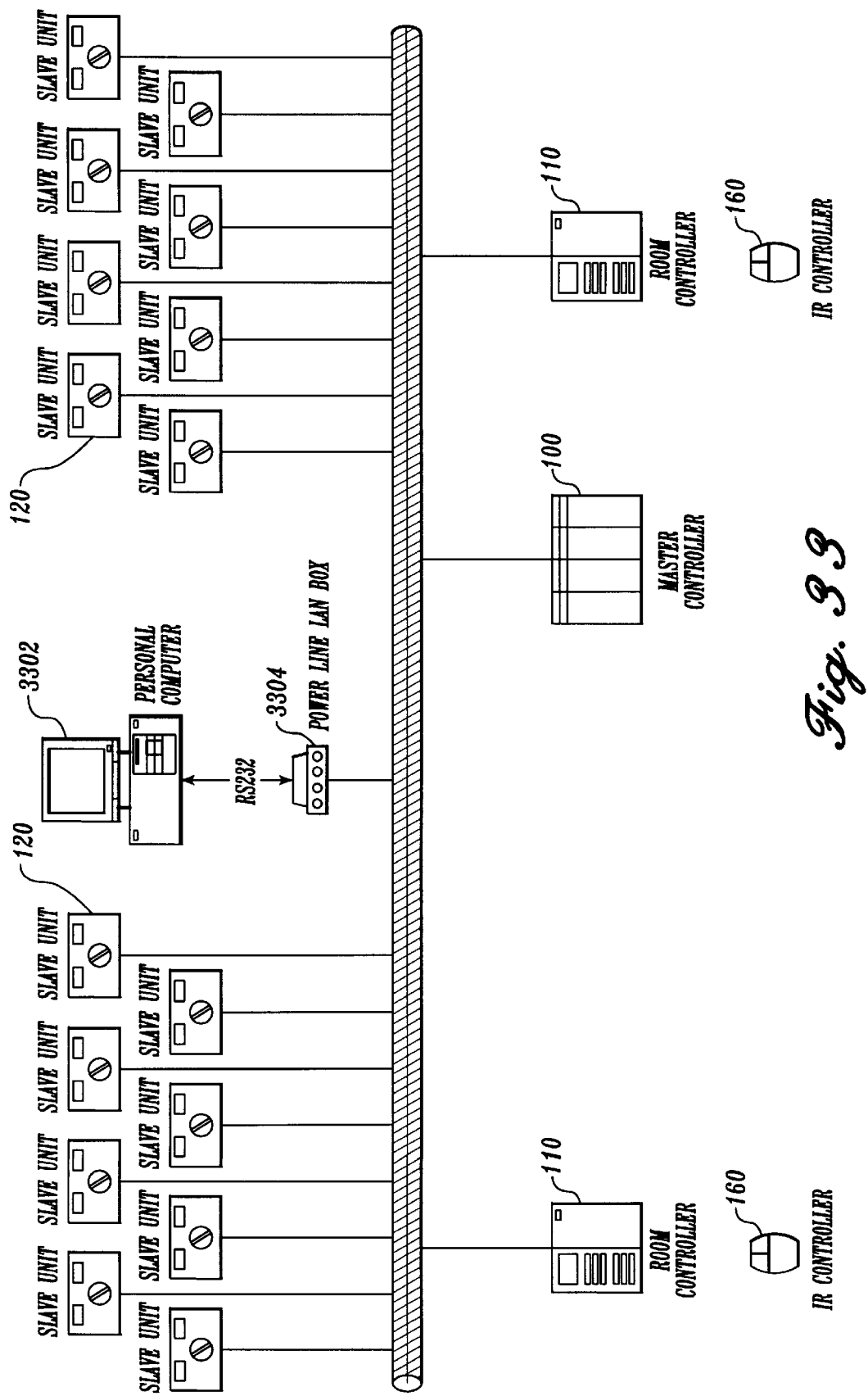
FIG. 33 is an alternative embodiment of the LCS in accordance with the present invention.

The download button 348, when depressed, enables the master controller 100 to receive preprogrammed configurations from a PC, as discussed in more detail below in connection with FIG. 33. A password will be verified before the master controller 100 receives the configuration information from the PC. The download LED 346 is turned on when the master controller 100 is receiving configuration information from the PC. Otherwise, the download LED 346 is turned off.

The install/password region 388 includes a unit installation LED 354, an install button 356, a remove button 358, a password set LED 360, a set button 362, and a verify button 364. As discussed below, the install button 356 is pressed by the user during the installation of a particular slave unit. During the installation process, a unique unit number is associated with each slave unit to be installed. The unit number is installation information identifying the slave unit. The unit installation LED 354 is turned on while the master controller 100 performs installation. The remove button 358, when depressed, removes the identification of a selected slave unit from the EEROM 214 of the master controller 100. The set button 362, when depressed, enables the master controller 100 to receive a password from the PC over the powerline. While the password is provided from the PC to the master controller 100, the password set LED 360 is turned on. To confirm the proper receipt of the transmitted password, the verify button 364 is depressed, sending the password back to the PC for verification.

The speaker region 392 includes a speaker housing 366 containing the speaker 218 (FIG. 2A). The speaker housing 366 allows the user to hear audio information from the speaker 218 to guide the user in operating the master controller 100, as well as the LCS 50 in general.

The speaker 218 provides sound prompts and the flashing of appropriate LEDs to guide the user during installation, verification, and monitoring, as described in more detail below. When a slave unit is successfully installed, the corresponding installed LED will flash for three seconds while providing an appropriate sound prompt to inform the user of the completed installation. In the preferred embodiment, the sound prompt announces, for example, "Zone 1, unit 2 has been successfully installed." As another example, assume that the installation of a particular slave unit is to be verified. When the master controller receives the verify command from the slave unit whose installation is to be verified, all of the LEDs associated with the slave unit on the front panel 300 of the master controller 100 will flash for three seconds. During or around that time, a second prompt will announce "Zone 2, unit 3 is being verified." As a further example, a problem with a particular slave unit may be detected during the monitoring process. In that instance, all of the LEDs associated with the slave unit will flash, while a second prompt announces "Please check zone 3, unit 4." The foregoing discussion describing sound prompts complementing the activation of LEDs is illustrative only. It will be appreciated that the sound prompts could be designed to convey other information or warnings to the user. Furthermore, the sound prompts could be altogether eliminated during operation of the LCS 50. Likewise, the flashing or activation of the LEDs could be modified in various ways to serve as indications of the status of the LCS 50. Alternatively, the use of the LEDs could be eliminated. It will be appreciated that the LCS 50 in accordance with the present invention contemplates other variations in the implementation of sound prompts and the LEDs to guide the control and operation of the LCS 50 not specifically detailed herein.

The LCS 50 provides real-time status monitoring of the slave units 120 under the control of the master controller 100. Monitoring is implemented by use of a timer within the master controller 100. The master controller 100 preferably monitors the status of the slave units every 90 minutes approximately. Of course, other time intervals for monitoring could alternatively be provided. During the monitoring process, the master controller 100 sends a broadcast check command to check the operating status of all of the slave units 120. The check command is sent to the slave units 120. Upon receipt of the check command, all of the slave units 120 will respond by sending information back to the master controller 100, indicating the operating status of each slave unit 120. The status of the slave units is reflected by appropriate activation of the LEDs on the front panel 300 of the master controller 100. Furthermore, each time the operating status of a slave unit is changed locally, the slave unit will communicate with the master controller 100 to immediately reflect that change on the front panel 300. In addition, all of the activities of the zone controller 110 are monitored by the master controller 100 and reflected on the front panel 300.

In some instances, monitoring of the slave units 120 will be complicated. For example, the master controller 100 may not receive a response to its check command from a particular slave unit 120. This could result if the slave unit 120 has been unplugged. As another example, the master controller 100 may apparently receive a response from a slave unit 120 that has not been installed. To make the user of the LCS 50 aware of such complications during monitoring, the master controller 100 will flash all of the LEDs corresponding to the slave unit associated with the complications. The flashing LEDs indicate to the user that the slave unit 120 may require re-installation, or some other remedial measure. The depression of any button associated with the slave unit 120 causes the LEDs to cease flashing.

Figure 4A:
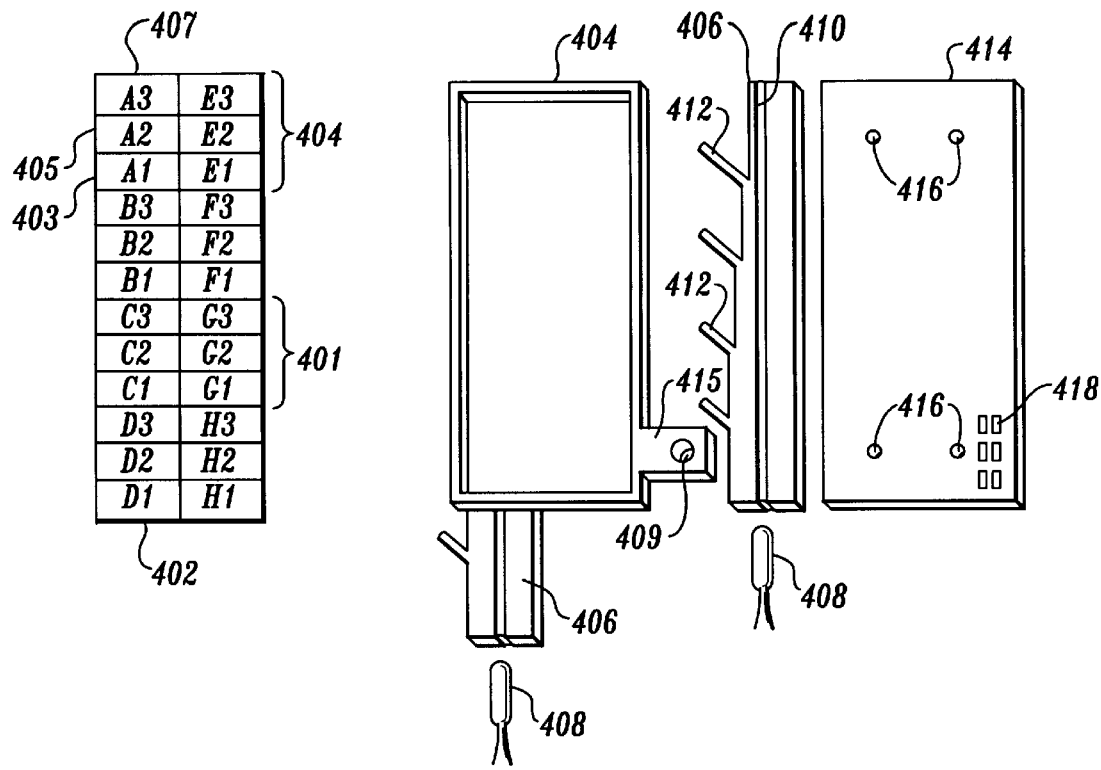
FIGS. 4A–D are diagrams of the components of the master controller below the front panel illustrated in FIG. 3.

FIGS. 4A–D depict the internal design of the master controller 100 with the front panel 300 removed. The design allows the user to select a particular zone while providing to the user a description of the slave units in the zone. The components illustrated in FIGS. 4A–D are not drawn to scale. As shown in FIG. 4A, the master controller 100 includes a sheet 402, a panel 404, optical wave guides 406, convergent light sources 408, slots 410, fingers 412, a printed circuit board 414, holes 416, and soldering pads 418. The sheet 402 is positioned underneath the front panel 300. The sheet 402 contains textual information precisely positioned to appear through the label windows of the front panel 300. The sheet 402 includes a plurality of information blocks 401. Each information block 401 corresponds to one of the label windows. The sheet 402 preferably contains eight information blocks to correspond with the eight label windows on the front panel 300. Of course, if the master controller 100 is designed to control more or less than eight slave units per zone, the number of label windows 326 would attendantly change, as would the number of information blocks 401 on the sheet 402.

Each information block 401 includes a zone one identifier 403, a zone two identifier 405, and a zone three identifier 407. The identifiers are labels identifying for the user a particular slave unit in a selected zone. The identifiers are arranged by row so that when the sliding switch 344 is positioned to select a particular zone, the identifier for the slave unit corresponding to each information block in the selected zone is displayed through the label window. The sheet 402 preferably is a sheet of white paper having some degree of transparency so that light may shine through it. The sheet 402 is designed to allow the user to write and identify the description of the slave units 120 on the sheet 402. As discussed in more detail below, the sheet 402 is contained by the panel 404. The upper surface of the panel 404 is designed in the shape of a tray to carry the sheet 402. The panel 404 includes a rectangular flange 415 along an elongate edge of the panel 404. The rectangular flange 415 includes a hole 409 therethrough. The panel 404 includes two protrusions 413 (FIG. 4C) on its bottom surface. The panel 404 is made of a clear, polymeric material, preferably acrylic.

Figure 4B:
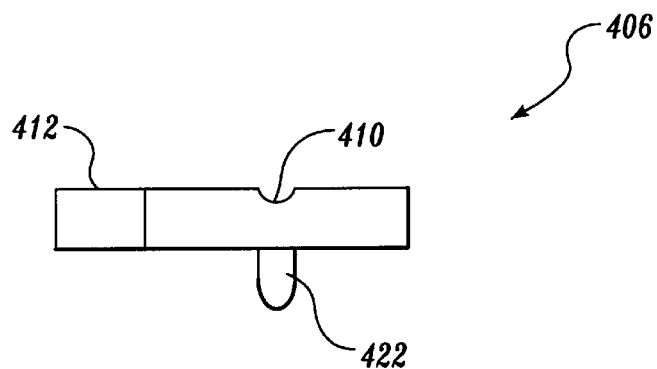

The master controller 100 includes two elongate, optical wave guides 406. The optical wave guides 406 each include the slot 410. The slot 410 longitudinally extends along an upper surface of the optical wave guide 406. The slots 410 are configured to cooperate with the protrusions 413 of the panel 404. Each optical wave guide 406 includes four fingers 412 positioned apart from one another and extending from a longitudinal edge of the optical wave guide 406. As shown in FIG. 4B, the optical wave guide 406 includes two protrusions 422 emanating from the bottom surface of the optical wave guide 406. Each protrusion 422 of each optical wave guide 406 is located adjacent the longitudinal end of the optical wave guide 406. The optical wave guides 406 are made of a clear, polymeric material, preferably acrylic. The convergent light sources 408 are located adjacent the bottom region 377 below the front panel 300. In addition, the convergent light sources 408 are each positioned adjacent a longitudinal end of a corresponding optical wave guide 406.

As shown in FIG. 4A, the master controller 100 also includes a printed circuit board 414. The printed circuit board 414 includes holes 416 and soldering pads 418. The soldering pads 418 are configured to make electrical contact with the sliding switch 344.

Figure 4C:
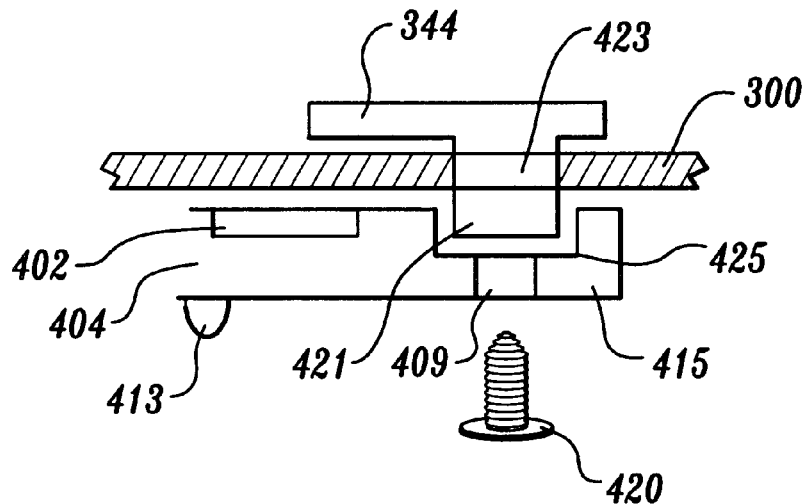

FIG. 4C illustrates how the sliding switch 344, the front panel 300, the sheet 402, and the panel 404 are connected. The sliding switch 344 includes a neck 421 configured to connect with the front panel 300, the sheet 402, and the panel 404. The sheet 402 is placed on the upper surface of the panel 404. The panel 404 is positioned below the front panel 300. The neck 421 of the sliding switch 344 is inserted through the hole 409 and a hole 423 of the front panel 300. The neck 421 rests in a depression 425 of the rectangular flange 415. A screw 420 is inserted from the bottom of the rectangular flange 415 through the hole 409 into the neck 421 to secure the sliding switch 344 to the panel 404.

Figure 4D:
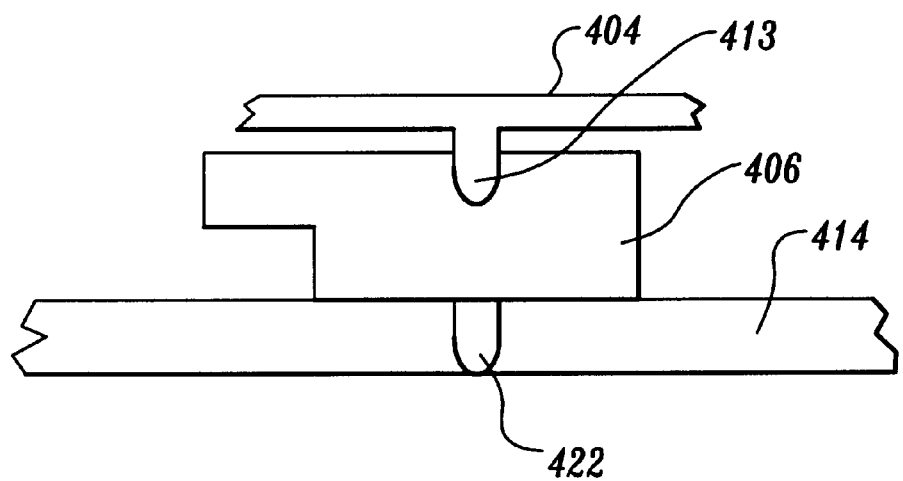

FIG. 4D illustrates how the panel 404, the optical wave guides 406, and the printed circuit board 414 are connected. Each protrusion 413 is slidably inserted into the slot 410 of one of the optical wave guides 406. The protrusions 422 of the optical wave guides 406 are inserted into the holes 416 to rigidly attach the optical wave guides 406 to the printed circuit board 414. In this way, the panel 404, and thus the sheet 402, can slide along the slots 410 when the user moves the sliding switch 344 during the selection of a particular zone.

During operation of the master controller 100, the convergent light sources 408 emit light directed to the optical wave guides 406. The light is, in turn, emitted through the fingers 412. The finger 412 are spaced-apart so that each finger is located to coincide with a corresponding information block 401 above the finger 412. The light emitted from the fingers 412 is directed to illuminate the panel 404 and the information blocks 401. The illumination of the information blocks 401 allows the user of the master controller 100 to clearly view the label windows and, thus, the identifiers of the slave units for a selected zone.

FIG. 5A is a schematic diagram illustrating a preferred connection between the sliding switch 344 and the CPU 210 of the master controller 100 for selecting zones Z1, Z2, and Z3. Lines 552, 554, 556 are connected to the CPU 210. The lines 552, 554, 556 are connected to one another through two series resistors R. The lines 552, 554, 556 each terminate at separate electrical contacts A, B, C, respectively. A line 550 is connected to the CPU 210 and terminates at a contact D. The sliding switch 344 carries an electrical conductor 559 that is in constant contact with line 550 at contact D and capable of contacting contact A, contact B, and contact C. When the sliding switch 344 is positioned to select zone Z3, the sliding switch 344 causes a short circuit between line 552 and 550 through contacts A, D. When the sliding switch is positioned to select zone Z2, the sliding switch 344 provides a short circuit between lines 554, 550 at contacts B, D. When the sliding switch is positioned to select zone Z1, the sliding switch 344 provides a short circuit between lines 556, 550 through contacts C, D. The CPU 210 provides predetermined inputs over lines 552, 554, 556 and determines the corresponding output over line 550 to determine the position of the sliding switch 344 and, thus, the zone selected by the user.

FIG. 5B is a table illustrating the inputs and the outputs of the CPU 210. In particular, the CPU 210 identifies the selected zone by analyzing the output over line 550 based on the values of the inputs provided over lines 552, 554, 556. At an initial time $t_i$, the CPU provides the binary values 1, 1, 1 over lines 552, 554, 556, respectively. As a result, the binary value over line 550 will be 1 no matter where the sliding switch 344 is positioned. At a time after time $t_1$, the CPU 210 successively provides a set of binary values 0, 1, 1 at a time $t_1$; 1, 0, 1 at $t_2$; and, 1, 1, 0 at $t_3$. At the time $t_1$, if the CPU 210 receives the binary value of 0 over line 550, the CPU 210 determines that the sliding switch 344 is positioned to select zone Z3. If the binary value over line 550 is 1, the CPU 210 will determine that the sliding switch 344 is not positioned to select zone Z1. At the later time, $t_2$, if the CPU 210 determines that the binary value over line 550 is 0, the CPU 210 will determine that zone Z2 has been selected. If at time $t_3$, the CPU 210 has determined that the binary value over line 550 is 0, the CPU 210 will determine that zone Z1 has been selected.

Figures 5C, 5D:
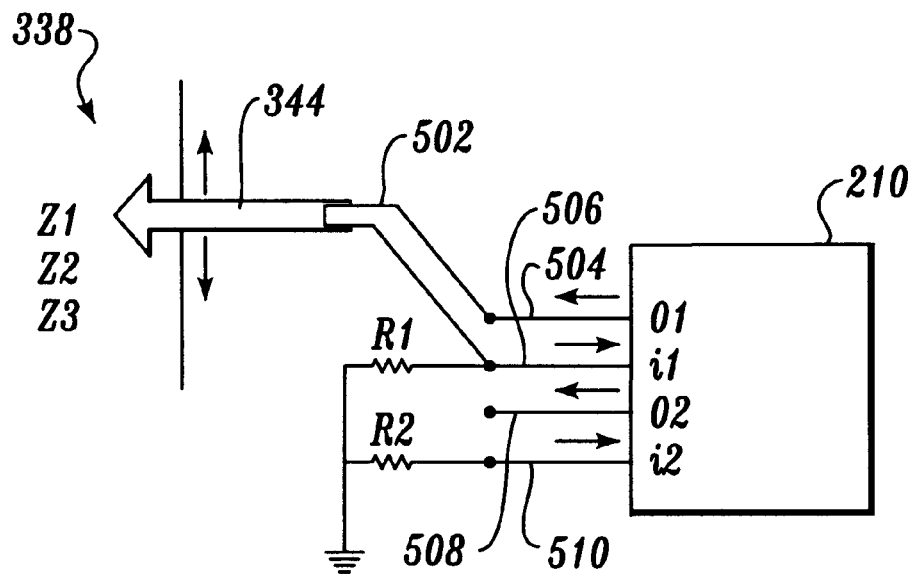
FIG. 5C is a schematic diagram of a sliding switch of the master controller in accordance with an alternative embodiment of the present invention.
FIG. 5D is a table of input and output values used with the sliding switch illustrated in FIG. 5C.

FIG. 5C is a schematic diagram illustrating an alternative embodiment of the connection between the sliding switch 344 and the CPU 210 of the master controller 100 for selecting zones Z1, Z2, and Z3. A unique zone number is associated with the selection of each zone using the sliding switch 344. The zone number is installation information used during the installation process to identify a zone and its associated network of slave units. An open loop 502 is rigidly attached to the sliding switch 344. When the sliding switch 344 is positioned to select Z1, the contacts of the open loop 502 connect to lines 504, 506. When Z2 is selected, the contacts of the open loop 502 connect to lines 506, 508. When Z3 is selected, the contacts of the open loop 502 connect to lines 508, 510.

Lines 504, 506, 508, 510 are lines coupling the sliding switch 344 with the CPU 210. Line 504 is an output line carrying a first output O1 of the CPU 210; line 506 is an input line carrying a first input I1 of the CPU 210; line 508 is an output line carrying a second output O2 of the CPU 210; and, line 510 is an input line carrying a second input I2 of the CPU 210. Line 506 is connected to ground potential through resistor R1. Line 510 is connected to ground potential through resistor R2.

FIG. 5D is a table illustrating the inputs and outputs of the CPU 210. The CPU 210 determines what zone the user of the master controller 100 has selected by the values of the inputs and outputs. In particular, the CPU 210 identifies the selected zone by analyzing the first inputs I1 and second inputs I2 based upon the transmission of predetermined first outputs O1 and second outputs O2. At an initial time $t_1$, the CPU 210 provides a value of zero as the first output O1 and a value of one as the second output O2. At a later time $t_2$, the CPU 210 provides a value of one as the first output O1 and a value of zero as the second output O2.

When Z1 is selected, the open loop 502 connects line 504 and line 506. At the initial time $t_1$, the first output O1, having a value of zero, is transmitted from the CPU 210 over the open loop 502 as the first input I1. The second input I2 has a value of zero because line 510 is connected to the ground potential. Accordingly, at the initial time $t_1$, the first input I1 has a value of zero and the second input I2 has a value of zero when Z1 is selected.

At the later time $t_2$, the first input I1 has a value of one because the open loop 502 provides a short circuit between line 504 and line 506. The second input I2 has a value of zero because line 510 is connected to the ground potential. Accordingly, at the time $t_2$, the first input I2 has a value of one and the second input I2 has a value of zero when Z1 is selected. Thus, when the first input I1 has a value of zero and the second input I2 has a value of zero at the initial time $t_1$, and the first input I1 has a value of one and the second input I2 has a value of zero at the later time $t_2$, the CPU 210 determines that the user of the master controller 100 has selected Z1.

The selection of Z2 and Z3 as determined by the CPU 210 is analogous to the above discussion and therefore needs only brief description. The CPU 210 determines that Z2 has been selected in the following way. At the initial time $t_1$, the first input I1 will have a value of one due to the short circuit between line 506 and line 508 caused by the open loop 502. The second input I2 will have a value of zero because line 510 is connected to the ground potential. At the later time $t_2$, the first input I1 will have a value of zero due to the short circuit between line 508 and line 506 caused by the open loop 502. The second input I2 will have a value of zero because line 510 is connected to the ground potential.

The CPU 210 determines that Z3 has been selected in the following way. At the initial time $t_1$, the first input I1 will have a value of zero because line 506 is connected to the ground potential. The second input I2 will have a value of one because of the short circuit between line 508 and line 510 caused by the open loop 502. At the later time $t_2$, the first input I1 will have a value of zero because line 506 is connected to the ground potential. The second input I2 will have a value of zero because line 508 and line 510 are short circuited by the open loop 502.

Accordingly, by analyzing the values of the first input I1 and the second input I2 at a particular time, the CPU 210 can determine which zone has been selected based upon the first output O1 and second output O2. As stated above, the LCS 50 of the present invention can include any number of zones, rather than the three zones Z1, Z2, Z3 suggested by the zone selector region 338. It will be appreciated that the present invention anticipates suitable modification to the schematic diagram illustrated in FIG. 5B to accommodate a different number of zones.

As shown in FIG. 6, the back panel 600 of the master controller 100 includes the house code encoder 216, hanger slots 604, support pads 606, and a cord guide 608. The hanger slot 604 can be used to mount the master controller 100 to a wall. The support pads 606 contact the surface of a structure supporting the master controller 100. The cord guide 608 is configured to carry therein the electrical cable 230 providing power and a signal path for the master controller 100.

The house code encoder 216 includes a series of rotary switches 602. The rotary switches 602 are manually adjusted by the user to select a house code for the master controller 100. As stated above, the LCS 50 can be implemented to have any number of master controllers. The house code is installation information used during the installation of slave units and zone controllers to distinguish the commands of one master controller from another. Each house code identifies a master controller and its associated network of zone controllers and slave units. The series of rotary switches 602 includes three separate rotary switches that function identically. Of course, a different number of rotary switches could alternatively be provided in accordance with the present invention. Each rotary switch has 16 possible settings. A different number of settings is also possible. A screwdriver or other suitable implement can be used to adjust each rotary switch to a desired setting. The rotary switches 602 are well known to those skilled in this art and others.

Figure 7:
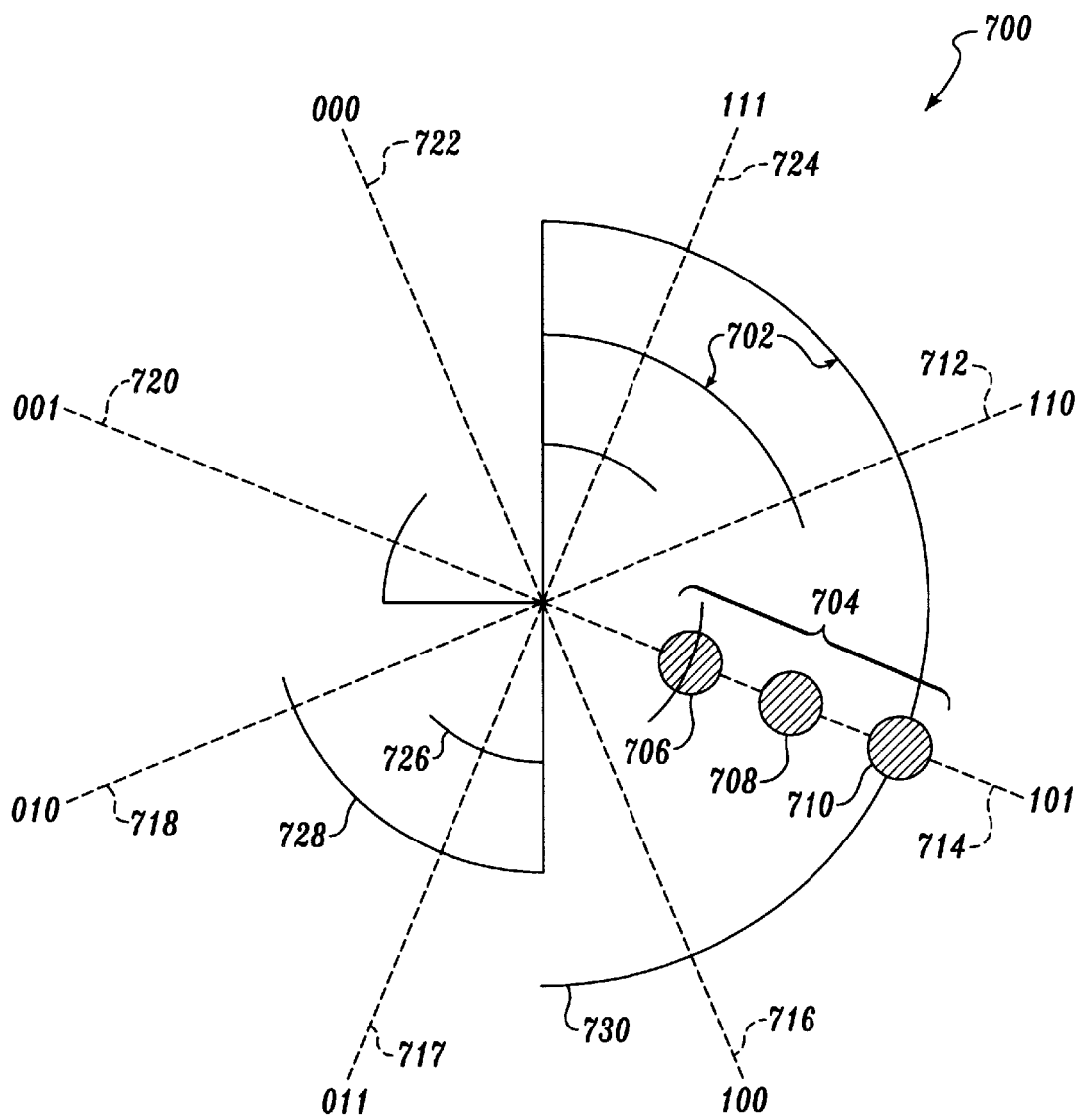
FIG. 7 is a simplified diagram of a rotary switch of the master controller.

FIG. 7 is an illustration of a rotary switch 700, a simplified one like the rotary switches 602 illustrated in FIG. 6. The rotary switch illustrated in FIG. 7 has eight settings instead of 16. The rotary switch 700 includes stationary, circular connections 702 and rotary connections 704. The rotary connections 704 include a first rotary contact 706, a second rotary contact 708, and a third rotary contact 710. The rotary connections 704 move circularly along radial lines of the stationary, circular connections 702. The rotary connections 704 follow the user's circular adjustment of the rotary switch 700. The rotary connections 704 can take any one of eight different, predetermined settings along radial lines 712, 714, 716, 717, 718, 720, 722, 724. Each radial line corresponds to a setting of the rotary switch 700.

The stationary, circular connections 702 include a first circular contact 726, a second circular contact 728, and a third circular contact 730. The circular contacts are broken, concentric circles. The circular contacts are electrically connected together. Adjustment of the rotary switch 700 causes the rotary contacts to appropriately contact the circular contacts at the predetermined settings.

Contact between a rotary contact and a circular contact corresponds to a binary value of 1. The failure of a rotary contact to contact a circular contact corresponds to a binary value of 0. The first rotary contact 706 can be contacted with the first circular contact 726; the second rotary contact 708 can be contacted with the second circular contact 728; and the third rotary contact 710 can be contacted with the third circular contact 730. The first circular contact 726 corresponds to a binary value associated with the least significant bit. The third circular contact 730 corresponds to a binary value associated with the most significant bit. The second circular contact 728 corresponds to a binary value associated with a bit having an intermediate value.

As shown in FIG. 7, the rotary switch is set to coincide with radial line 714. The first rotary contact 706 contacts the first circular contact 726; the second rotary contact 708 does not contact the second circular contact 728; and, the third rotary contact 710 contacts the third circular contact 730. Accordingly, a binary value of 101 is provided when the rotary connections 704 coincide with the setting corresponding to radial line 714. In a similar manner, a binary value of 110 corresponds to radial line 712; a binary value 100 corresponds to radial line 716; a binary value of 011 corresponds to radial line 717; a binary value of 010 corresponds to radial line 718; a binary value of 001 corresponds to radial line 720; a binary value of 000 corresponds to radial line 722; and, a binary value of 111 corresponds to radial line 724. Each binary value associated with a particular radial line, and thus setting, indicates to the CPU 210 what setting has been selected for a particular one of the rotary switches 602. Each setting corresponds to a unique value contributing to the house code. It will be appreciated that the present invention anticipates modifications to the simplified diagram illustrated in FIG. 7 to accommodate a different number of settings, for example, 16 settings in the preferred embodiment.

Figure 8:
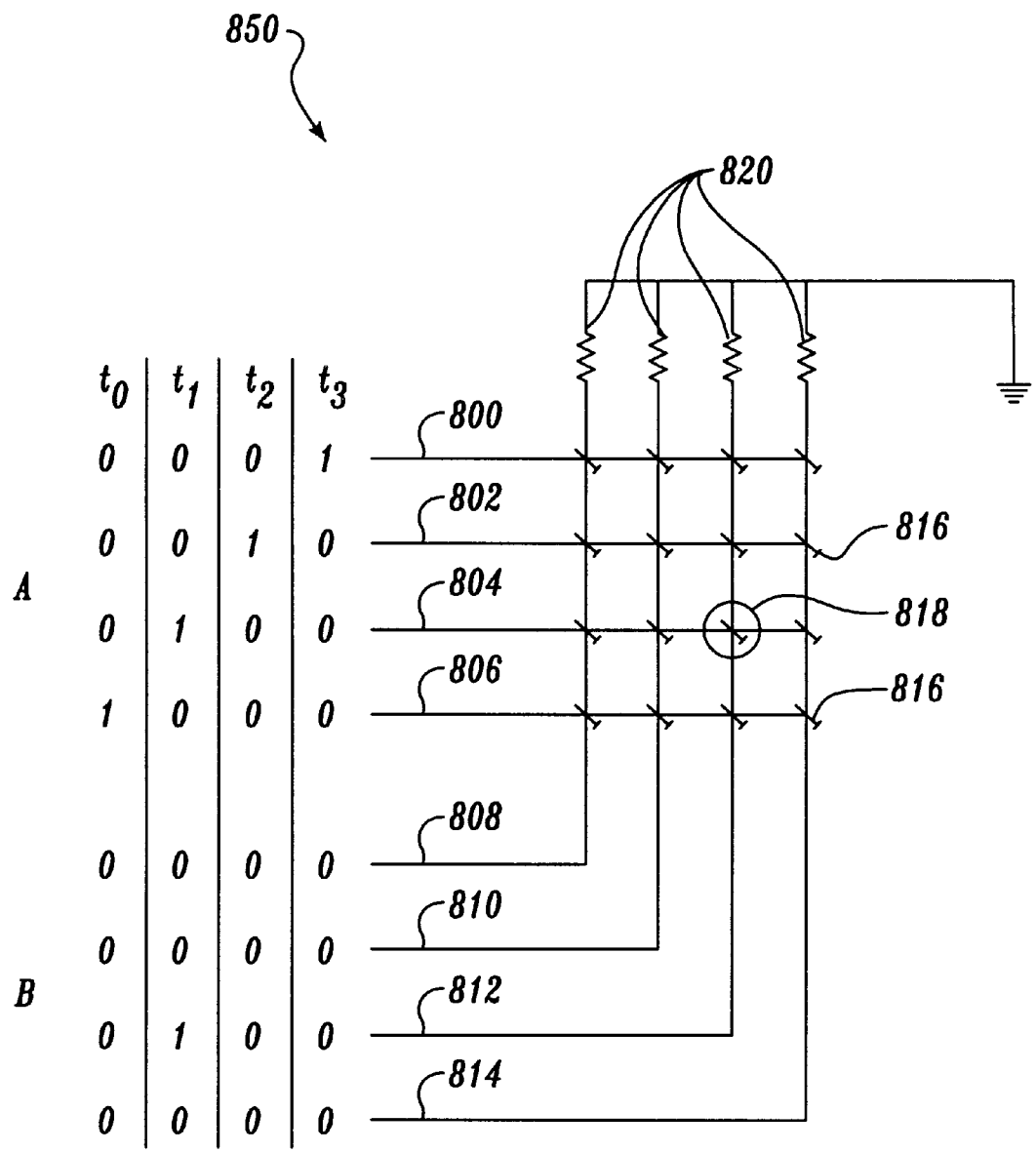
FIG. 8 is a table and schematic diagram illustrating the operation of an input keypad of the present invention.

As stated above, the input keypad 220 of the master controller 100 includes the buttons that allow the user to provide commands to operate the LCS 50. The master controller 100 determines which buttons the user has depressed in a manner well known to those skilled in this art and others, as shown in FIG. 8. FIG. 8 is a simplified illustration to determine which buttons have been depressed on an input keypad 850, a simplified version of the input keypad 220. Because the illustration is simplified, only 16 buttons are depicted on the input keypad 850. Any number of buttons, including all of the buttons provided in accordance with the preferred embodiment of the input keypad 220 of the present invention, can be accommodated by suitable modification to the illustrated technique. The input keypad 850 includes sixteen buttons 816 depressable by a user of the input keypad 850. The buttons 816 are capable of electrically connecting lines 800, 802, 804, 806, 808, 810, 812, 814. Intersecting lines illustrated in FIG. 8 are normally not contacted. Only depression of the button corresponding to intersecting lines causes an electrical connection therebetween. A depressed button 818 electrically connects line 804 and line 812. Each of the lines 808, 810, 812, 814 is connected to ground potential through a resistor 820.

Lines 800, 802, 804, 806 carry binary values transmitted from the CPU 210 to the input keypad 850 at different times $t_0$, $t_1$, $t_2$, $t_3$. Lines 808, 810, 812, 814 carry binary values transmitted from the input keypad 850 to the CPU 210 at the times to, $t_1$, $t_2$, $t_3$. The binary values transmitted to the CPU 210 from the keypad 220 indicate what button has been depressed. A line connected to ground potential carries a binary value of zero.

The CPU 210 outputs to the input keypad 850 the following predetermined binary values over lines 800, 802, 804, 806: 0,0,0,1 respectively, at time $t_0$, 0,0,1,0, respectively, at time $t_1$; 0,1,0,0, respectively, at time $t_2$; and 1,0,0,0, respectively, at time $t_3$. The depression of the button 818 causes the binary value transmitted over line 804 to continue from the input keypad 850 along line 812 back to the CPU 210. Therefore, the CPU 210 receives the following binary values over lines 808, 810, 812, 814: 0,0,0,0 respectively, at time $t_0$; 0,0,1,0, respectively, at time $t_1$; 0,0,0,0, respectively, at time $t_2$; and 0,0,0,0, respectively, at time $t_3$. At time $t_1$, the depressed button 818 causes the binary value of one on line 804 to be carried on line 812. The receipt of the binary value of one indicates to the CPU 210 that the button 818 has been depressed. Upon determining that the button 818 has been depressed, the CPU 210 appropriately responds to the user's command, according to the function of the button 818. In a manner similar to the technique illustrated in FIG. 8, the CPU 210 determines which buttons have been depressed on the input keypad 220 of the master controller 100. The input keypads of the zone controllers and the slave units operate identically.

Figure 9:
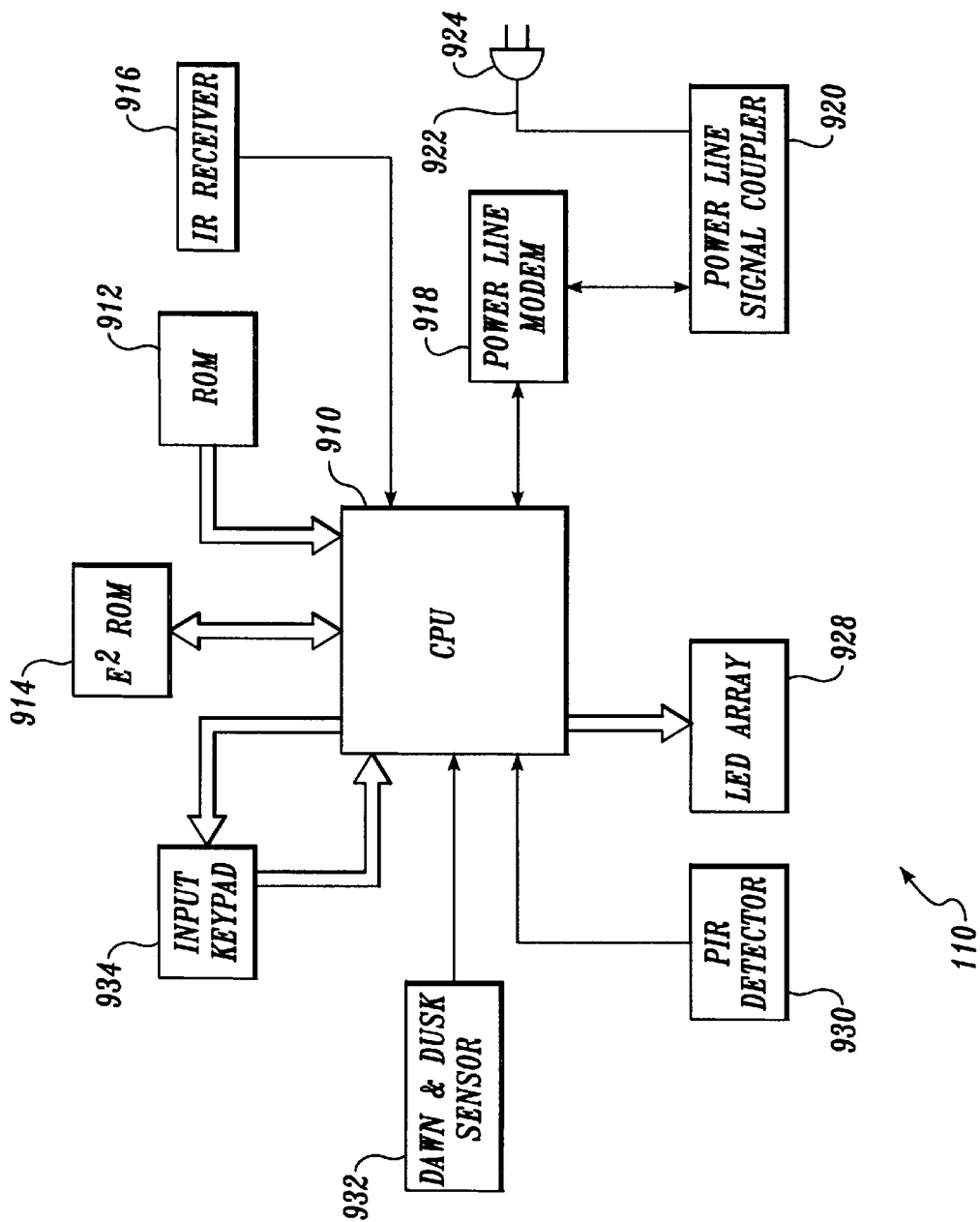
FIG. 9 is a block diagram of the architecture of a zone controller of the LCS in accordance with one embodiment of the present invention.
Figure 10:
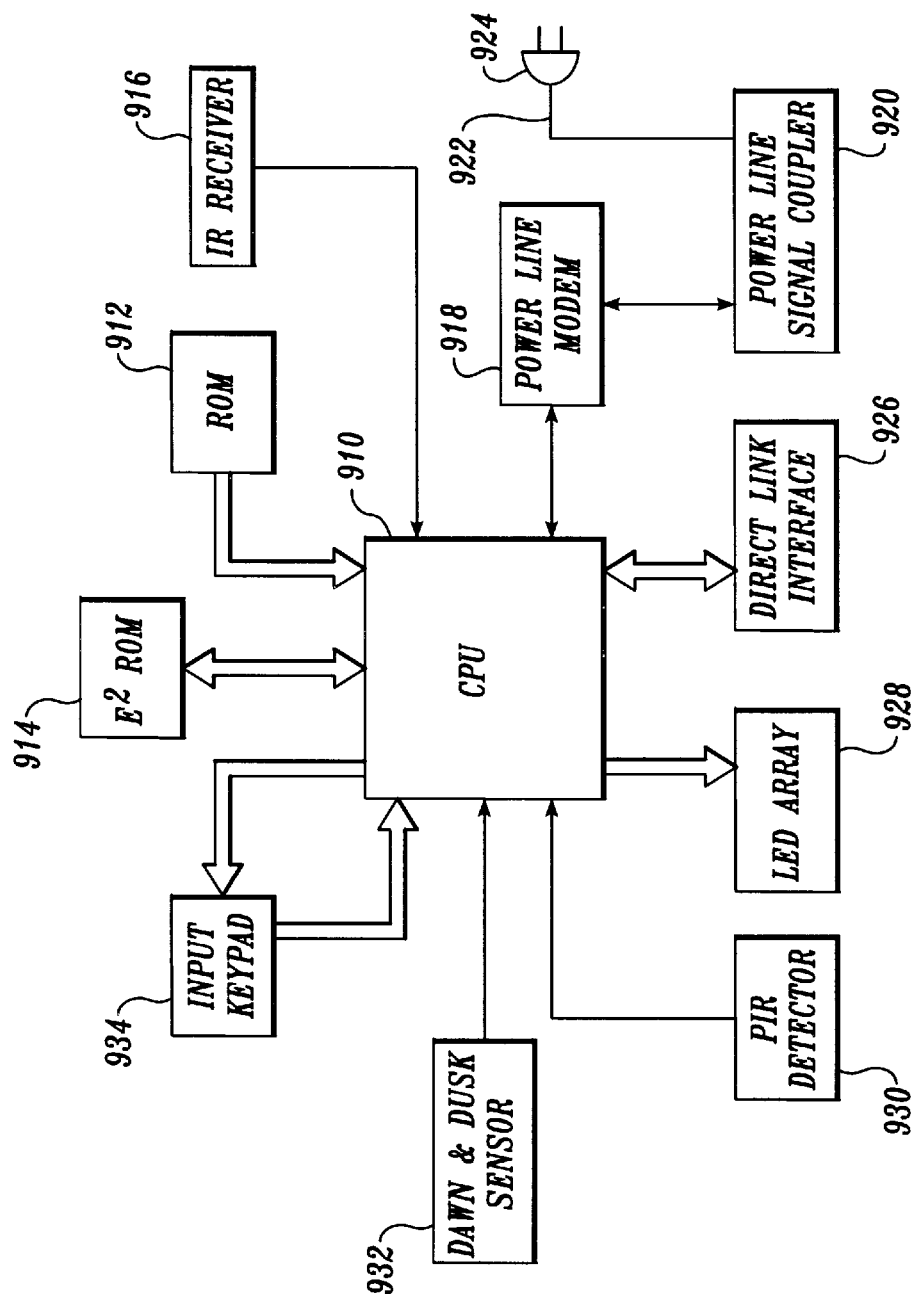
FIG. 10 is a block diagram of the architecture of a zone controller of the LCS in accordance with an alternative embodiment of the present invention.

FIG. 9 illustrates the architecture of the zone controller 110. The zone controller 110 controls the operation of associated slave units. The zone controller 110 includes a CPU 910, a ROM 912, an EEROM 914, an infrared (IR) receiver 916, a powerline modem 918, a powerline signal coupler 920, an electrical cable 922, an electrical plug 924, an LED array 928, a passive infrared (PIR) detector 930, a dawn and dusk sensor 932, and an input keypad 934. Many of the components of the zone controller 110 are analogous with those of the master controller 100. The CPU 910 controls the operation of the zone controller 110. The ROM 912 stores program information directing the operation of the CPU 910. The EEROM 914 stores password information, configuration information, and installation information. The powerline modem 918, the powerline signal coupler 920, the electrical cable 922, and the electrical plug 924 provide signal communication to and from the zone controller 110 over the powerline. The LED array 928 includes all LEDs of the zone controller 110, as described below. The LEDs provide visual indications to the user regarding the status of the slave units associated with the zone controller 110. The input keypad 934 includes all of the buttons of the zone controller 110, whose function is described below. In an alternative embodiment illustrated in FIG. 10, the zone controller 110 further includes a direct link interface 926, which provides a link between the zone controller 110 and a slave unit for installation of the slave unit without connection to the powerline, as discussed in more detail below in connection with FIG. 18. The IR receiver 916 receives signals from an infrared (IR) controller, as described below.

The PIR detector 930 senses the presence or absence of a person or other infrared light-emitting entity. The PIR detector 930 is implemented to automatically activate an appropriate configuration of electrical appliances upon the detection of such a person in a room or other area in which the electrical appliances operate. In the preferred embodiment, the PIR detector 930 is available from Jetwell, Taipei, Taiwan.

Figure 11A:
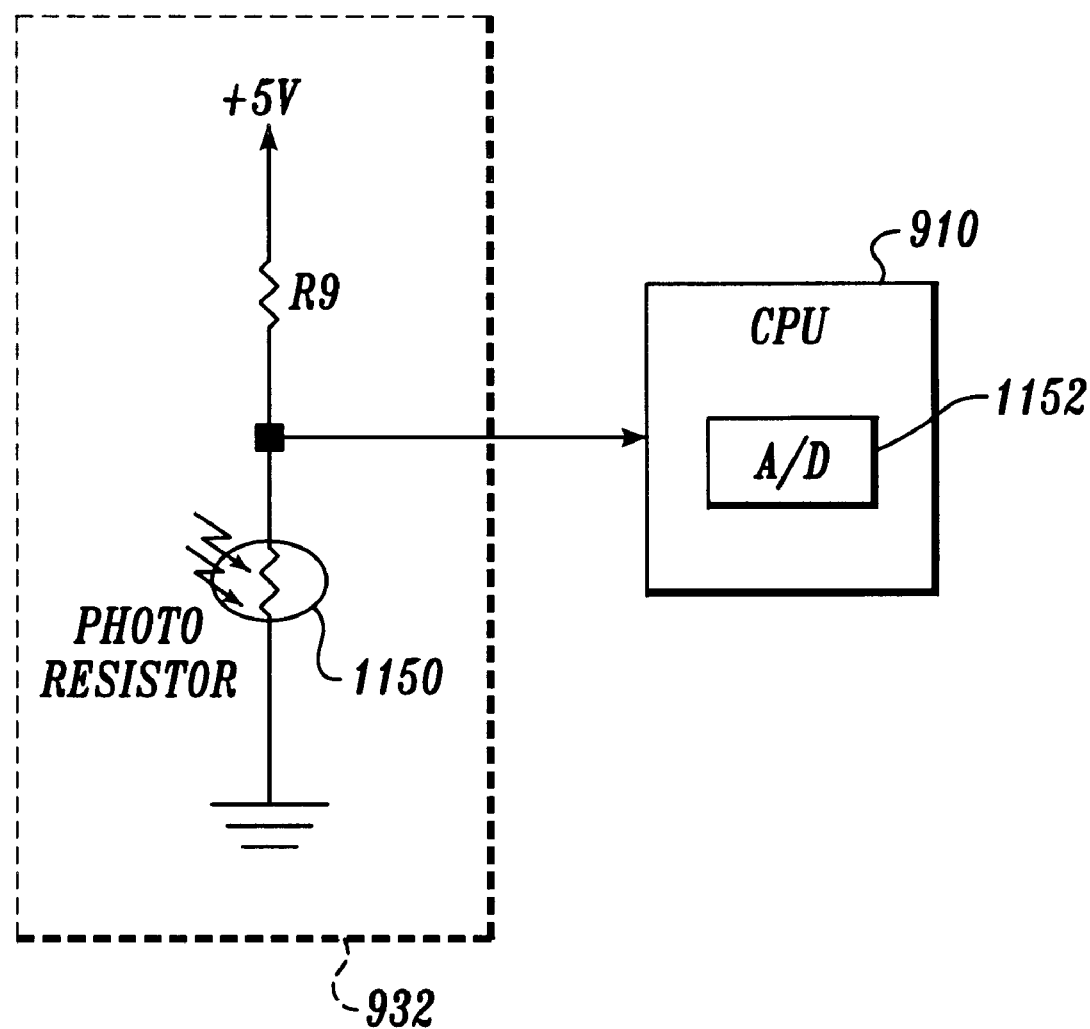
FIG. 11A illustrates a first embodiment of a dawn and dusk sensor of the zone controller.
Figure 11B:
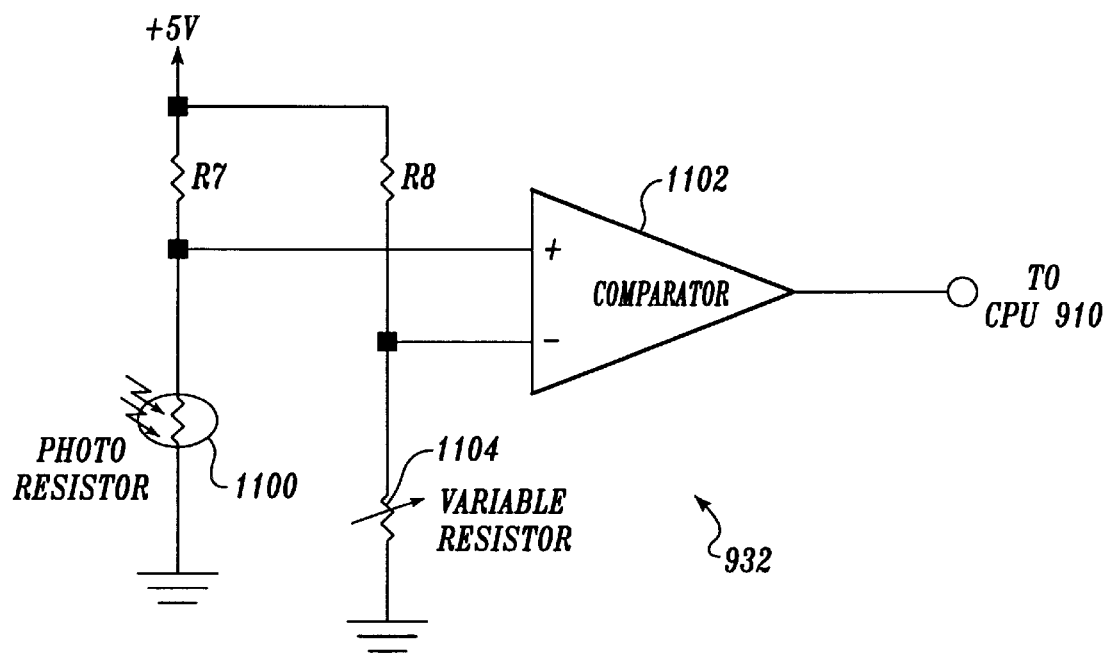
FIG. 11B illustrates a second embodiment of the dawn and dusk sensor of the zone controller.

The dawn and dusk sensor 932 detects the illumination level in the room where the zone controller 110 is located. Based upon the detected illumination level, the zone controller 110, if the user so desires, will automatically associate the illumination level with a particular time, i.e., dusk or dawn, when a person enters the room. The zone controller 110 then activates a configuration associated with dusk or a configuration associated with dawn. FIGS. 11A and 11B are alternative embodiments of the dawn and dusk sensor 932.

FIG. 11A illustrates a preferred embodiment of the dawn and dusk sensor 932. The dawn and dusk sensor 932 includes a photoresistor 1150 and a resistor designated R9. The photoresistor 1150 is located adjacent a slide window (FIG. 12) that is adjustable to control the amount of light incident upon the photoresistor 1150. The positive terminal of the photoresistor 1150 is connected to five volts through resistor R9. The positive terminal of the photoresistor 1150 is also connected to an analog-to-digital converter 1152 of the CPU 910. In the preferred embodiment, the CPU 910 is available from NEC, and identified as serial no. UPD17149. When light is incident upon the photoresistor 1150, the resistance of the photoresistor 1150 is affected. The more light incident upon the photoresistor 1150, the more resistance it will have. Accordingly, when the illumination level is relatively low, the resistance of the photoresistor 1150 is relatively low, causing relatively low voltage at the positive terminal of the photoresistor 1150. When the illumination level in the room is relatively high, the resistance of the photoresistor 1150 is relatively large, causing a relatively high voltage at the positive terminal of the photoresistor 1150. The voltage at the positive terminal of the photoresistor 1150 is provided to the analog-to-digital converter 1152. The analog-to-digital converter 1152 converts the analog representation of the voltage into a digital value.

The digital value is then processed and compared in the CPU 910 with a threshold voltage value. The threshold voltage value is programmed in the ROM 912 to allow the zone controller 110 to identify dawn and dusk. When the voltage of the positive terminal of the photoresistor 1150 is larger than the threshold voltage value, the CPU 910 identifies dusk. When the voltage at the positive terminal of the photoresistor 1150 is smaller than the threshold voltage value, the CPU 910 identifies dawn. The identification of either dawn or dusk, in turn, causes the CPU 910 to trigger the appropriate configuration of the slave units and their predetermined operating levels.

FIG. 11B illustrates an alternative embodiment of the dawn and dusk sensor 932. The dawn and dusk sensor 932 includes a photoresistor 1100, a comparator 1102, a variable resistor 1104, and two resistors designated R7 and R8. The photoresistor 1100 is located adjacent a slide window (FIG. 12) that is adjustable to control the amount of light incident upon the photoresistor 1100. The positive terminal of the photoresistor 1100 is connected to the positive input of the comparator 1102. The positive terminal of the photoresistor 1100 is also connected to five volts through resistor R7. The negative terminal of the photoresistor 1100 is connected to ground. The positive terminal of the variable resistor 1104 is connected to the negative input of the comparator 1102. The positive terminal of the variable resistor 1104 is also connected to five volts through resistor R8. The negative terminal of the variable resistor 1104 is connected to ground.

The variable resistor 1104 is adjusted to establish suitable thresholds for distinguishing between dawn and dusk. Light in the room incident upon the photoresistor 1100 will affect the resistance of the photoresistor 1100. The more light incident upon the photoresistor 1100, the more resistance it will have. When the illumination level in the room is relatively high, the photoresistor 1100 will have a relatively large resistance value, causing a relatively high voltage at the positive input of the comparator 1102. When the illumination level in the room is relatively low, the resistance of the photoresistor 1100 is relatively small, providing a relatively low voltage at the positive input of the comparator 1102.

When the voltage at the positive terminal of the comparator 1102 exceeds the voltage at the negative terminal, the comparator outputs a high signal to the CPU 910. The high signal indicates that the illumination level in the room is relatively high, thereby identifying dawn. When the voltage at the positive input of the comparator 1102 is less than the voltage at the negative input, the comparator 1102 outputs a low signal to the CPU 910. The low signal indicates that the illumination level in the room is relatively low, thereby identifying dusk. The identification of dawn or dusk causes the CPU 910 to activate the appropriate configuration when it detects the presence of a person in the room. The variable resistor 1104 can be adjusted to establish a precise identification of dawn and dusk.

Figures 12A, 12B:
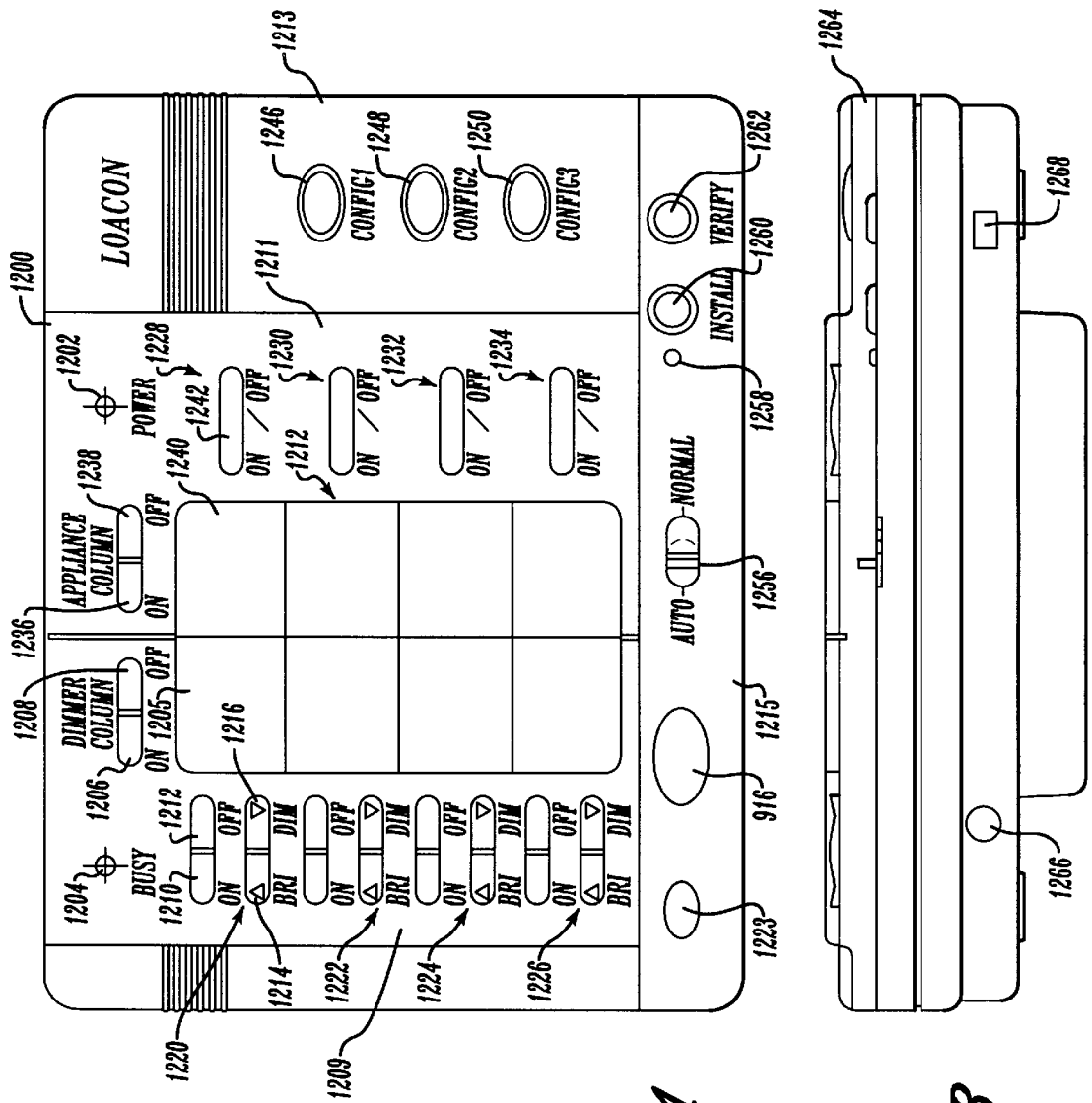
FIG. 12A is a diagram of a front panel of the zone controller.
FIG. 12B is a diagram of a bottom panel of the zone controller.
Figure 12E:
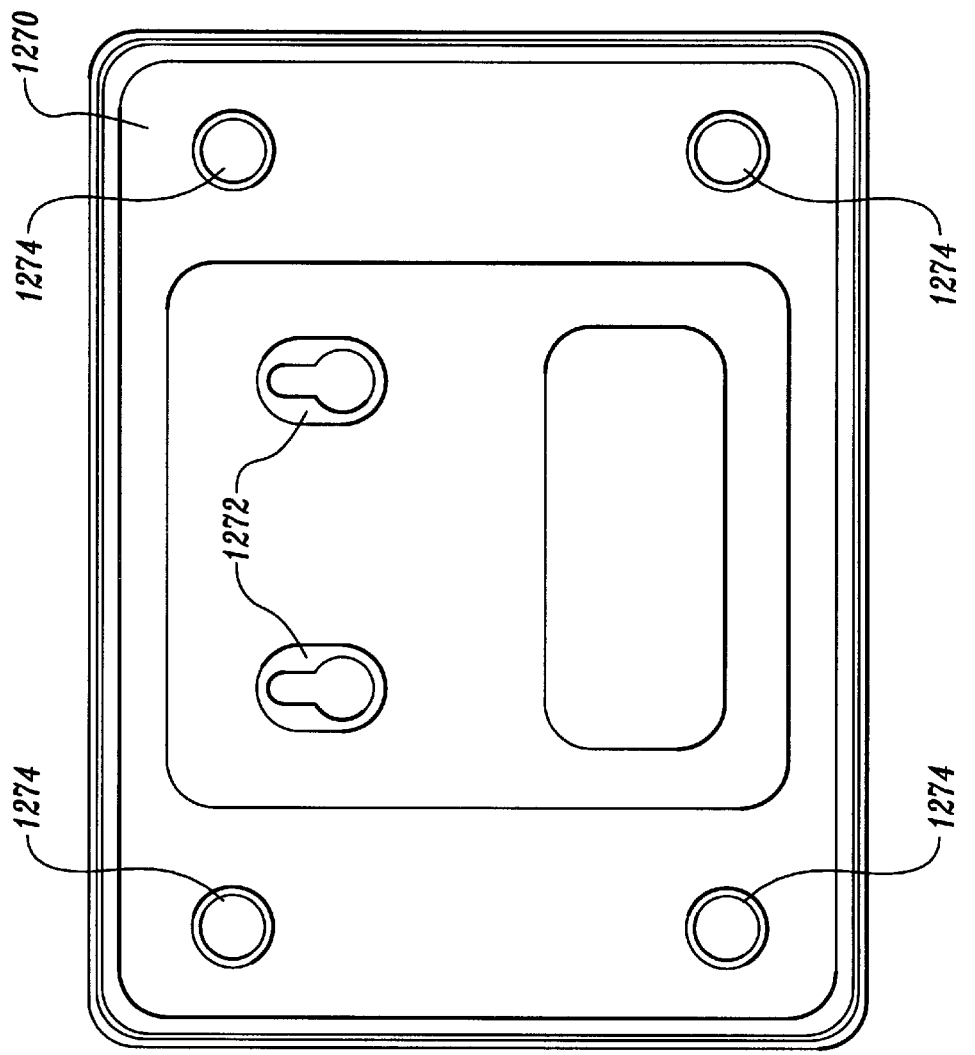
FIG. 12C is a diagram of a back panel of the zone controller.

FIGS. 12A–C illustrate the user interface of the zone controller 110, including the input keypad 934 and the LED array 928. The zone controller 110 includes a front panel 1200, a bottom panel 1264, and a back panel 1270. The front panel 1200 includes a dimmer region 1209, an appliance region 1211, a configuration region 1213, and a bottom region 1215. The zone controller 110 is preferably configured to control eight slave units. However, like the master controller 100, the zone controller 110 could be alternatively configured to provide control over a different number of associated slave units. The dimmer region 1209 includes a busy LED 1204, an on button 1206, an off button 1208, and four panel areas 1220, 1222, 1224, 1226. The LEDs of the front panel 1200 of the zone controller 110 are part of the LED array 928 (FIG. 9). All of the buttons on the front panel 1200 of the zone controller 110 are part of the input keypad 934 (FIG. 9). The busy LED 1204 is turned on when the zone controller is performing an operation. The busy LED 1204 is turned off when the zone controller 110 is not performing an operation. The panel areas 1220, 1222, 1224, 1226 each correspond to a slave unit and associated electrical appliance having multiple operating levels. Each panel area allows the user to control the operation of the slave unit associated with the panel area. Because the operation of each of the four panel areas 1220, 1222, 1224, 1226 is identical, only the panel area 1220 need be described. The panel area 1220 includes an on button 1210, an off button 1212, a bright button 1214, and a dim button 1216. The panel area 1220 also includes an associated display region 1218. The display region 1218 provides a written description to the user, identifying the electrical appliance associated with the slave unit corresponding to the panel area 1220.

When depressed, the on button 1210 turns on the associated slave unit. Similarly, when depressed, the off button 1212 turns off the slave unit. The bright button 1214 increases the operating level of the slave unit when depressed. The dim button 1216 decreases the operating level of the slave unit when depressed. By selective, repeated depression of the bright button 1214 and the dim button 1216, the user can incrementally adjust the operating level of the slave unit. All of the slave units associated with the four panel areas 1220, 1222, 1224, 1226 can be simultaneously turned on by depression of the on button 1206. Similarly, all of the slave units associated with the panel areas 1220, 1222, 1224, and 1226 can be simultaneously turned off by depression of the off button 1208.

Examples illustrate how the panel area 1220 can, by appropriate user inputs, control the slave units associated therewith. If a user wants to turn on a particular slave unit associated with the dimmer region 1209, the on button of the corresponding panel area is depressed. Likewise, if the user wants to turn off a particular slave unit associated with the dimmer region 1209, the appropriate off button is depressed. If the slave unit associated with the dimmer region 1209 is a slave unit having multiple operating levels, for example, a dimmable lamp, the operating level of the dimmable lamp can be controlled by appropriate depression of the bright button and the dim button to achieve a particular illumination level for the dimmable lamp. The on button is first depressed. Then, the bright button and the dim button are selectively depressed until the dimmable lamp has reached the desired illumination level. If the dimmable lamp is to be turned off, the off button is depressed.

The appliance region includes an on button 1236, an off button 1238, a power LED 1202, and panel areas 1228, 1230, 1232, 1234. The power LED 1202 is turned on when the zone controller 110 is supplied with power. The power LED 1202 is turned off when the zone controller 110 is not supplied with power. Each panel area 1228, 1230, 1232, 1234 indicates the status of a slave unit corresponding to the particular panel area. Because the operation of each of the four panel areas 1228, 1230, 1232, 1234 is identical, only the panel area 1228 need be described. The panel area 1228 includes an on/off button 1242 and a display region 1240 adjacent the on/off button 1242. A first depression of the on/off button 1242 turns on the slave unit associated with the panel area 1228. A subsequent depression of the on/off button 1242 turns off the associated slave unit. The display region 1240 includes a written identification of the electrical appliance associated with the slave unit and the panel area 1228. When the on button 1236 is depressed, all of the slave units associated with the panel areas 1228, 1230, 1232, 1234 are simultaneously turned on. Similarly, depression of the off button 1238 simultaneously turns off all of the slave units associated with the panel areas 1228, 1230, 1232, 1234.

The configure region 1213 includes a configuration button 1246, a configuration button 1248, and a configuration button 1250 labeled CONFIG.1, CONFIG. 2, and CONFIG. 3, respectively. Configuration buttons 1246, 1248, 1250 allow the user of the zone controller 110 to program and save the operating levels of the slave units under the control of the zone controller 110 at predetermined configurations, as discussed above in connection with the configuration buttons 350 (FIG. 3).

The bottom region 1215 includes a dusk/dawn window 1223, an IR receiver 916, an auto/normal sliding switch 1256, an install LED 1258, an install button 1260, and a verify button 1262. The dusk/dawn window 1223 is located adjacent the photoresistor 1150 (FIG. 11A) or the photoresistor 1100 (FIG. 11B). The dusk/dawn window 1223 permits light to fall on the photoresistor. The IR receiver 916 receives infrared commands to allow the user's remote control of the zone controller 110, as discussed below in connection with FIG. 13. The auto/normal sliding switch 1256 controls the operation of the dawn and dusk sensor 932 and the PIR detector 930. The auto/normal sliding switch 1256 can be switched to an auto position or a normal position. When the auto/normal sliding switch 1256 is switched to the auto position, the dawn and dusk sensor 932 and the PIR detector 930 are enabled. When the auto/normal sliding switch 1256 is switched to the normal position, the dawn and dusk sensor 932 and the PIR detector 930 are disabled. When the auto/normal sliding switch 1256 is switched to the auto position, the PIR detector 930 and the dawn and dusk sensor 932 are enabled, allowing the automatic activation of slave units. The automatic activation of slave units depends on the detected presence of persons in the room associated with the zone controller 110, as well as the detected time of day. When the auto/normal sliding switch 1256 is switched to the normal position, the PIR detector 930 and the dawn and dusk sensor 932 are disabled so that the zone controller 110 will not sense or automatically respond to the presence of a person in the room.

The install button 1260 is depressed during the installation process, as described in more detail below. When the zone controller 110 is to be installed by the master controller 100, the install button 1260 is depressed for more than two seconds. When a slave unit is to be installed by the zone controller 110, the install button 1260 is depressed for less than two seconds, followed by the depression of a button on the front panel 1200 associated with the slave unit to be installed. The install LED 1258 is turned on during the installation process. Otherwise, the install LED 1258 is turned off. The verify button 1262 is depressed to verify the installation of a particular slave unit 120 or the zone controller 110, as discussed below in connection with various verification procedures.

FIG. 12B illustrates the bottom panel 1264 of the zone controller 110. The bottom panel 1264 includes a PIR detector input 1266 and a socket 1268. The PIR detector input 1266 is coupled with the PIR detector 930 to sense infrared light in the vicinity of the zone controller 110. The infrared light detected by the PIR detector input 1266 is provided to the PIR detector 930 to sense the presence of a person in the area local to the zone controller 110. Upon such detection, an appropriate configuration may activate the slave units 120, depending on the position of the auto/normal sliding switch 1256. The socket 1268 couples the electrical cable 922 and the electrical plug 924 to the zone controller 110.

As shown in FIG. 12C, the back panel 1270 of the zone controller 110 includes hanger slots 1272 and support pads 1274. The hanger slots 1272 can be used to mount the zone controller 110 to a wall. The support pads 1274 contact the surface of a structure supporting the zone controller 110.

Figure 13A:
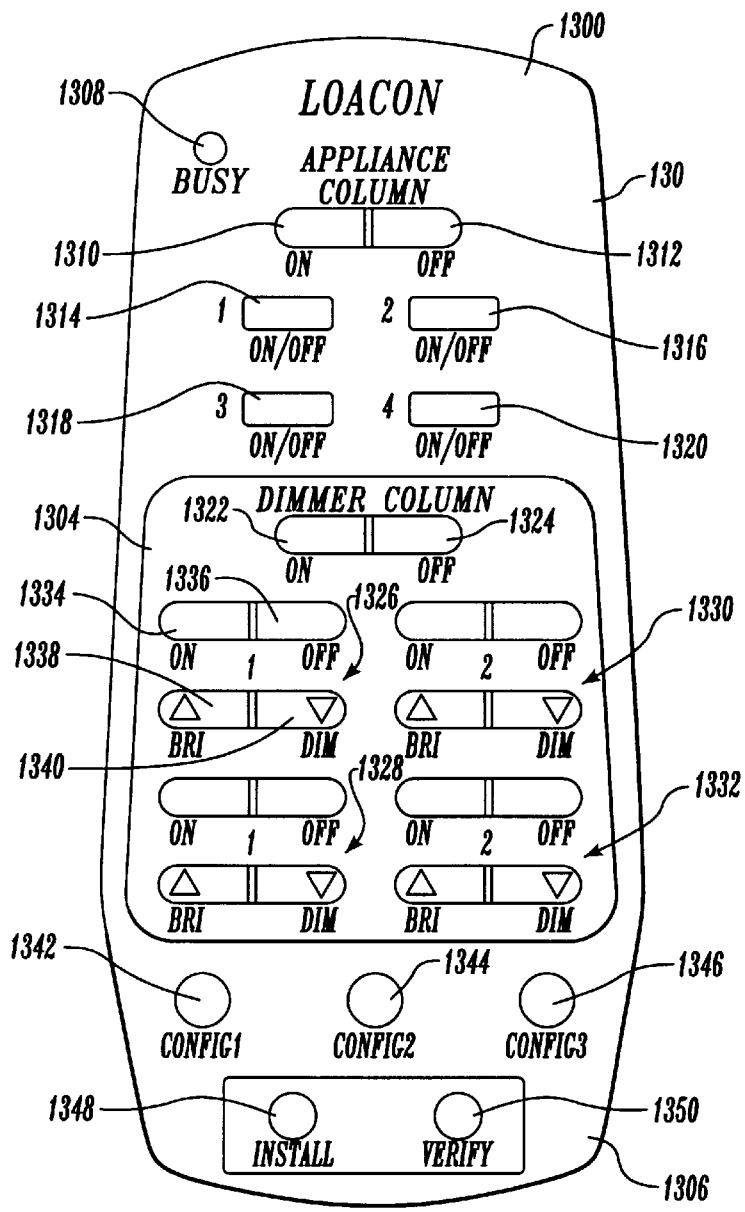
FIG. 13A is a diagram of a front panel of an IR controller of the LCS in accordance with the present invention.

FIG. 13A illustrates a front panel 1300 of the IR controller 160. The IR controller 160 allows the user to remotely operate the zone controller 110 and perform other operations. The IR controller 160 transmits infrared signals over the air to the IR receiver 916. The IR controller 160 can communicate with all of the zone controllers 110 of the LCS 50. The IR controller 160 allows the user to conveniently control the slave units associate with a particular zone controller 110 without requiring the user to operate the zone controller 110 directly. In this way, the IR controller 160 provides to the user added mobility and convenience.

The front panel 1300 of the IR controller 160 includes an appliance region 1302, a dimmer region 1304, and a bottom region 1306. The appliance region includes a busy LED 1308, an on button 1310, an off button 1312, and on/off buttons 1314, 1316, 1318, 1320. The on/off buttons 1314, 1316, 1318, 1320, which operate identically, each correspond to a slave unit having a single operating level. To turn on the slave unit associated with the on/off button 1314, for example, the on/off button 1314 is depressed once. To turn off the slave unit associated with the on/off button 1314, the on/off button 1314 is depressed again. All of the slave units associated with the on/off buttons 1314, 1316, 1318, 1320 can simultaneously be controlled by the on button 1310 and the off button 1312. To turn on all of the slave units associated with the appliance region 1302, the on button 1310 is depressed. To turn off all of the slave units associated with the appliance region 1302, the off button 1312 is depressed.

The dimmer region 1304 includes an on button 1322, an off button 1324, and panel areas 1326, 1328, 1330, 1332. Each panel area corresponds to a slave unit having multiple operating levels. The panel areas 1326, 1328, 1330, 1332 allow the user to control the operation of a particular slave unit by appropriate inputs to the corresponding panel area. Because each of the panel areas is identical, only the panel area 1326 need be discussed. The panel area 1326 includes an on button 1334, an off button 1336, a bright button 1338, and a dim button 1340. When depressed, the on button 1334 turns on the associated slave unit. When depressed, the off button 1336 turns off the associated slave unit. When the slave unit is turned on, selective depression of the bright button 1338 and the dim button 1340 allows the user to attain the desired operating level for the slave unit 120. When the on button 1322 is depressed, all of the slave units associated with the dimmer region 1304 are turned on. Similarly, when the off button 1324 is depressed, all of the slave units associated with the dimmer region 1304 are turned off.

The bottom region 1306 includes configuration buttons 1342, 1344, 1346, an install button 1348, and a verify button 1350. The configuration buttons 1342, 1344, 1346 allow the user of the IR controller 160 to program and save the operating levels of slave units at predetermined configurations. The configuration buttons 1342, 1344, 1346 operate like the configuration buttons 350, as discussed above. The install button 1348 and the verify button 1350 are depressed during the installation process and the verification process, respectively, as described in more detail below.

Figure 13B:
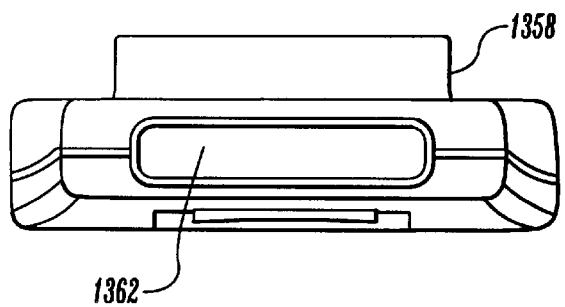
FIG. 13B is a diagram of a top panel of the IR controller illustrated in FIG. 13A.

As shown in FIG. 13B, a top panel 1360 of the IR controller 160 includes an IR transmitter 1362 to transmit infrared signals from the IR controller 160. To properly transmit infrared signals from the IR controller 160 to the zone controller 110, the IR controller 160 should be appropriately directed at the IR receiver 916 while the user applies inputs to the IR controller 160.

Figure 13C:
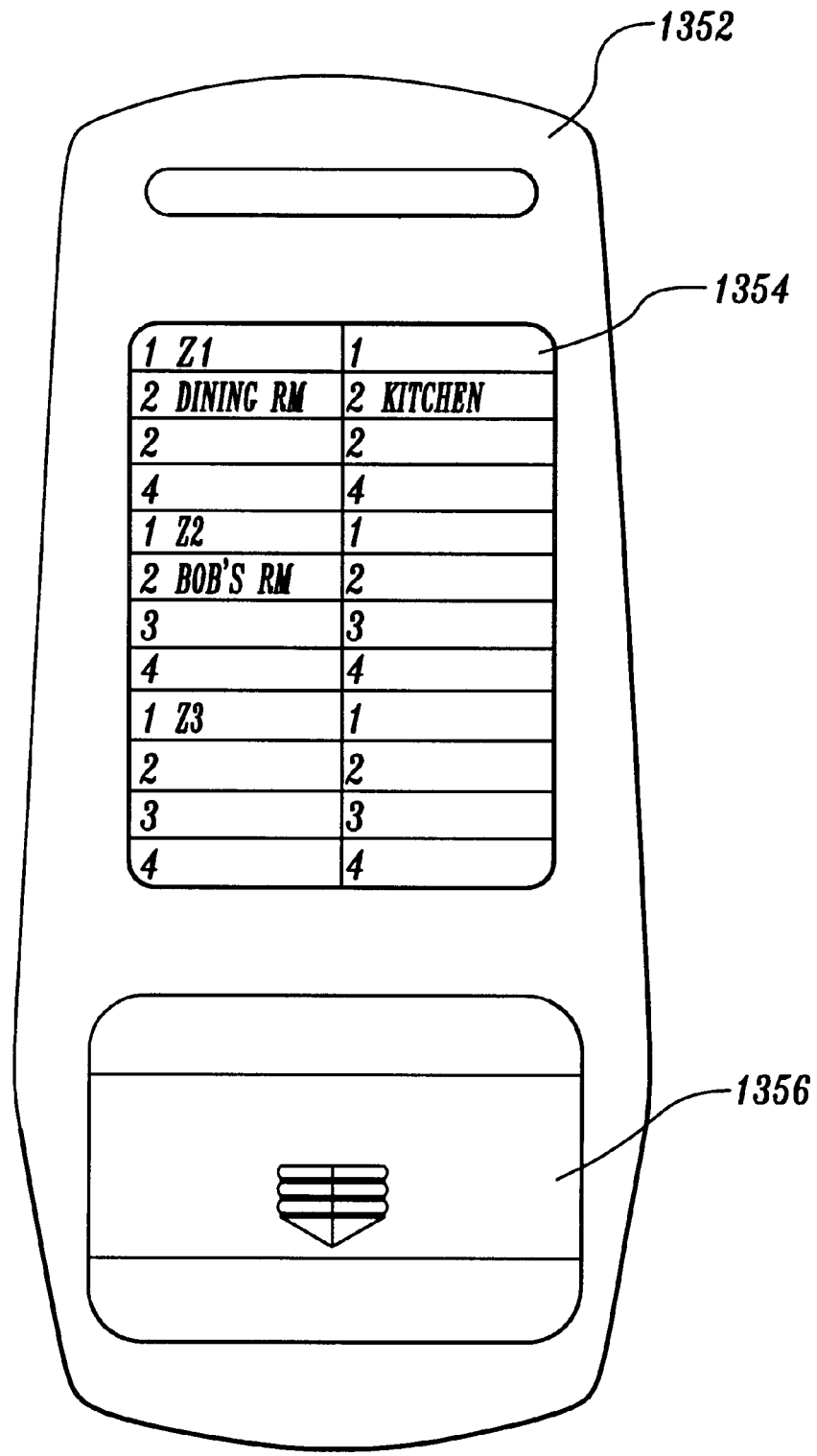
FIG. 13C is a diagram of a back panel of the IR controller illustrated in FIG. 13A.
Figure 17F:
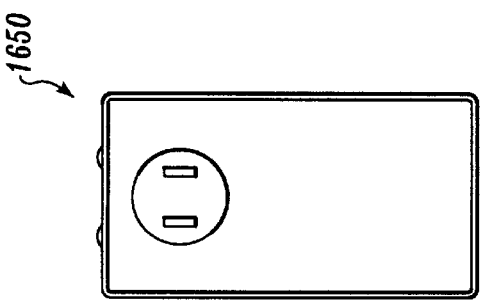
FIGS. 17A–F are views of the slave unit illustrated in FIG. 16.
Figure 17C:
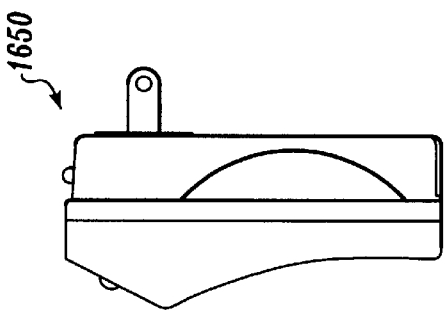
Figure 17D:
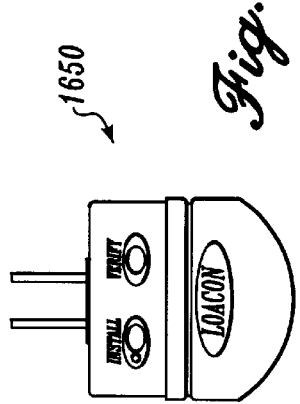
Figure 17A:
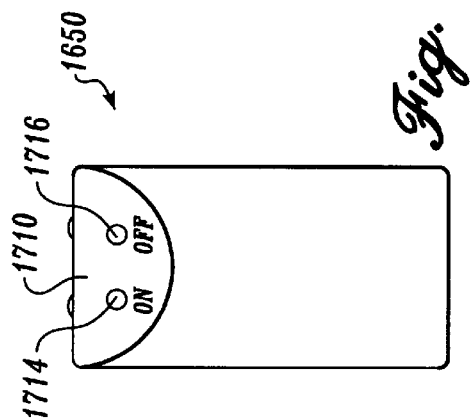
Figure 17E:
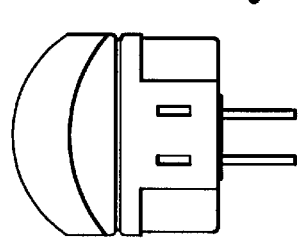
Figure 17B:
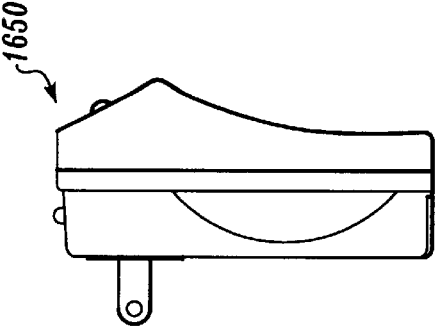

As shown in FIG. 13C, the back panel 1352 of the IR controller 160 includes an identification list 1354 and a battery compartment 1356. The identification list 1354 allows the user to write identifying information about the electrical appliance associated with each slave unit of the LCS 50. In the preferred embodiment, the identification list 1354 includes three identifying regions, each associated with zone Z1, zone Z2, or zone Z3. The slave unit identifications are grouped under each of the identifying regions. The battery compartment 1356 contains batteries to power the IR controller 160. In the preferred embodiment, the battery compartment 1356 holds two AAA batteries.

FIG. 14 illustrates the architecture of a slave unit 1450 associated with an electrical appliance having multiple levels of operation. The slave unit 1450 is connected to the powerline to achieve communications to and from the slave unit 1450. The slave unit 1450 includes a CPU 1400, a ROM 1402, a EEROM 1404, a powerline modem 1406, a powerline signal coupler 1408, an electrical cable 1410, an electrical plug 1412, an input keypad 1414, and an LED display 1416. The CPU 1400 controls the operation of the slave unit 1450 according to programmed instructions stored in the ROM 1402. The EEROM 1404 stores password information, configuration information, and installation information. The powerline modem 1406, the powerline signal coupler 1408, the electrical cable 1410, and the electrical plug 1412 are serially connected to the CPU 1400 to provide communications over the powerline between the slave unit 1450 and associated zone controllers and master controllers. The input keypad 1414 allows the user of the slave unit 1450 to enter appropriate commands to operate the slave unit 1450. The LED display 1416 provides visual information to the user about the operating status of the slave unit.

FIGS. 15A–F are views of the user interface of the slave unit 1450, whose architecture is illustrated in FIG. 14. FIG. 15A is a front view; FIG. 15B is a left side view; FIG. 15C is a right side view; FIG. 15D is a top view; FIG. 15E is a bottom view; and FIG. 15F is a back view. FIGS. 17A–F, FIGS. 19A–F, and FIGS. 21A–F illustrate the same views shown in FIGS. 15A–F. The slave unit 1450 includes a front surface 1500, a left surface 1502, a right surface 1504, a top surface 1506, a bottom surface 1508, and a back surface 1510. The front surface 1500 has a button region 1511 and a contour region 1512. The button region 1511 is an inclined surface substantially having the shape of a semicircle. The button region 1511 includes an on button 1514, an off button 1516, a bright button 1518, and a dim button 1520. The on button 1514, when depressed, turns on the electrical appliance associated with the slave unit 1450. The off button 1516 turns off the electrical appliance. The bright button 1518 and the dim button 1520 increase and decrease, respectively, the operating level of the electrical appliance. The user can locally control the operation of the slave unit 1450 and the associated electrical appliance by appropriate depression of the buttons. The contour region 1512 is adjacent the button region 1511. The contour region 1512, as its name implies, is a contoured surface separate from the button region 1511.

The left surface 1502 and the right surface 1504 each have an indentation 1521 to allow the user to better grip the slave unit 1450. The top surface 1506 includes an install button 1522, a verify button 1524, and an install LED 1526. The user depresses the install button 1522 during the installation process. The user depresses the verify button 1524 after the installation process to verify that the installation of the slave unit 1450 was properly completed. The install LED 1526 turns on during the installation of the slave unit 1450. When the install LED 1526 is turned on, it provides an indication to the user that no further commands should be provided to the slave unit 1450 until the installation process has been completed. The install LED 1526 turns off after installation. The bottom surface 1508 includes an electrical socket 1528 into which the associated electrical appliance can be plugged. The back surface 1510 includes the electrical plug 1412 mounted on a rotatable housing 1532. The rotatable housing 1532 allows the electrical plug 1412 to be rotatably adjusted for insertion into an electrical outlet (not shown). The rotatable feature of the electrical plug 1412 allows the slave unit 1450 to be rotationally adjusted so that the slave unit 1450 is oriented for the user's optimal convenience, no matter how the electrical plug 1412 must be inserted into the electrical outlet.

FIG. 15G illustrates the components of the rotatable housing 1532. The components are not shown to scale. The rotatable housing 1532 is positioned in a back panel 1550 of the slave unit 1450. One side of the back panel 1550 is the back surface 1510 (FIG. 15F). The rotatable housing 1532 includes a rotatable base 1560, conducting copper blades 1568, conductive contacts 1576, 1570, a conductive plate 1572, and screws 1574. The rotatable housing 1532 is cooperatively configured with the printed circuit board 414 and the back panel 1550. The back panel 1550 includes a hole 1552. The hole 1552 forms a ring 1554 through the back panel 1550. The ring 1554 includes a series of triangular indentations 1556 distributed along the circumference of the ring 1554. Each triangular indentation 1556 is oriented so that an angle of the triangular indentation 1556 is radially directed away from the center of the hole 1552.

The rotatable base 1560 includes a disk portion 1562 and a mount 1564. As shown in FIG. 15I, the disk portion 1562 is substantially circular with two oppositely-directed triangular pointed tabs 1558 extending from the circumference of the disk portion 1562. The tabs 1558 are configured to snugly and removably fit into the triangular indentations 1556. The mount 1564 is substantially shaped as a block. The mount 1564 extends from the bottom surface of the disk portion 1562. The mount 1564 includes two sockets 1566, two screw holes 1563, and two curved slots 1561. The two sockets 1566 define tapered cavities extending through the mount 1564 and the disk portion 1562. Each socket 1566 has an opening adjacent the bottom surface of the rotatable base 1560 and an opening adjacent the top surface of the rotatable base 1560. The opening adjacent the bottom surface is larger than the opening adjacent the top surface. The opening adjacent the bottom surface is configured to receive the copper blades 1568.

As shown in FIG. 15G, the copper blades 1568 are conventionally configured in the design of prongs of a conventional electrical plug. The conductive contacts 1570, 1576 have a V-shaped longitudinal cross section. The conductive plate 1572 is substantially flat, having two screw holes 1575 and two contacts holes 1573.

The components of the rotatable housing 1532 are assembled in the following way. The rotatable base 1560 is placed inside the ring 1554 so that the tabs 1558 are positioned in the triangular indentations 1556. The conducting copper blades 1568 are each inserted into one of the sockets 1566 and held therein by abutment. The size of the openings of the sockets 1566 adjacent the top surface allows only the prongs of the conducting copper blades 1568 to extend from the rotatable base 1560 and back surface 1510. The extension of the prongs allows the prongs to be inserted into an electrical outlet. The conductive contacts 1570, 1576 are each placed on an edge of the conducting copper blades 1568 and connected thereto by soldering. The conductive plate 1572 is placed over the conductive contacts 1570, 1576 so that the conductive contacts 1570, 1576 extend through the contact holes 1573. The screws 1574 are inserted through the screw holes 1575 of the conductive plate into the screw holes 1563 of the mount 1564, securing the conductive plate 1572, the conductive contacts 1576, 1570, and the conducting copper blades 1568 together.

When the slave unit 1450 is to be rotated relative to the orientation of the rotatable housing 1532, the rotatable disk portion 1562, when appropriately directed, rotates in the hole 1552. When the rotatable housing 1532 is rotated, the tabs 1558 are moved in and out of the triangular indentations 1556 until a desired orientation of the slave unit 1450 is achieved. The slots 1561 allow the tabs 1558 to "bounce" in and out of the triangular indentations 1556. The placement of the tabs 1558 in the appropriate triangular indentations 1556 secures the slave unit 1450 and the rotatable housing 1532 at the desired orientation.

FIG. 15H illustrates how the rotatable housing 1532 can be rotated without jeopardizing the supply of electrical power to the slave unit 1450. The conductive contacts 1570, 1576 are electrically connected to the printed circuit board 414 to deliver electrical power to the slave unit 1450. The printed circuit board 414 includes a circular contact 1580 having a radius ra, and a circular contact 1578 having a radius rb. The radius ra is less than the radius rb. When the rotatable housing 1532 is rotated, the conductive contact 1576 is designed to have a path contacting and coinciding with the circular contact 1580. Similarly, the conductive contact 1570, when rotated, is designed to have path contacting and coinciding with the circular contact 1578. In this way, the conductive contacts 1570, 1576 are in constant contact with the circular contacts 1578, 1580, respectively, when the rotatable housing 1532 is rotated relative to the slave unit 1450, allowing uninterrupted delivery of electrical power to the slave unit 1450. The design of the rotatable housing 1532 and the slave unit 1450 provide a reliable, durable means to deliver electrical power to the slave unit 1450, regardless of the frequency and degree of rotation. The rotatable housing of the slave units discussed below are designed like the rotatable housing 1532.

FIG. 16 illustrates the architecture of a slave unit 1650 configured for an electrical appliance having a single operating level. The slave unit 1650 communicates over the powerline. The slave unit 1650 includes a CPU 1600, a ROM 1602, an EEROM 1604, a powerline modem 1606, a powerline signal coupler 1608, an electrical cable 1610, an electrical plug 1612, a keypad 1614, and an LED display 1616. The function of these components in the slave unit 1650 mirrors the function of the components of the slave unit depicted in FIG. 14. FIGS. 17A–F illustrate the user interface of the slave unit 1650. The slave unit 1650 is almost identical with the slave unit 1450 (FIGS. 15A–F) in appearance and operation. The slave unit 1650 includes a button region 1710 having an on button 1714 and an off button 1716. The button region 1710 does not have a bright button or a dim button, as in FIG. 15A, because the slave unit 1650 is directed to electrical appliances having only a single operating level.

Figure 18:
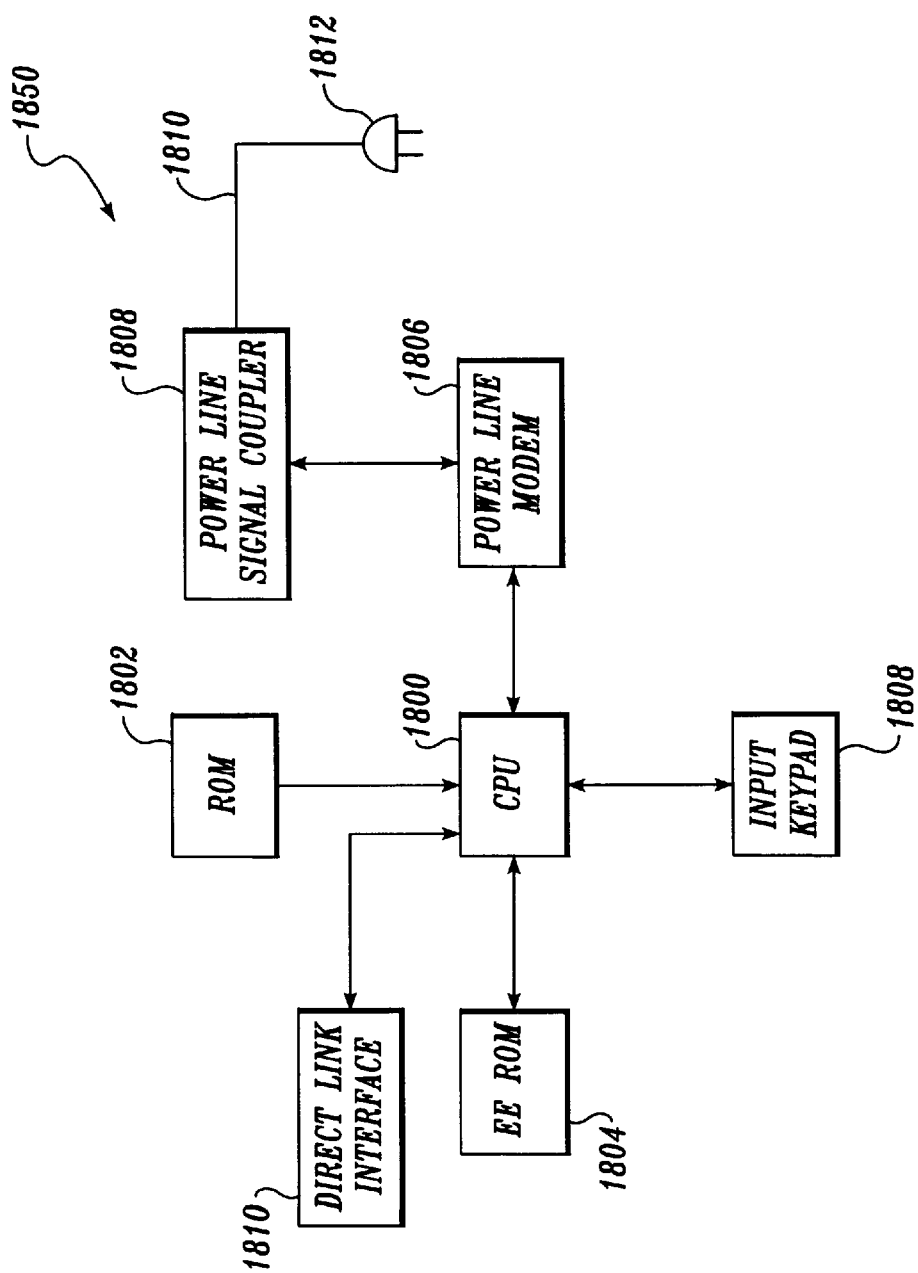
FIG. 18 is a block diagram of the architecture of a direct link slave unit for an electrical appliance having multiple operating levels.

FIG. 18 illustrates the architecture of a slave unit 1850 associated with electrical appliances having multiple operating levels. The slave unit 1850 is different from the slave unit 1450 because the slave unit 1850 communicates over a direct communications link from the slave unit 1850 to a master controller or zone controller during the installation process. The slave unit 1850 includes a CPU 1800, a ROM 1802, an EEROM 1804, an input keypad 1808, a direct link interface 1810, a powerline modem 1806, a powerline signal coupler 1808, an electrical cable 1810, and an electrical plug 1812. The function of these components in the slave unit 1850 mirrors the function of the components of the slave unit depicted in FIG. 14. The direct link interface 1810 provides a direct communication link between the CPU 1800 and a zone controller or master controller. Because installation using the direct communication link is straightforward and the possibility of collisions or other complications as described below, an LED, an install button, and a verify button are not provided for the slave unit 1850.

The direct link interface 1810 allows the slave unit 1850 to be coupled with the direct link interface 224 of the master controller 100 (FIG. 2B) or the direct link interface 926 of the zone controller 110 (FIG. 10) for installation purposes only. The direct link interfaces of the slave unit 1850, the zone controller 110, and the master controller 100 are all configured identically. Therefore, only the direct link interface 1810 need be described. The direct link interface 1810 is preferably configured as a telephone jack for receiving a traditional telephone cable. The telephone cable (not shown) functions as the transmission medium 150. The telephone cable preferably includes six separate lines. The following are transmitted over a separate line of the telephone cable: five volts to power the slave unit 1850; zero volts as a ground reference; serial in providing information to the slave unit 1850; serial out carrying information from the slave unit 1850; and, serial clock to time the functions of the slave unit 1850. One line of the telephone cable is not used in the preferred embodiment.

Figure 19F:
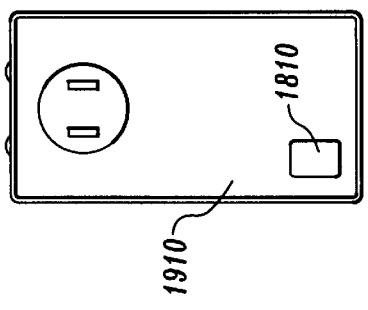
FIGS. 19A–F are views of the slave unit illustrated in FIG. 18.
Figure 19G:
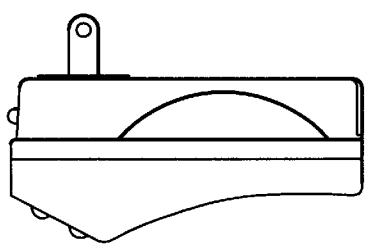
Figure 19D:
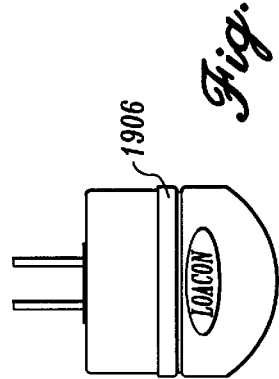
Figure 19A:
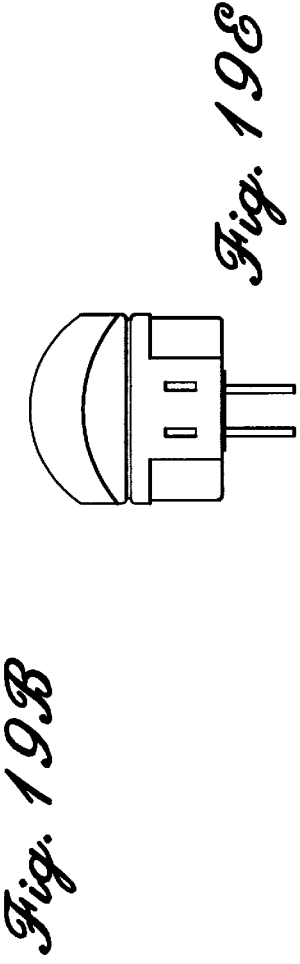
Figure 19E:
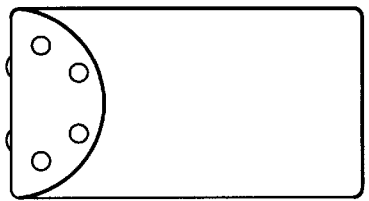
Figure 19B:
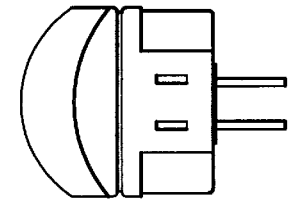

FIGS. 19A–F illustrate the user interface of the slave unit 1850. FIGS. 19A–F are identical to FIGS. 15A–F, with the following exceptions. As shown in FIG. 19F, the slave unit includes a back surface 1910 providing the direct link interface 1810. The slave unit 1850 also includes a top surface 1906. Unlike the top surface 1506 (FIG. 15D), the top surface 1906 does not have an install button, a verify button, or an install LED.

Figure 20:
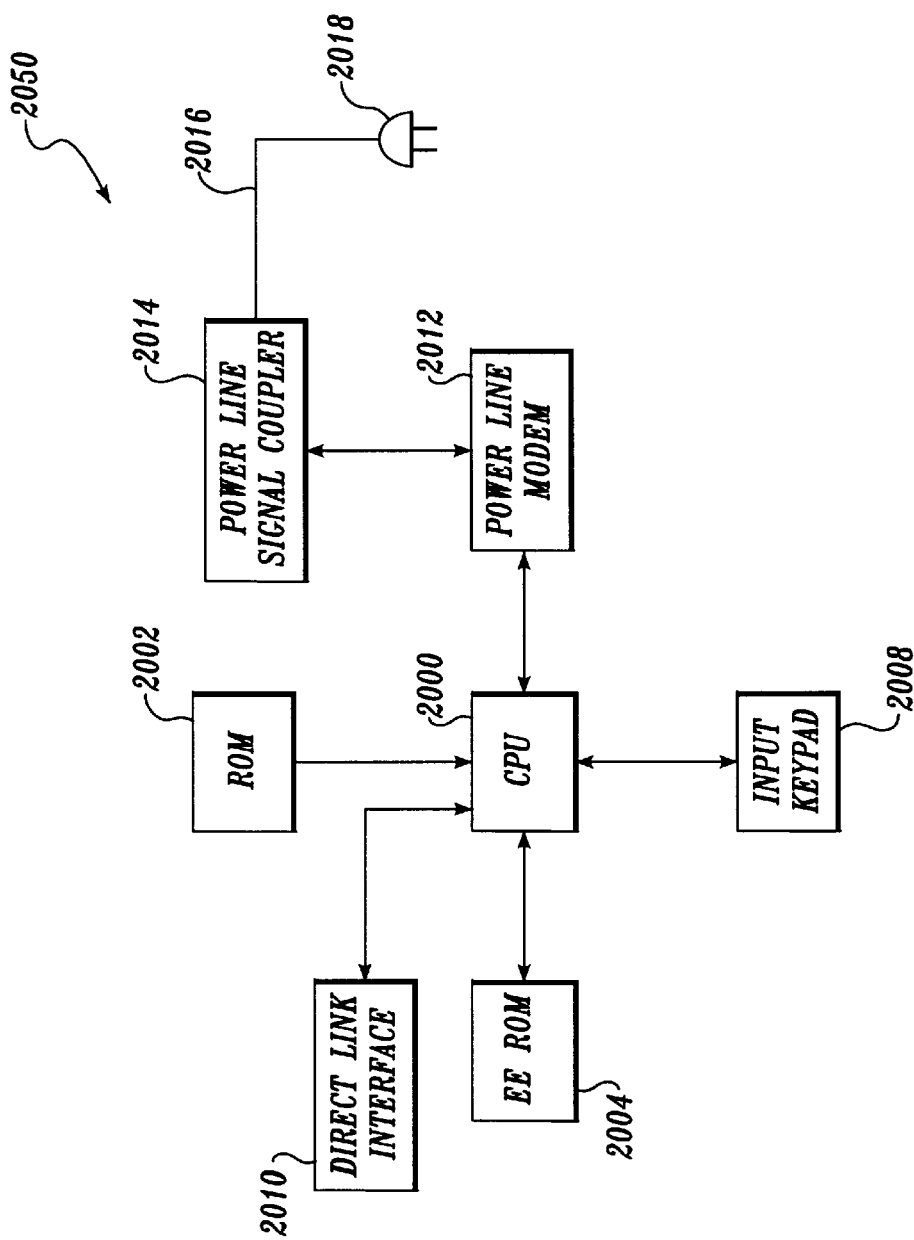
FIG. 20 is a block diagram of the architecture of a direct link slave unit for an electrical appliance having a single operating level.

FIG. 20 illustrates the architecture for a slave unit 2050 having a single operating level. The slave unit 2050 is different from the slave unit 1650 because the slave unit 2050 communicates over a direct link to a master controller or a zone controller during the installation process. The slave unit 2050 includes a CPU 2000, a ROM 2002, an EEROM 2004, an input keypad 2008, and a direct link interface 2010 a powerline modem 2012, a powerline signal coupler 2014, an electrical cable 2016, and an electrical plug 2018. The operation of these components mirror the operation of the components illustrated in FIG. 14.

Figure 21F:
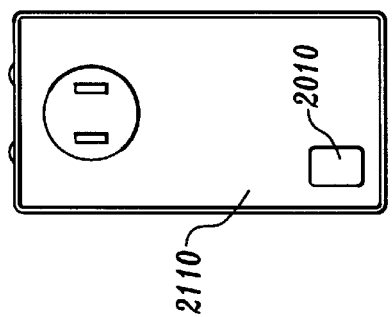
FIGS. 21A–F are views of the slave unit depicted in FIG. 20.
Figure 21C:
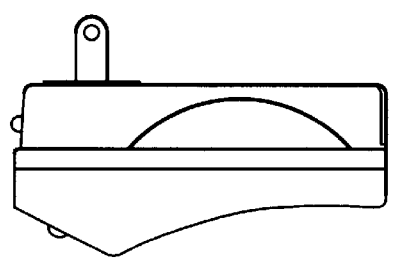
Figure 21D:
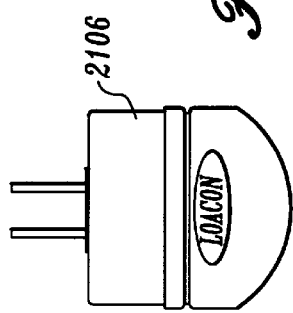
Figure 21A:
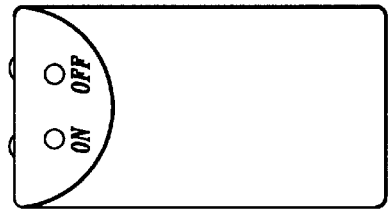
Figure 21E:
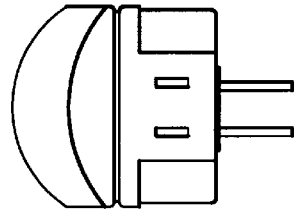
Figure 21B:
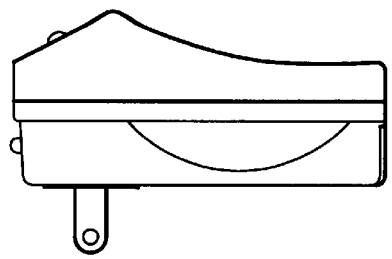

FIGS. 21A–F illustrate the user interface of the slave unit 2050. FIGS. 21A–F are identical to FIGS. 17A–F, with the following exceptions. As shown in FIG. 21F, the slave unit 2050 includes a back surface 2110, including the direct link interface 2010. The slave unit 2050 also includes a top surface 2106, as shown in FIG. 21D. The top surface 2106 does not have an install button, a verify button, or an install LED.

Figure 22:
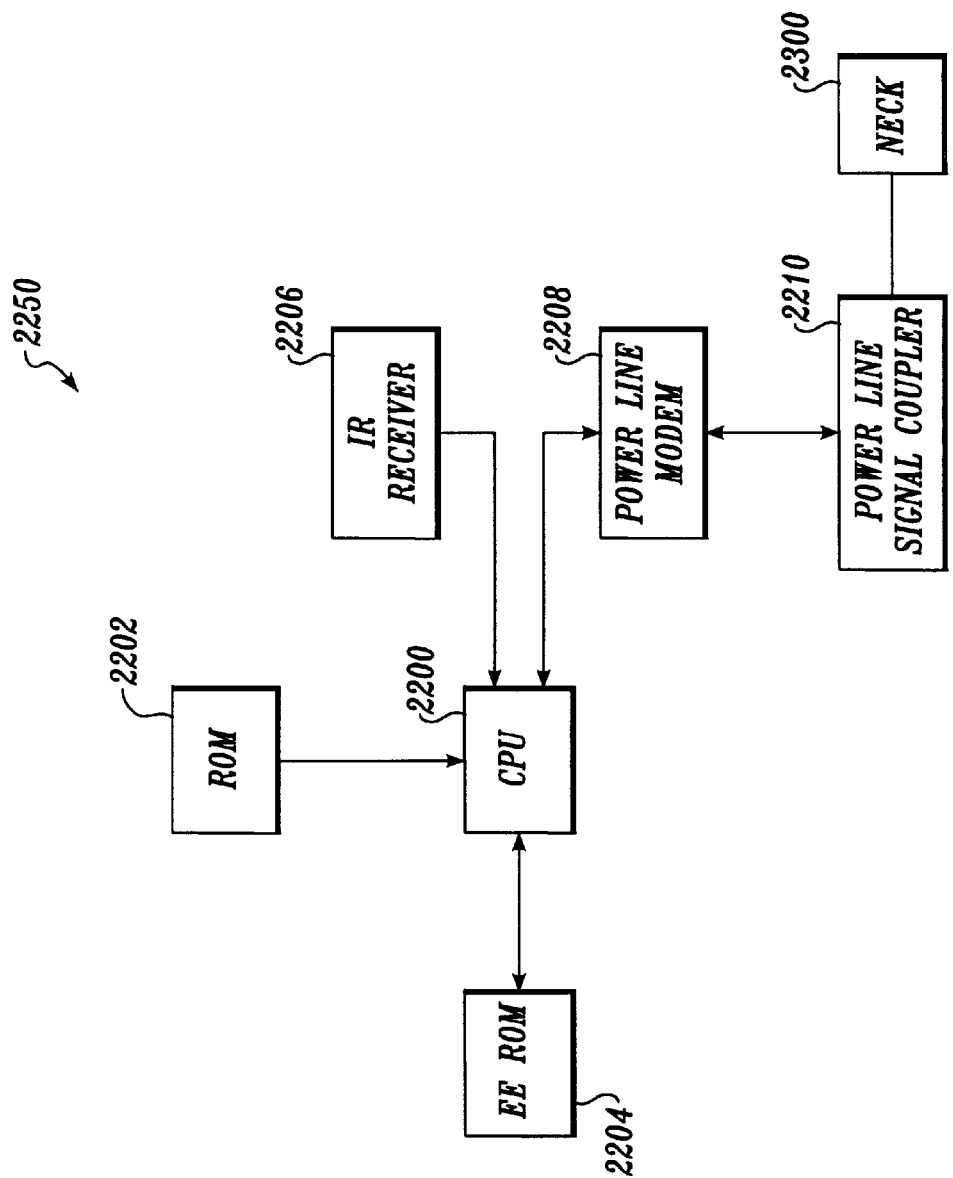
FIG. 22 is a block diagram of the architecture of a ceiling-type slave unit.

FIG. 22 illustrates the architecture of a slave unit 2250 configured for mounting at remote locations including, for example, a ceiling or other relatively inaccessible position. The "ceiling-type" slave unit 2050 includes a CPU 2200, a ROM 2202, an EEROM 2204, an IR receiver 2206, a powerline modem 2208, a powerline signal coupler 2210, and a neck 2300. The IR receiver 2206 receives commands from the IR controller 160 (FIG. 13) during the installation process and the verification process, as discussed in more detail below.

Figure 23:
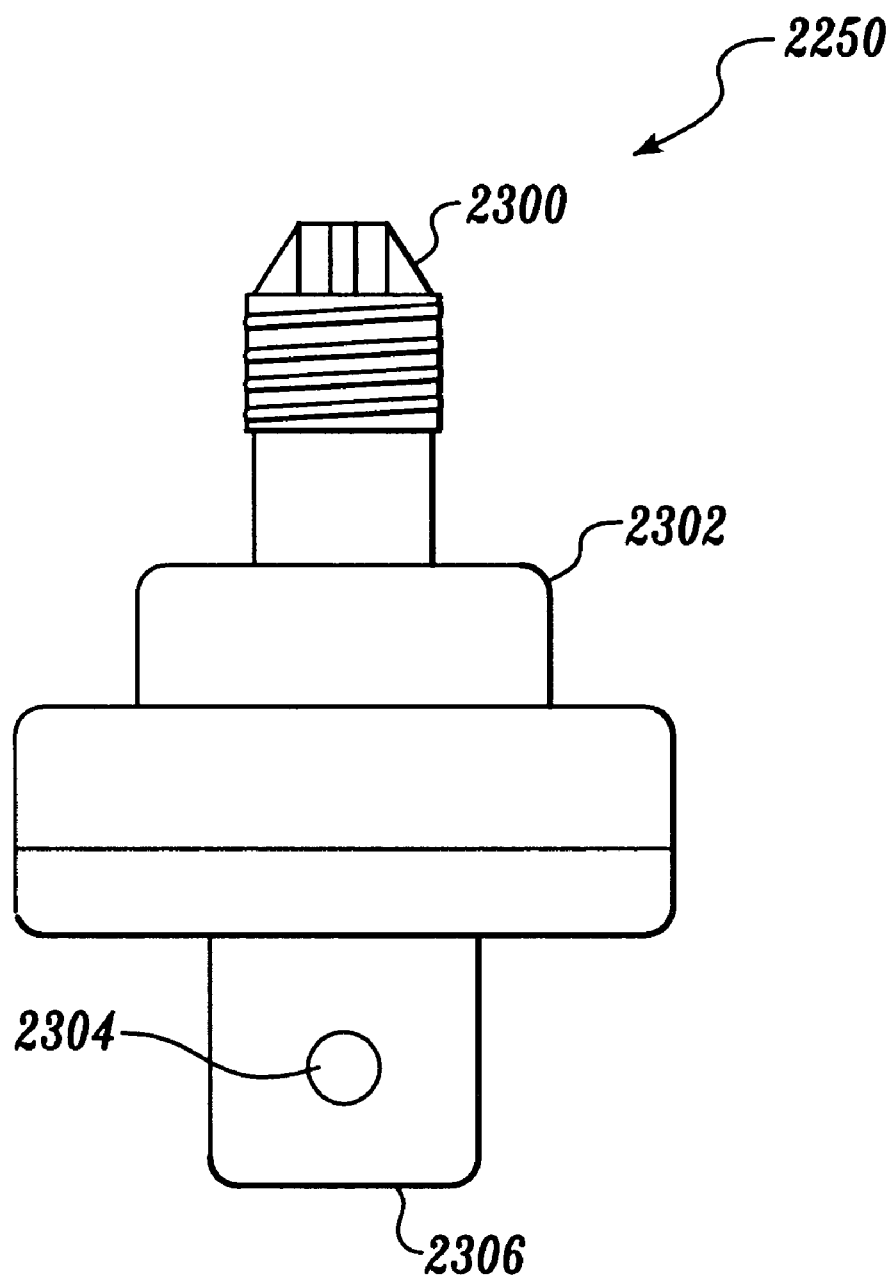
FIG. 23 is a plan view of the slave unit illustrated in FIG. 22.

FIG. 23 illustrates the user interface of the slave unit 2250. The slave unit 2250 is configured to be used for lamps and other lighting equipment designed to receive conventional screw-in light bulbs. The slave unit 2250 includes a neck 2300, a body 2302, an IR receiver 2206, and a socket 2306. The neck 2300 includes a threaded portion to allow the slave unit 2250 to be screwed into the lighting equipment. The neck is connected through the lighting equipment to the powerline. The neck is used to receive and transmit commands over the powerline, enabling remote control of the slave unit's operation. The body 2302 includes a series of ring portions, each ring portion having a different dimension. The body 2302 includes the IR receiver 2206. The socket 2306 is located opposite the neck 2300. The socket 2306 is configured to receive a light bulb for the lighting equipment. The user must use the IR controller 160 to control the installation and verification operations of the slave unit 2250. All other operations of the slave unit 2250 can be controlled by the master controller 100 and the zone controller 110.

The zone controllers 110 must be properly installed with the master controller 100, and the slave units 120 must be properly installed with the master controller 100 or the zone controller. The installation process configures the zone controllers and the slave units to enable communications between and among the master controller, the zone controllers, and the slave units. After proper installation, the master controller, the zone controllers, and the slave units are integrated to perform the multitude of functions available to the user of the LCS 50 in accordance with the present invention, as described above and below.

Figure 24:
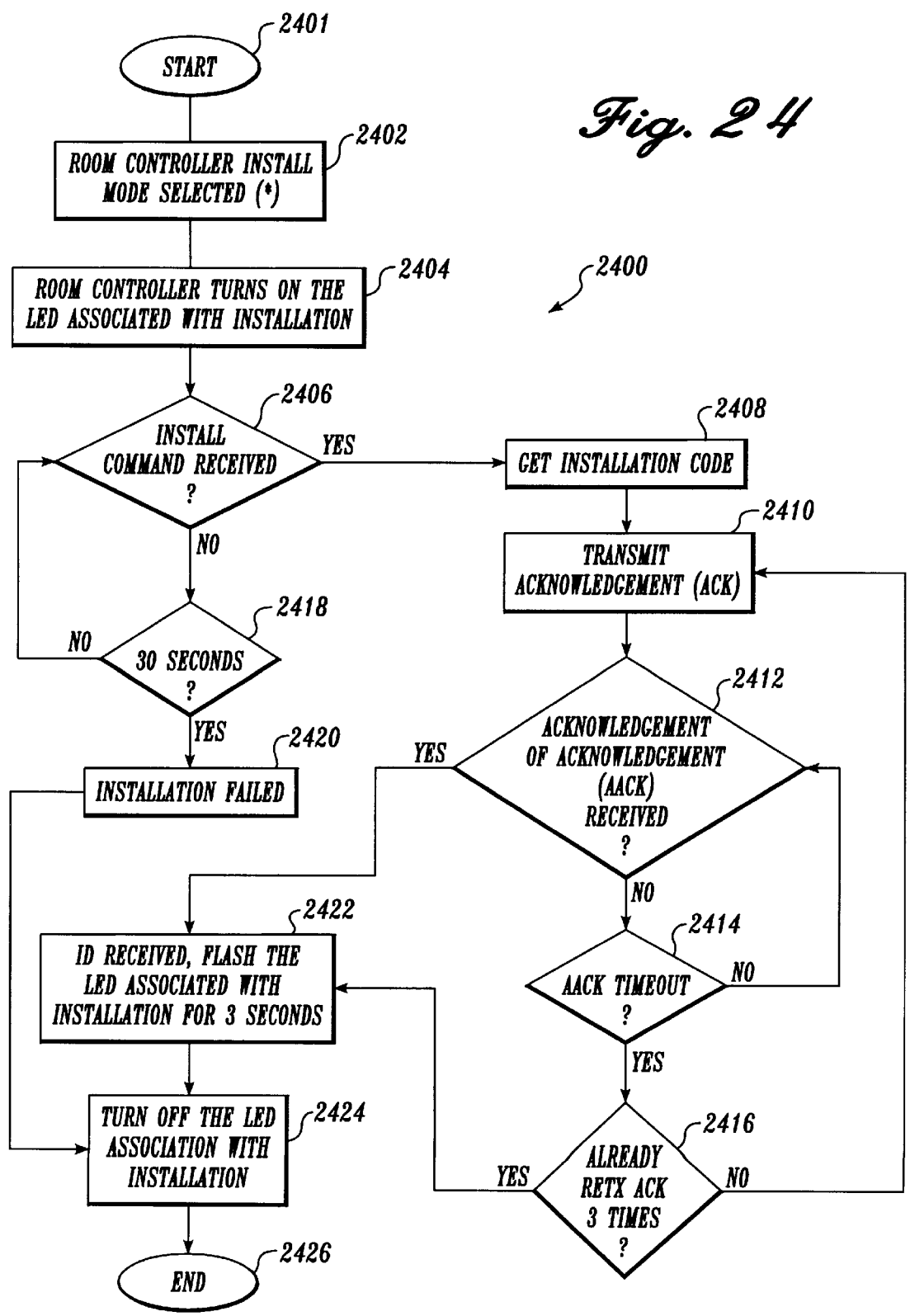
FIG. 24 is a flow diagram of a logic routine of the zone controller during installation by the master controller.

FIG. 24 illustrates a logic routine 2400 employed by the zone controller 110 during installation of the zone controller 110. The installation of the zone controller 110 involves the master controller 100, which is coupled to zone controller 110 over the powerline.

The logic begins at a block 2400 and proceeds to a block 2402 where the installation process is initiated by the user. The user initiates installation of the zone controller 110 by depressing the install button 1260 for more than two seconds, or by depressing the install button 1348 on the IR controller 160. The logic then proceeds to a decision block 2404 where the zone controller 110 turns on the install LED 1258. The install LED 1258 will remain turned on for approximately 30 seconds, indicating to the user that installation has been initiated and is in progress.

At this time, the user, or another designated person, has approximately 30 seconds to depress the install button 356 of the master controller 100 to complete installation of the zone controller 110. The logic proceeds from block 2404 to a decision block 2406. At the decision block 2406, the logic determines whether an install command has been received from the master controller 100, indicating that the install button 356 has been depressed. If the result of the decision block 2406 is positive, the logic proceeds to a block 2408. At the block 2408, the zone controller 110 receives an installation code from the master controller 100. The installation code includes a house code, a zone number, and a unit number to identify the particular zone controller under installation. Because the unit number is only relevant in identifying a slave unit during installation, the unit number will be ignored by the CPU 910. The installation code is stored in the EEROM 914. The logic proceeds from the block 2408 to a block 2410. At the block 2410, the zone controller 110 transmits an acknowledgment signal (ACK) back to the master controller 100. If the master controller 100 receives the acknowledgment signal, the master controller 100 will, in response, transmit an acknowledgment of the received acknowledgment signal. The logic proceeds from the block 2410 to a decision block 2412.

At the decision block 2412, the logic determines whether the acknowledgment of the acknowledgment signal has been received. If the result of the decision block 2412 is positive, the logic proceeds to a block 2422. At the block 2422, the logic determines that the installation code has been properly received. The install LED 1258 is flashed for approximately three seconds. The flashing install LED 1232 indicates to the user that the installation of the zone controller 110 is near completion. The logic proceeds from the block 2422 to a block 2424. At the block 2424, the zone controller 110 turns off the install LED 1258. The turned off install LED 1258 indicates to the user that the installation process has been completed. The logic proceeds from the block 2424 to a block 2426, where the logic ends.

If the logic determines that the acknowledgment of the acknowledgment signal has not been received by the zone controller 110 at the decision block 2412, the logic proceeds to a decision block 2414. At the decision block 2414, the logic determines if a predetermined time interval in which the acknowledgment of the acknowledgment signal must be received has expired. If the result of the decision block 2414 is negative, the logic proceeds to the decision block 2412. If the result of the decision block 2414 is positive, the logic proceeds to a decision block 2416. At the decision block 2416, the logic determines whether the acknowledgment signal has been transmitted to the master controller 110 three times. If the result of the decision block 2416 is positive, then the logic proceeds to the block 2422. If the result of the decision block 2416 is negative, the logic proceeds to the block 2410.

If the result of the decision block 2406 is negative, the logic proceeds to a decision block 2418. At the decision block 2418, the logic determines if 30 seconds have elapsed from the time the install button 1260 of the zone controller 110 was depressed. If the result of the decision block 2418 is negative, the logic proceeds to the decision block 2406. If the result of the decision block 2418 is positive, the logic proceeds to a block 2420. At the block 2420, the logic determines that the installation of the zone controller 110 has failed. The logic then proceeds to the block 2424.

Figure 25:
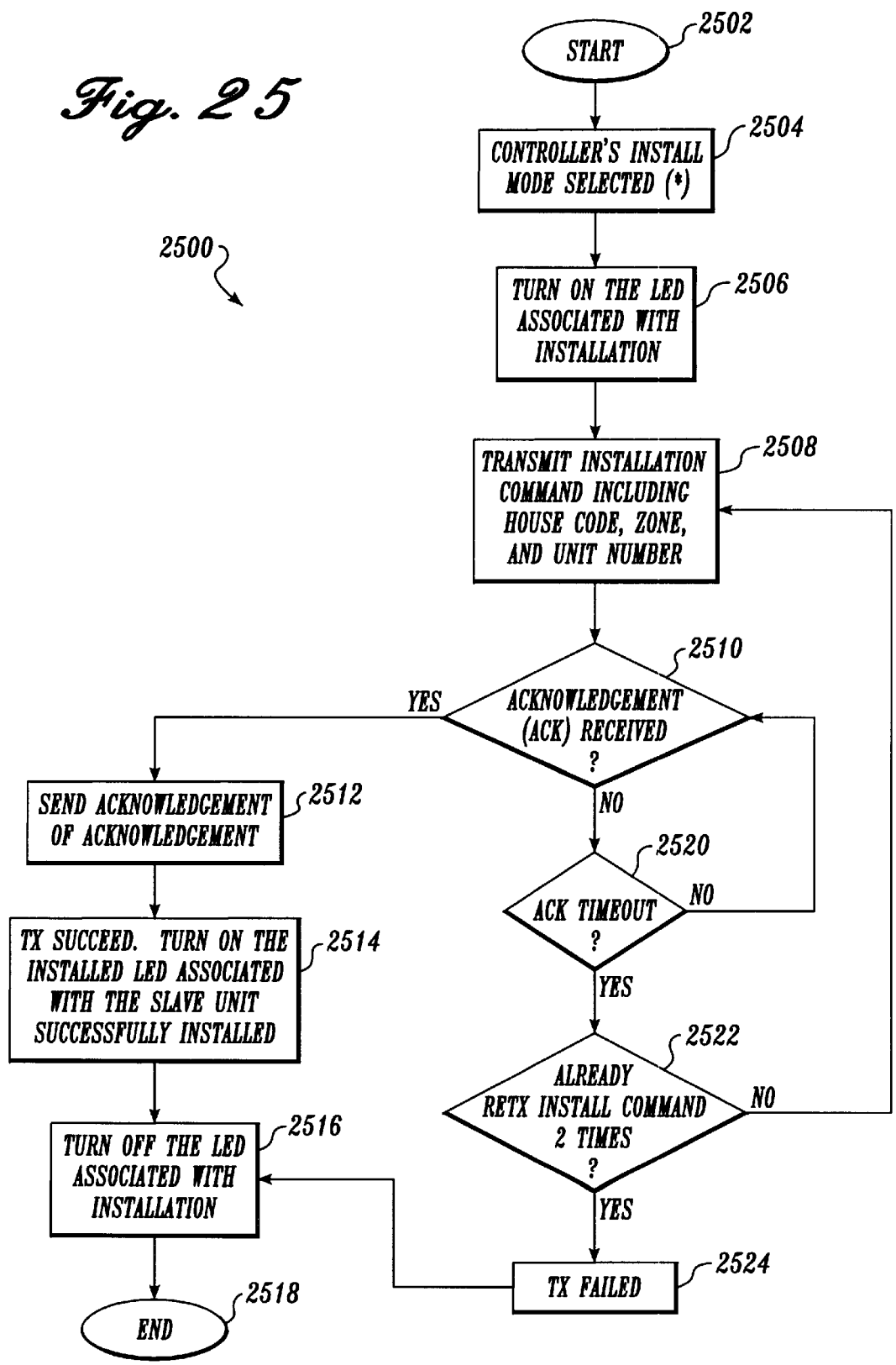
FIG. 25 is a flow diagram of a logic routine of the master controller and the zone controller during the installation of the slave unit.

FIG. 25 illustrates a logic routine 2500 employed by a master controller 100 and a zone controller 110 during the installation of a slave unit 120. The slave unit 120 can be installed by either the master controller 100 or the zone controller 110. The logic begins at a block 2502, where the user has already initiated the installation of the slave unit 120 by providing appropriate commands to the slave unit 120, as discussed below in connection with FIG. 27. The logic then proceeds to a block 2504, where, in response to the depression of buttons on the slave unit 120 to initiate installation, the user, or another designated person, continues the installation process by appropriate commands to the master controller 100 or the zone controller 110. In the case of a master controller 100, the user depresses the appropriate on button 316 or on/off button 332 depending on whether the slave unit is associated with multiple or single operating levels, followed by depression of the install button 356. In the case of a zone controller, the user depresses the install button 1260 followed by the depression of an appropriate one of the buttons of the panel area associated with the slave unit. The logic then proceeds to the block 2504 to a block 2506. At the block 2506, the install LED 354 of the master controller 100 or the install LED 1258 of the zone controller 110, whichever is installing the slave unit, is turned on. The logic then proceeds from the block 2506 to a block 2508. At the block 2508, the master controller 100 or the zone controller 110 transmits to the slave unit the installation code including the house code, zone number, and the unit number.

The logic then proceeds from the block 2508 to a decision block 2510. Upon the receipt of the installation code from the master controller 100 or the zone controller 110, the slave unit to be installed will issue an acknowledgment signal back to the master controller 100 or the zone controller 110. At the decision block 2510, the logic determines if the acknowledgment signal was received by the master controller 100 or the zone controller 110. If the result of the decision block 2510 is positive, the logic proceeds to a block 2512. At the block 2512, the master controller 100 or the zone controller 110 transmits an acknowledgment of the acknowledgment signal to the slave unit 120. The logic then proceeds from the block 2512 to a block 2514. At the block 2514, the master controller 100 or the zone controller 110 determines that the transmission of the acknowledgment of the acknowledgment signal has been completed. Accordingly, if the master controller 100 is performing the installation, the installed LED 34 of the master controller 100 associated with the slave unit 120 is turned on to indicate successful installation of the slave unit. The logic then proceeds from the block 2514 to a block 2516. At the block 2516, in the case of the master controller 100 performing the installation, the install LED 354 is turned off and, in the case of the zone controller 110, the install LED 1258 is turned off. The logic then proceeds from the block 2516 to the end of the logic at a block 2518.

If the result of the decision block 2510 is negative, the logic proceeds to a decision block 2520. At the decision block 2520, the logic determines if a time interval in which the acknowledgment signal must be received has elapsed. If the result of the decision block 2520 is negative, the logic proceeds to the decision block 25 10. If the result of the decision block 2520 is positive, the logic proceeds to a decision block 2522. At the decision block 2522, the logic determines if the installation code has already been transmitted to the slave unit 120 two times. If the result of the decision block 2522 is positive, the logic proceeds to a block 2524. At the block 2524, the logic determines that the transmission of the installation code has failed, and the logic proceeds to the block 2516. If the result of the decision block 2522 is negative, the logic proceeds to the block 2508.

Figure 26:
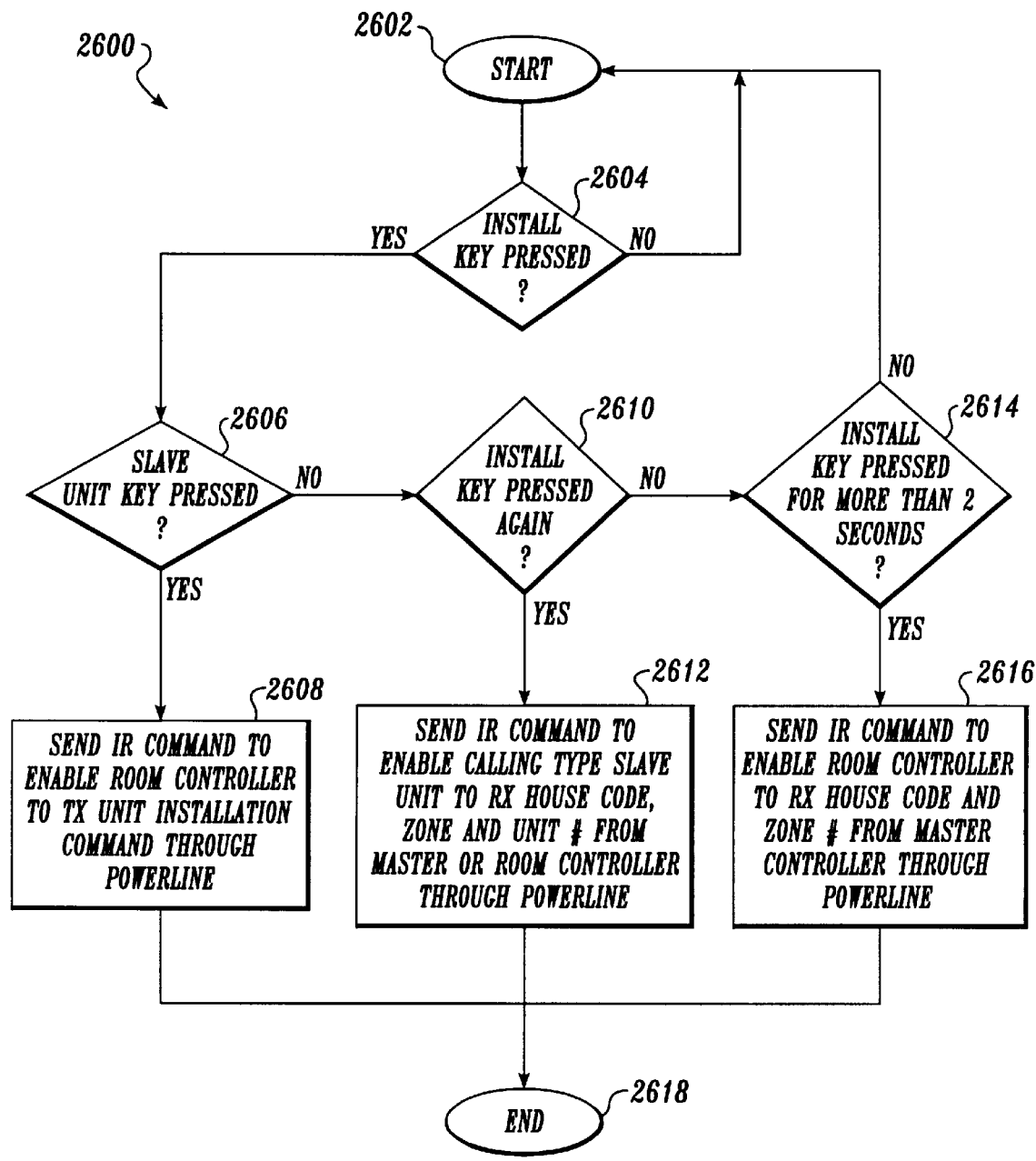
FIG. 26 is a flow diagram of a logic routine of the IR controller during the installation of the slave unit and the zone controller.

FIG. 26 illustrates a logic routine 2600 of the IR controller 160 during the installation of a slave unit 120 and a zone controller 110. The logic begins at a block 2602 and proceeds to a decision block 2604. At the decision block 2604, the IR controller 160 determines if the install button 1348 has been depressed. If the result of the decision block 2604 is negative, the logic proceeds to the block 2602. If the result of the decision block 2604 is positive, the logic proceeds to a decision block 2606. The depression of the install button 1348 initiates the installation process. At the decision block 2606, the logic determines if a button corresponding to a slave unit has been depressed. In the case of a slave unit associated with the dimmer region 1304, such a button could be the on button 1334, the off button 1336, the bright button 1338 or the dim button 1340. If the result of the decision block 2606 is positive, the logic proceeds to a block 2608. At the decision block 2608, the logic determines that a non-ceiling type slave unit is to be installed through the use of the IR controller 160. The logic causes the IR controller 160 to transmit a command to the zone controller 110. The command causes the zone controller 110 to transmit the installation code, including the house code, zone number, and unit number, to the slave unit to be installed. In this event, the install button of the non-ceiling type slave unit to be installed has already been depressed. The logic proceeds from the block 2608 to a block 2618, where the logic ends.

If the result of the decision block 2606 is negative, the logic proceeds to a decision block 2610. At the decision block 2610, the logic determines if the install button 1348 has been depressed again. If the result of the decision block 2610 is positive, the logic proceeds to a block 2612. The depression of the install button 1348 more than once indicates that the user wishes to install a ceiling type slave unit through the use of the IR controller 160. At the block 2612, the IR controller 160 transmits a command to the ceiling type slave unit, enabling the ceiling type slave unit to later receive an installation code from a master controller 100 or a zone controller 110, depending on whether the master controller 100 or the zone controller 110 is selected to install the ceiling-type slave unit. The logic proceeds from the block 2612 to the block 2618.

If the result of the decision block 2610 is negative, the logic proceeds to a decision block 2614. At the decision block 2614, the logic determines if the install button 1348 has been depressed for more than two seconds. If the result of decision block 2614 is negative, the logic proceeds to the block 2602. If the result of the decision block 2614 is positive, the logic proceeds to a block 2616. At the decision block 2616, the logic determines that the zone controller 110 is to be installed through the use of the IR controller 160. Accordingly, the IR controller 160 transmits a command to the zone controller 110, enabling the zone controller 110 to receive the installation code from the master controller 100 selected to install the zone controller 110. The logic proceeds from the block 2616 to the block 2618.

Figure 27:
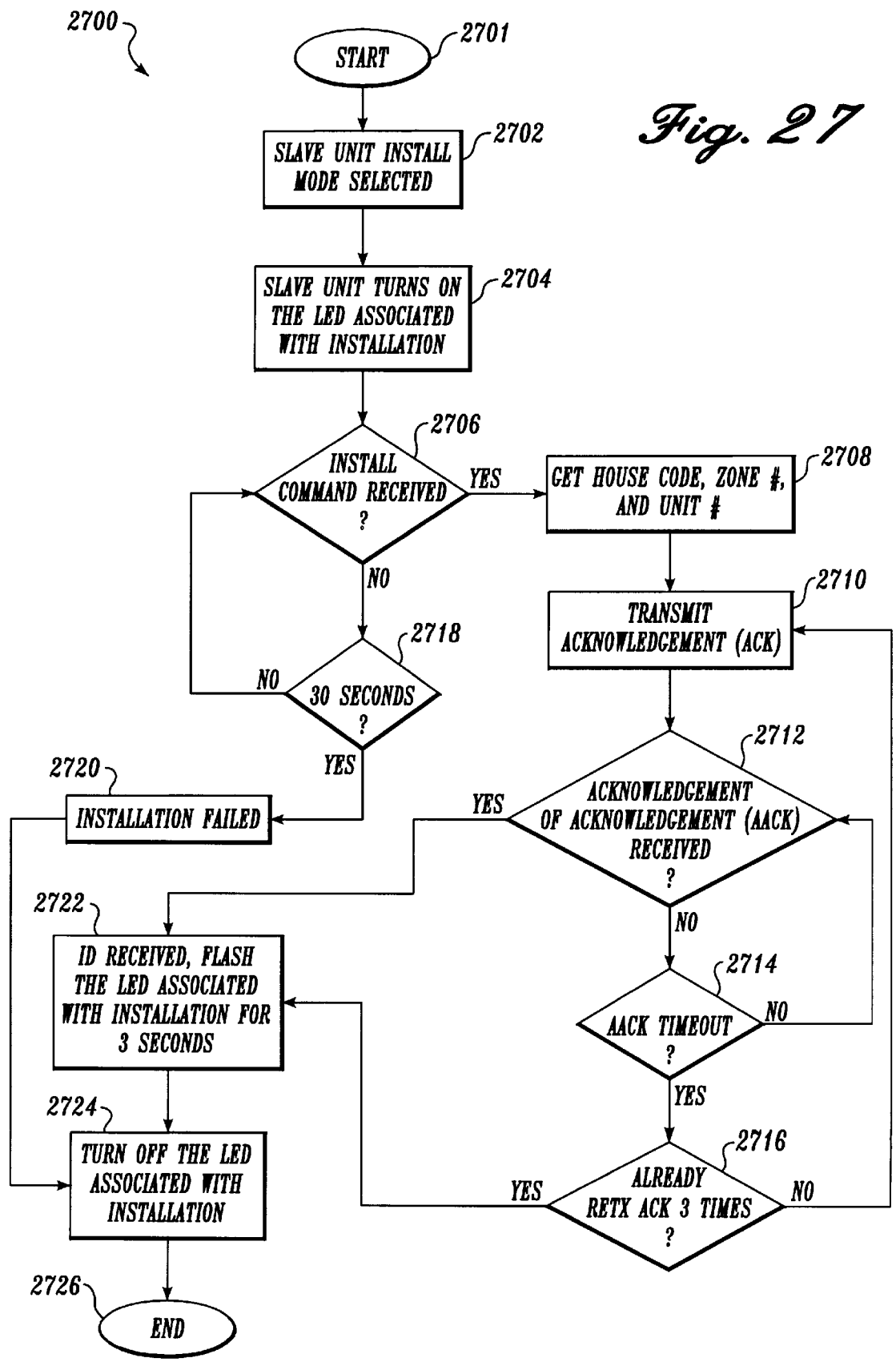
FIG. 27 is a flow diagram of a logic routine of the slave unit during the installation of the slave unit.

FIG. 27 illustrates a logic routine 2700 of the slave unit 120 during its installation. The logic begins at a block 2701 and proceeds to a block 2702. At the block 2702, the slave unit 120 receives a command to initiate its installation. In the case of the slave units having multiple operating levels or single operating levels, the user initiates installation by depressing the appropriate install button, i.e., install button 1522 or install button 1722. For the ceiling-type slave unit 2250, the user initiates installation by depressing the install button 1348 on the IR controller 160. The logic then proceeds from the block 2702 to a block 2704. At the block 2704, the install LED 1526 or the install LED 1726, if the slave unit has any, is turned on to indicate that the installation process has been initiated and is in progress. The logic then proceeds from the block 2704 to a decision block 2706. The decision block 2706 determines if an install command has been received. The install command is transmitted by appropriately depressing the install button 356 of the master controller 100, the install button 1260 of the zone controller 110, or the install button 1348 of the IR controller 160, depending on whether the master controller, zone controller, or IR controller is selected to install the slave unit 120.

If the result of the decision block 2706 is positive, the logic proceeds from the decision block 2706 to the block 2708. At the block 2708, the slave unit 120 receives the installation code corresponding to the slave unit 120. The installation code is stored in the EEROM 1404, 1604, 1804, 2004, or 2204. The logic then proceeds from the block 2708 to a block 2710. At the block 2710, the slave unit 120 transmits an acknowledgment signal to the master controller 100 or the zone controller 110 involved in the installation. The logic then proceeds from the block 2710 to a decision block 2712. At the decision block 2712, the logic determines if the acknowledgment of the acknowledgment signal sent by the master controller 100 or the zone controller 110 has been received by the slave unit 120. If the result of the decision block 2712 is positive, the logic proceeds to a block 2722. At the block 2722, the install LED 1526 or the install LED 1726 is flashed for three seconds, indicating that the slave unit 120 has properly received its installation code. The logic then proceeds from the block 2722 to a block 2724. At the block 2724, the slave unit turns off the install LED 1526 or the install LED 1726. The logic then proceeds from the block 2724 to a block 2726, where the logic ends.

If the result of the decision block 2706 is negative, the logic proceeds to a decision block 2718. At the decision block 2718, the slave unit determines if the install button of the master controller 100, the zone controller 110, or the IR controller 160 has been depressed within 30 seconds of the time that the user initiated installation at the block 2702. If the result at the decision block 2718 is negative, the logic proceeds to the decision block 2706. If the result of the decision block 2718 is positive, the logic proceeds to a block 2720. At the block 2720, the slave unit determines that installation has failed, because the install button of the master controller 100, the zone controller 110, or the IR controller 160 was not depressed within the allotted time. The logic proceeds to the block 2724.

If the result at the decision block 2712 is negative, the logic proceeds to a decision block 2714. At the decision block 2714, the slave unit 120 determines whether a predetermined time interval after the transmission of the acknowledgment signal at the block 2710 has elapsed before the acknowledgment of the acknowledgment signal has been sent by the master controller 100 or the zone controller 110 and received by the slave unit 120. If the result at the decision block 2714 is negative, the logic proceeds to the decision block 2712. If the result of the decision block 2714 is positive, the logic proceeds to a decision block 2716. At the decision block 2716, the logic determines if the acknowledgment signal has been already been transmitted to the master controller 100 or the zone controller 110 three times. If the result at the decision block 2716 is negative, the logic proceeds to the block 2710. If the result at the decision block 2716 is positive, the logic proceeds to the block 2722.

Along with the capability to install zone controllers and slave units, the LCS 50 in accordance with the present invention also provides the capability to verify that a zone controller or a slave unit has been properly installed. Because the LCS 50 in accordance with the present invention uses the power line as a shared communications medium, a particular master controller, zone controller, or slave unit may sometimes receive installation information from the powerline that was not intended for it. The undesirable receipt of such information obstructs the installation procedure, precluding proper installation. Because a direct link poses no threat of carrying stray signals, no verification process is necessary for those slave units coupled over a direct link to a master controller or a zone controller.

Figure 28:
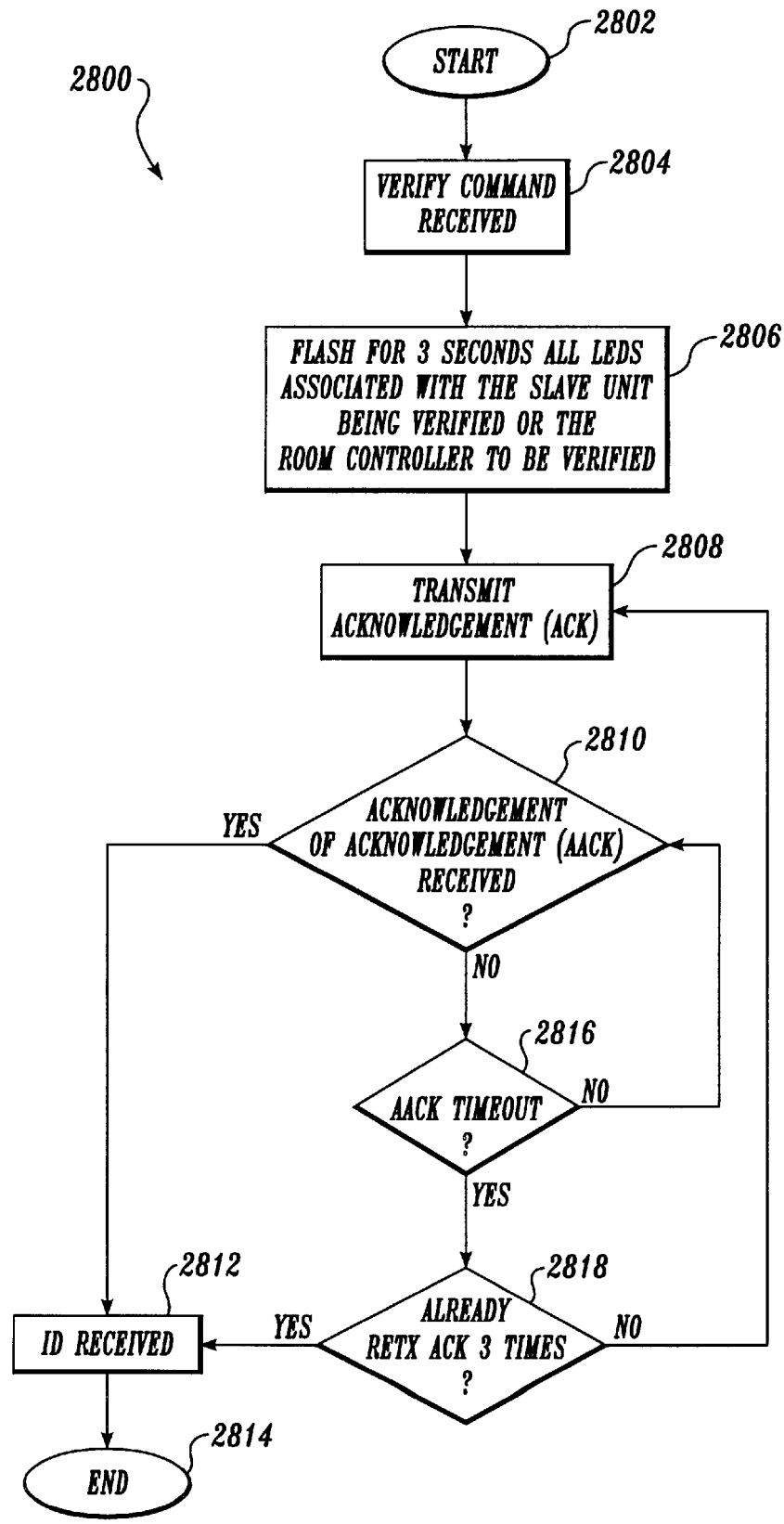
FIG. 28 is a flow diagram of a logic routine of the master controller to verify the installation of the slave unit or the zone controller.

FIG. 28 illustrates a logic routine 2800 of the master controller 100 during a verification process to confirm that a slave unit or a zone controller was properly installed over the powerline. The logic begins at a block 2502, and proceeds to a block 2804. At the block 2804, a verify command is received. The verify command is initiated by the user's depression of the verify button of the slave unit or the zone controller. The logic proceeds from the block 2804 to a block 2806. At the block 2806, the master controller 100 flashes all of the LEDs on the panel associated with the slave unit being verified or, in the case of a zone controller to be verified, all of the LEDs associated with the corresponding zone. The flashing LEDs indicate to the user that the verification process is in progress. The logic proceeds from the block 2806 to a block 2808. At the block 2808, the master controller 100 transmits an acknowledgment signal to the slave unit 120 or the zone controller 110. The acknowledgment signal indicates that the master controller 100 has received the verify command. Upon receipt of the acknowledgment signal, the slave unit 120 or the zone controller 110 will transmit an acknowledgment of the acknowledgment signal to the master controller 100. The logic proceeds from the block 2808 to a decision block 2810. At the decision block 2810, the logic determines if the acknowledgment of the acknowledgment signal sent by the slave unit 120 or the zone controller 110 was received by the master controller 100. If the result of the decision block 2810 is positive, the logic proceeds to a block 2812. At the block 2812, the master controller determines that the slave unit 120 or the zone controller 110 has properly received the installation code. Accordingly, proper installation of the slave unit 120 or the zone controller 110 has been achieved. The logic proceeds from the block 2812 to a block 2814, where the logic ends.

If the result of a decision block 2810 is negative, the logic proceeds to a decision block 2816. At the decision block 2816, the logic determines if a predetermined time interval has elapsed after the time the acknowledgment signal was first transmitted by the master controller 100 to the time when the acknowledgment of the acknowledgment signal was sent by the slave unit 120 or the zone controller 110 and received by the master controller 100. If the result of the decision block 2816 is negative, the logic proceeds to the decision block 2810. If the result of the decision block 2816 is positive, the logic proceeds to a decision block 2818. At the decision block 2818, the master controller determines if the acknowledgment signal has been transmitted three times. If the result of the decision block 2818 is negative, the logic proceeds to the block 2808. If the result of the decision block 2818 is positive, the logic proceeds to the block 2812.

Figure 29:
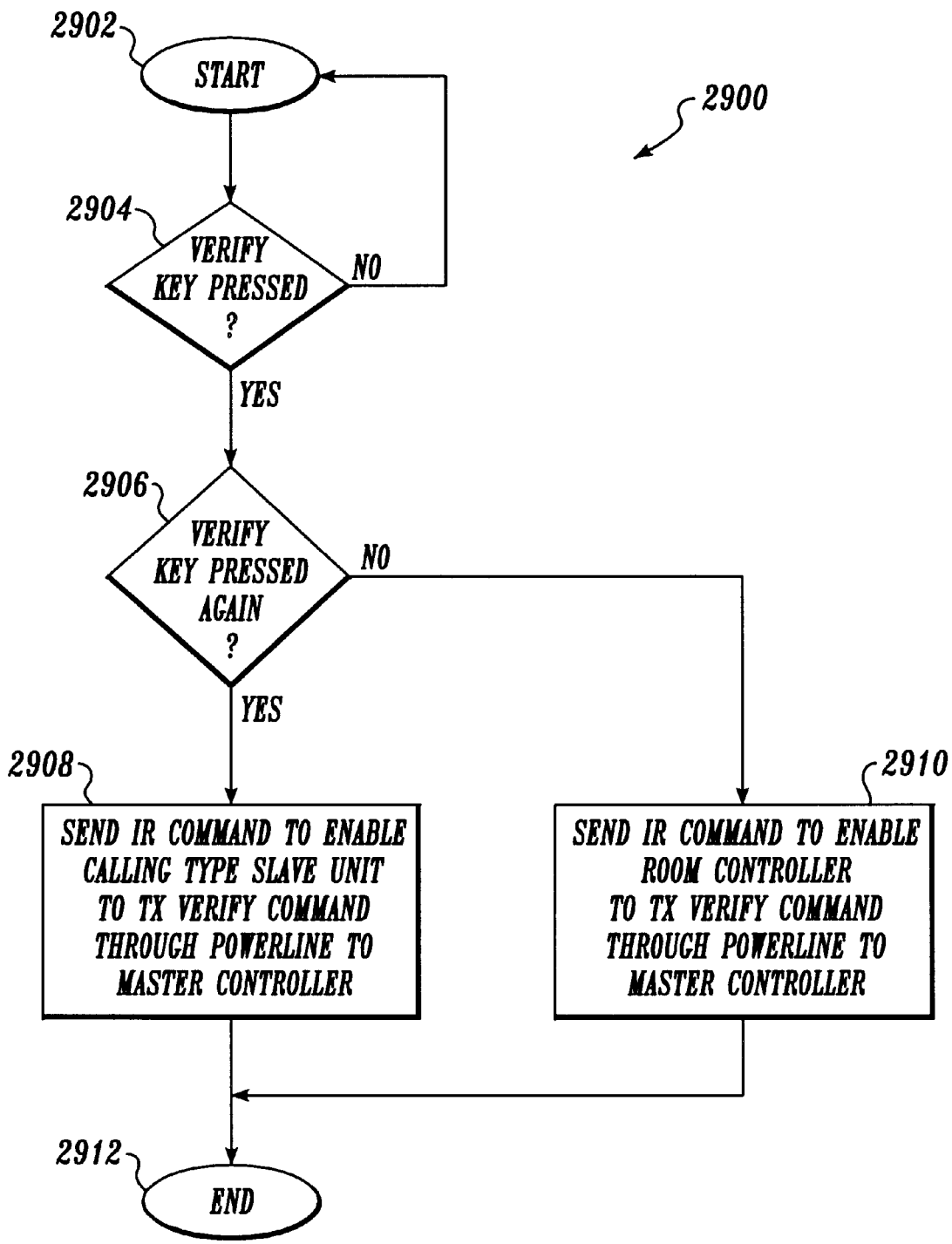
FIG. 29 is a flow diagram of a logic routine of the IR controller to verify the installation of the ceiling-type slave unit and the zone controller.

FIG. 29 illustrates a logic routine 2900 of the IR controller 160 during the verification process to confirm that a ceiling type slave unit and a zone controller have been properly installed. The logic begins at a block 2902, and proceeds to a decision block 2904. At the decision block 2904, the logic determines if the verify button 1350 has been depressed. If the result of the decision block 2904 is negative, the logic proceeds to the block 2902. If the result of the decision block 2904 is positive, the logic proceeds to a decision block 2906. At the decision block 2906, the logic determines if the verify key has been depressed again. If the result of the decision block is positive, the logic proceeds to a block 2908. At the block 2908, the logic determines that the installation of a ceiling-type slave unit is to be verified. Accordingly, the IR controller transmits a command to the ceiling type slave unit, enabling it to, in turn, transmit a verify command, including the house code, zone number, and unit number, to the master controller 100. The logic proceeds from the block 2908 to a block 2912, where the logic ends. If the result of the decision block 2906 is negative, the logic proceeds to a block 2910. At the block 2910, the logic determines that the installation of the zone controller 110 is to be verified. Accordingly, the IR controller 160 transmits a command to the zone controller 110. The command enables the zone controller 110 to transmit a verify command, including the house code, zone number, and unit number, over the power line to the master controller 100. The logic proceeds from the block 2910 to the block 2912.

Figure 30A:
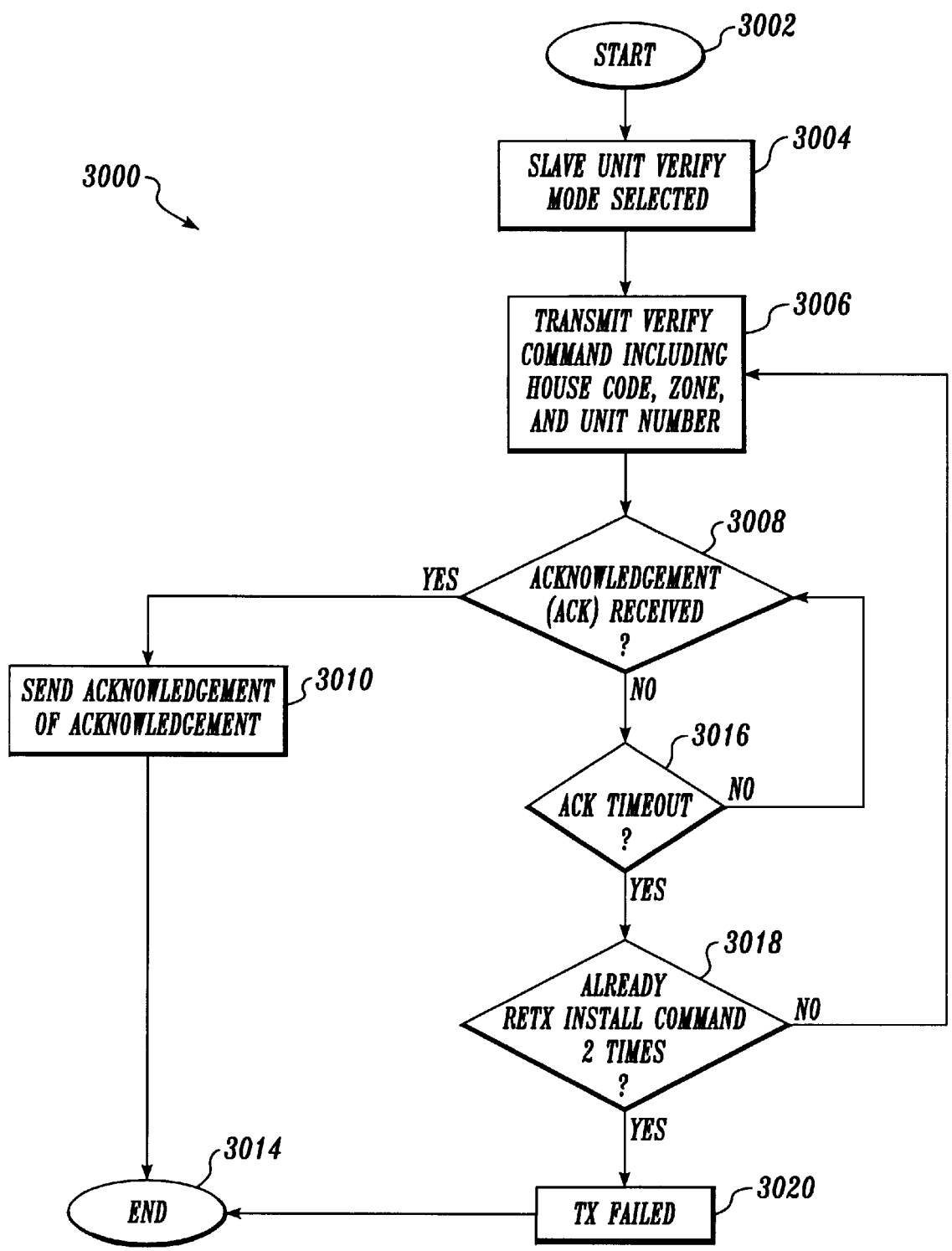
FIG. 30A is a flow diagram of a logic routine of the slave unit to verify the installation of the slave unit.

FIG. 30A illustrates a logic routine 3000 of a slave unit, both the ceiling type and the non-ceiling type, during a verification process to confirm that the slave unit was properly installed. The logic begins at a block 3002, and proceeds to a block 3004. At the block 3004, the user initiates the verification process by an appropriate verify command to the slave unit. For slave units having multiple operating levels or single operating levels, the user applies the verify command by depressing the verify button 1524. In the case of a ceiling-type slave unit, the user initiates the verification process by depressing the verify button 1350 of the IR controller 160. The verify command activates the verification process in the slave unit 120. The logic proceeds from the block 3004 to a block 3006. At the block 3006, the slave unit transmits the verify command to the zone controller or the master controller involved in the verification process. The verify command includes the installation code. The logic proceeds from the block 3006 to a decision block 3008. Upon receipt of the verify command, the master controller 100 or the zone controller 110 will transmit an acknowledgment signal back to the slave unit 120. At the decision block 3008, the logic determines if the acknowledgment signal transmitted by the zone controller 110 or the master controller 100 has been received. If the result of the decision block 3008 is positive, the logic proceeds to a block 3010. At the block 3010, the logic sends an acknowledgment of the acknowledgment signal to the zone controller or the master controller. The logic proceeds from the block 3010 to a block 3012. At the block 3014, the logic ends.

If the result at the decision block 3008 is negative, the logic proceeds to a decision block 3016. At the decision block 3016, the logic determines if a predetermined time interval has elapsed from the time the verification process is initiated at the block 3004 to when the acknowledgment is received by the slave unit from the master controller 100 or the zone controller 110. If the result of the decision block 3016 is negative, the routine proceeds to the decision block 3008. If the result at the decision block 3016 is positive, the logic proceeds to a decision block 3018. At the decision block 3018, the logic determines if the slave unit has transmitted the verify command two times. If the result of the decision block 3018 is negative, the logic proceeds to the block 3006. If the result of the decision block 3018 is positive, the logic proceeds to a block 3020. At the block 3020, the logic determines that the installation of the slave unit failed. The logic then proceeds from the block 3020 to the block 3014.

Figure 30B:
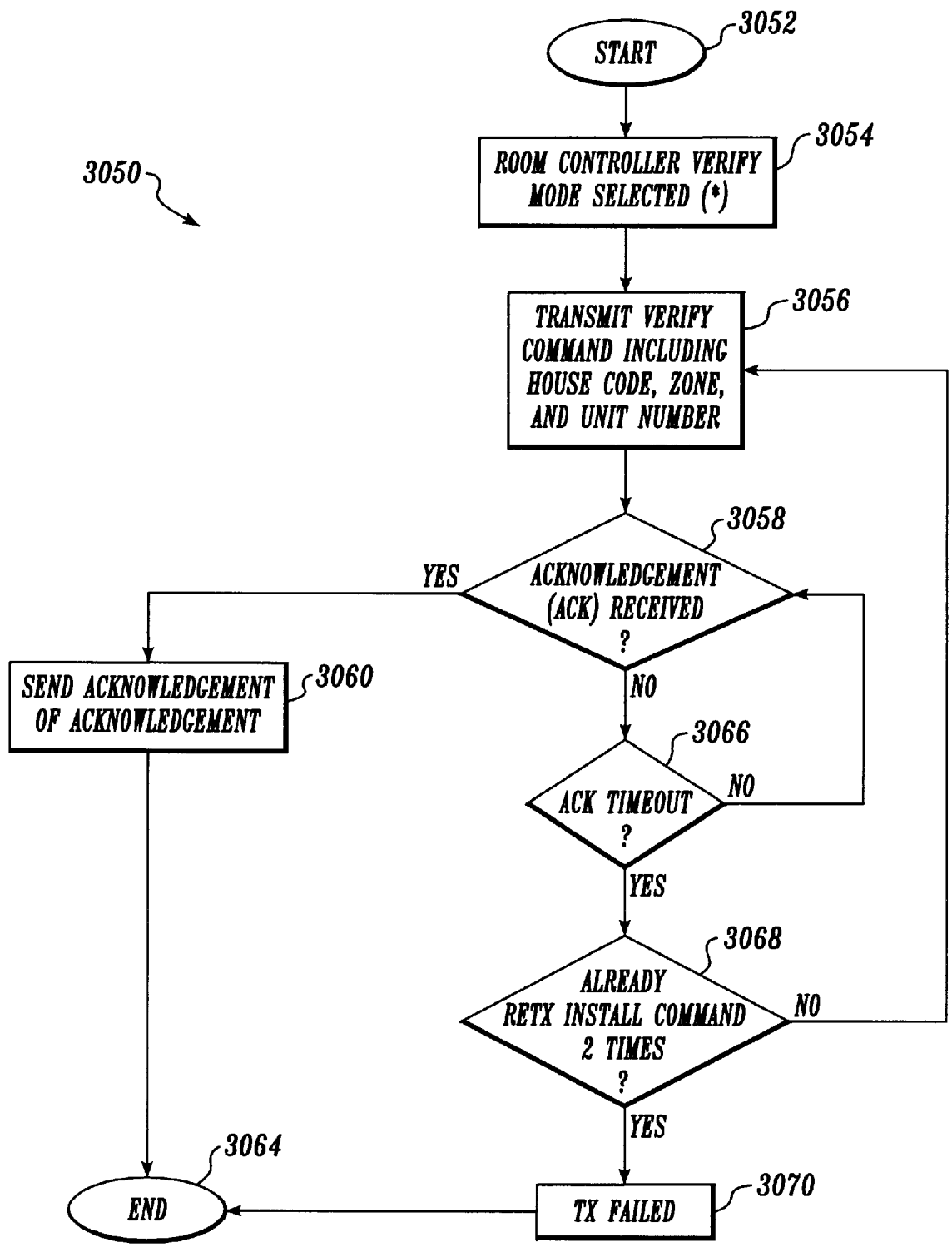
FIG. 30B is a flow diagram of a logic routine of the zone controller to verify the installation of the zone controller.

FIG. 30B illustrates a logic routine 3050 of a zone controller 110 during a verification process to confirm that the zone controller 110 was properly installed. The logic begins at a block 3052, and proceeds to a block 3054. At the block 3054, the user initiates the verification process by an appropriate verify command to the zone controller 110. The user applies the verify command by depressing the verify button 1262. The verify command activates the verification process in the zone controller 110. The logic proceeds from the block 3054 to a block 3056. At the block 3056, the zone controller 110 transmits the verify command to the master controller involved in the verification process. The verify command includes the installation code. The logic proceeds from the block 3056 to a decision block 3058. Upon receipt of the verify command, the master controller 100 will transmit an acknowledgment signal back to the zone controller 110. At the decision block 3058, the logic determines if the acknowledgment signal transmitted by the master controller 100 has been received. If the result of the decision block 3058 is positive, the logic proceeds to a block 3060. At the block 3060, the logic sends an acknowledgment of the acknowledgment signal to the master controller. The logic proceeds from the block 3060 to a block 3064, where the logic ends.

If the result at the decision block 3058 is negative, the logic proceeds to a decision block 3066. At the decision block 3066, the logic determines if a predetermined time interval has elapsed from the time the verification process is initiated at the block 3054 to when the acknowledgment is received by the zone controller from the master controller 100. If the result of the decision block 3066 is negative, the routine proceeds to the decision block 3058. If the result at the decision block 3066 is positive, the logic proceeds to a decision block 3068. At the decision block 3068, the logic determines if the zone controller has transmitted the verify command two times. If the result of the decision block 3068 is negative, the logic proceeds to the block 3056. If the result of the decision block 3068 is positive, the logic proceeds to a block 3070. At the block 3070, the logic determines that the installation of the zone controller failed. The logic then proceeds from the block 3070 to the block 3064.

In certain circumstances, the intended installation of the zone controller or a slave unit will be precluded by the transmission and receipt of interfering signals within the LCS 50. The presence of the interfering signals results from the use of the power line as a common transmission medium among master controllers, zone controllers, and slave units. During the installation of, for example, a slave unit, the slave unit will become communicatively coupled to the power line. Although only communication between the slave unit and the corresponding zone controller or master controller participating in the installation is desired, the slave unit may receive interfering information over the power line from other zone controllers and master controllers. The receipt of such interfering signals by the slave units potentially corrupts the installation process, as described below.

Figure 31A:
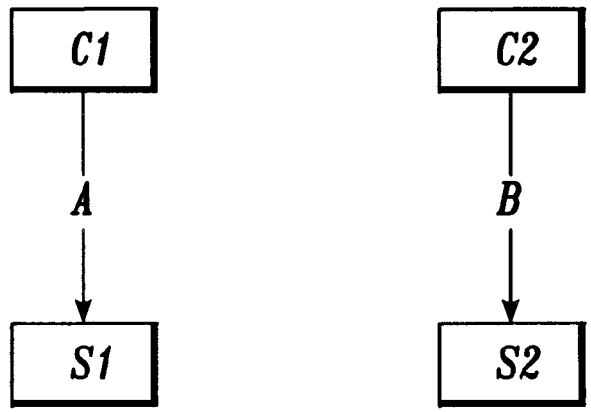

To prevent the potentially disruptive effects of interfering signals, the present invention implements the verification techniques discussed above to assure that installation of the zone controllers and the slave units have been properly accomplished. The LCS in accordance with the present invention uses the verification techniques in connection with a process commonly referred to as Carrier Sense Multiple Access with Collision Detection (CSMA/CD). The general principle of CSMA/CD is well known to those skilled in the communications art and others. FIGS. 31A–F illustrate how the present invention allows the user to properly install modules despite the presence of interfering signals. FIGS. 31A–F relate to a situation where a collision is detected by the LCS. FIG. 31A depicts a master controller or a zone controller, designated C1, that is to install a slave unit, designated S1. The controller C1 is operated by a user U1. The installation of the slave unit S1 is complete when it receives the installation code A. A master controller or a zone controller, designated C2, is to install a slave unit, designated S2. The controller C2 is operated by a user U2. Installation of the slave unit S2 is complete when the installation code B is transmitted to the slave unit S2. The slave unit S1 and the slave unit S2 are coupled to their associated controllers over a common powerline.

Figure 31B:
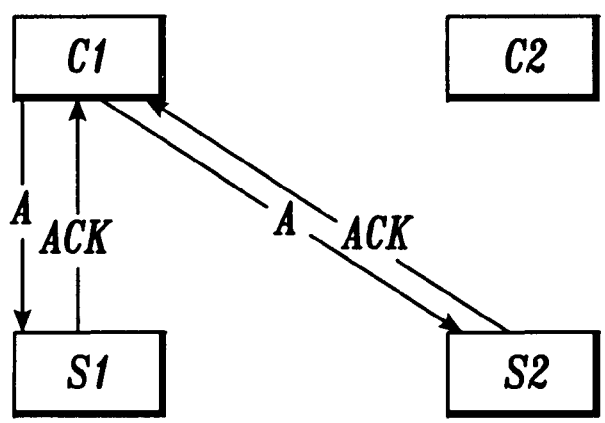

If the installation of the slave unit S1 and the slave unit S2 is substantially simultaneous, the installation code A and the installation code B will be transmitted at the same time. The potentially disruptive occurrence of two installation codes transmitted simultaneously over the common powerline are commonly referred to as a "collision". During installation, the controller C2 will detect the collision and, to prevent improper installation of the slave units, postpone, i.e., "back off", for a period of time the installation of the slave unit S2. At a later time, the controller C2 will retransmit the installation code B. As shown in FIG. 31B, because the controller C2 has backed off, the slave unit S1 and the slave unit S2 will both receive the installation code A from the controller C1. The slave unit S1 and the slave unit S2 receive the installation code A because both are coupled to the powerline carrying the installation code A. Upon receipt of the installation code A, the slave unit S1 and the slave unit S2 each transmit an acknowledgment signal to the controller C1. Upon receipt of the acknowledgment signal, the controller C1 turns on the installed LED associated with the slave unit S1.

Figures 31C, 31D:
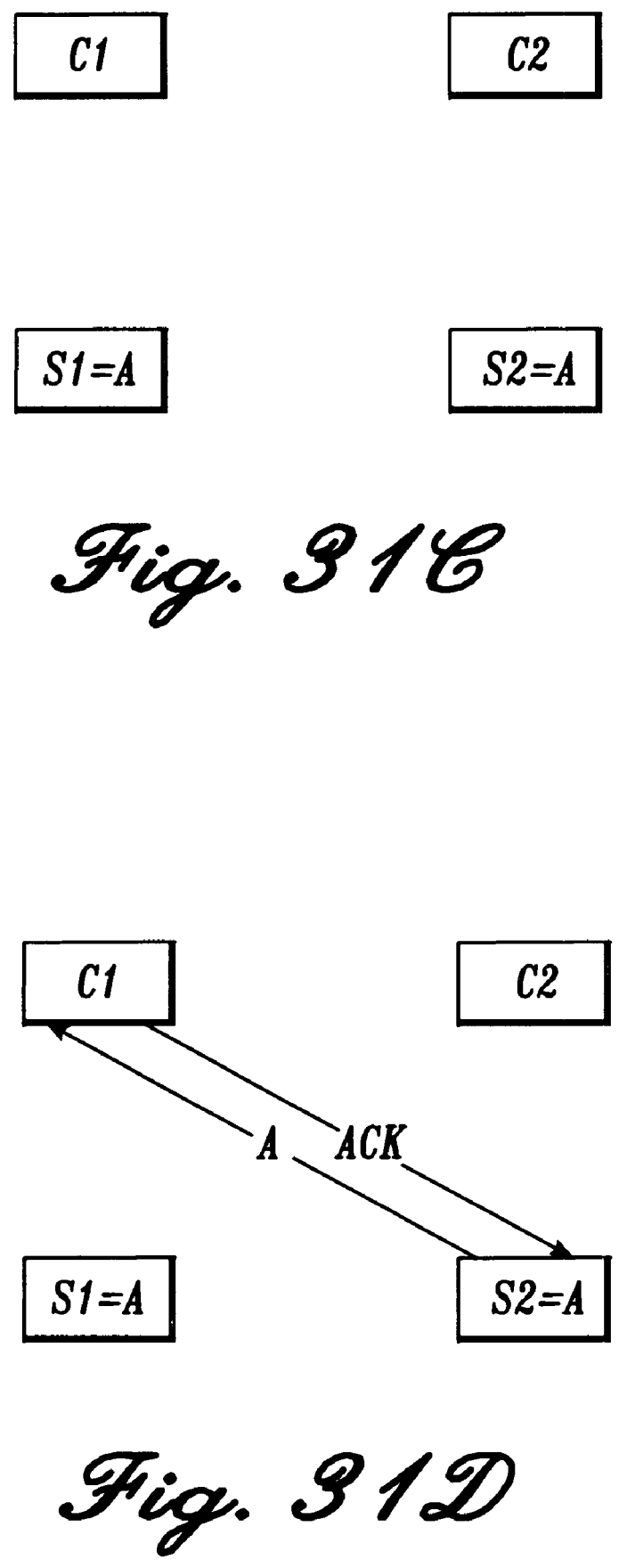

At this time, the slave unit S1 and the slave unit S2 each have the installation code A, as shown in FIG. 31C. The controller C1 will determine that the slave unit S1 is properly installed and, therefore, will turn on the associated installed LED. The controller C2 will determine that the installation of the slave unit S2 has failed. Accordingly, the installed LED on the controller C2 and associated with the slave unit S2 will remain off.

Because the installed LED associated with the slave unit S2 is off, the user U2 will realize that the installation of the slave unit S2 has failed. To verify that the installation has failed, the user U2 can depress the verify key on the slave unit S2. In response, the slave unit S2 will transmit the installation code to the controller identified by the installation code. Because the slave unit S2 received the installation code A, the controller C1 will receive the installation code sent by the slave unit S2, as shown in FIG. 31D. Upon receipt of the installation code A, the controller C1 will flash all of the LEDs associated with the slave unit S1. However, the user U1 will observe that all of the LEDs of the slave unit S1 are flashing, even though the verify button on the slave unit S1 was not depressed. Accordingly, the user U1 will determine that a slave unit other than the slave unit S1 has been installed with the installation code A.

Figure 31E:
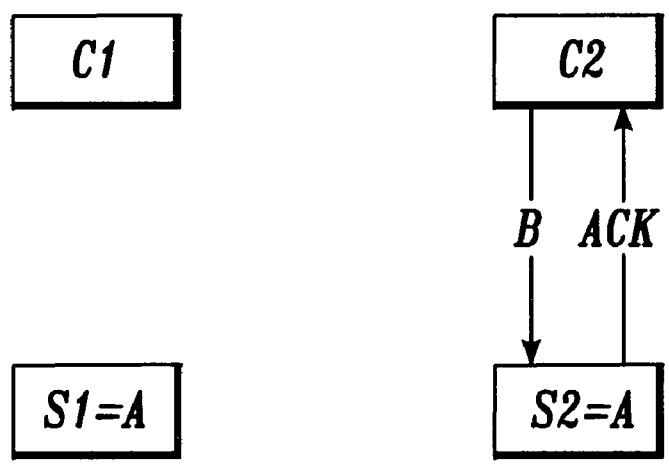
Figure 31F:
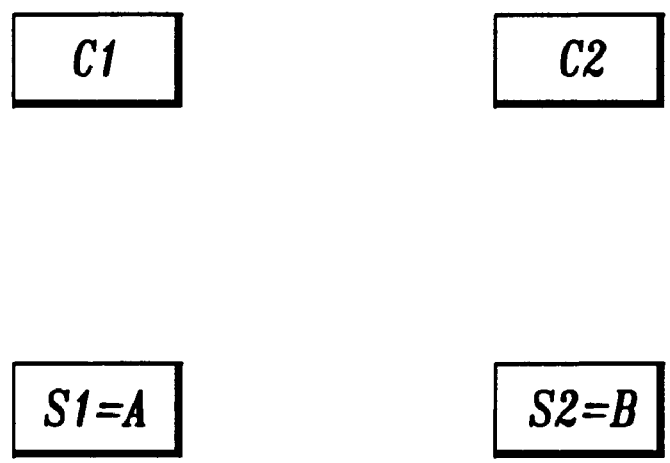

The user U2 will determine that none of the LEDs of the controller C2 flashed, indicating that the installation of the controller C2 has been verified. To promptly install the slave unit S3, the user U2 reinitiates the installation process for the slave unit S2 having the installation code B, as shown in FIG. 31E. The user U2 reinitiates the installation process by first causing the controller C2 to transmit the installation code B to the slave unit S2. Because only the controller C2, and not also the controller C1, is currently performing installation, no further collisions are possible. Upon receipt of the installation code B, the slave unit S2 transmits an acknowledgment signal to the controller C2. The controller C2 then turns on the installed LED on the controller C2 and associated with the slave unit S2. At this time, the slave unit S2 has an installation code B, as shown in FIG. 31F. The installed LED associated with the slave unit S2 is turned on, indicating that the installation has been properly performed. The innovative technique of the present invention employing CSMA/CD in this way allows the user of the LCS 50 to properly install each slave unit while overcoming the disadvantages associated with simultaneous installations and the related complications resulting from collisions.

Figures 32A, 32B:
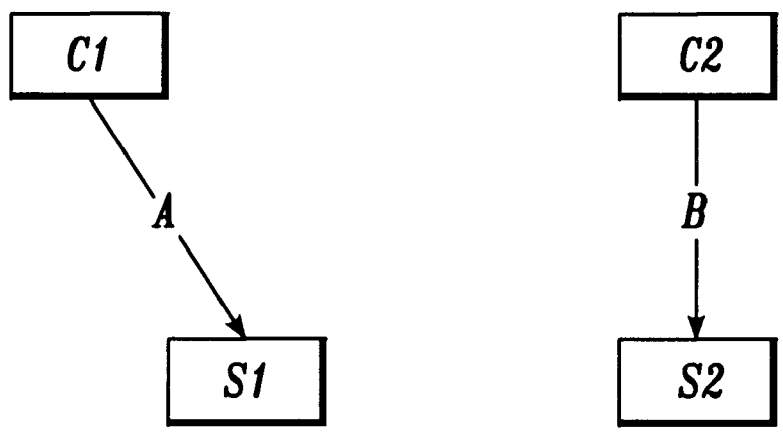
FIGS. 32A–D are block diagrams illustrating the operation of the LCS upon failing to detect a collision during installation.

The present invention enables the proper installation of slave units, even when a collision triggered by simultaneous installation is not detected by the controllers involved in the installations, as shown in FIGS. 32A–D. For example, as shown in FIG. 32A, assume that a controller designated C1, can only receive signals from a slave unit, designated S1, while a controller, designated C2, can receive signals from the slave unit S1 and a slave unit, designated S2. The controller C1 and the controller C2 cannot directly communicate with one another. The slave unit S1 can receive signals from the controller C1 and the controller C2. The slave unit S2 can receive signals only from the controller C2.

Figure 32C:
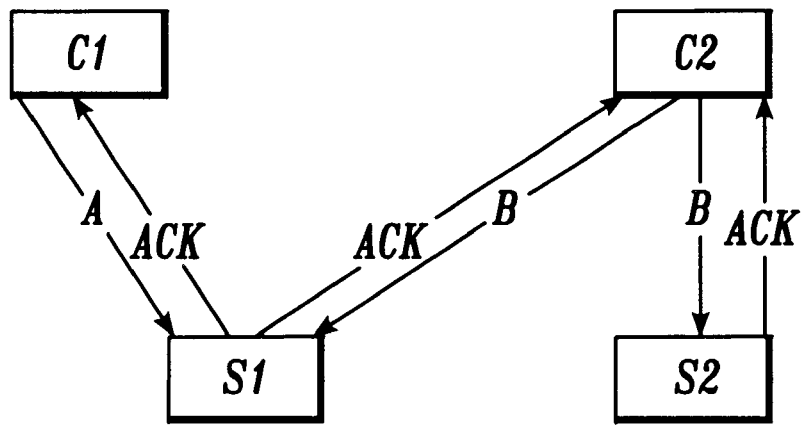

As shown in FIG. 32B, a user U1 seeks to install the slave unit S1 by using controller C1. The controller C1 is to assign the installation code A to the slave unit S1. A user U2 seeks to install the slave unit S2 by using the controller C2. The controller C2 is to assign the installation code B to the slave unit S2. As shown in FIG. 32C, the simultaneous installation of the slave unit S1 and the slave unit S2 causes a collision between the installation code A and the installation code B. However, the collision was not detected because the controller C1 and the controller C2 cannot receive signals from one another. As a result, the slave unit S2 receives the installation code B and subsequently transmits an acknowledgment signal to the controller C2. The slave unit S1 receives both the installation code A and the installation code B. Upon receipt of both the installation code A and the installation code B, the slave unit S1 returns an acknowledgment signal to both the controller C1 and the controller C2. Accordingly, both the controller C1 and the controller C2 determine that the installation was properly completed. Then, the installed LED associated with the slave unit S1 and the slave unit S2 on the controller C1 and the controller C2, respectively, are turned on.

Figure 32D:
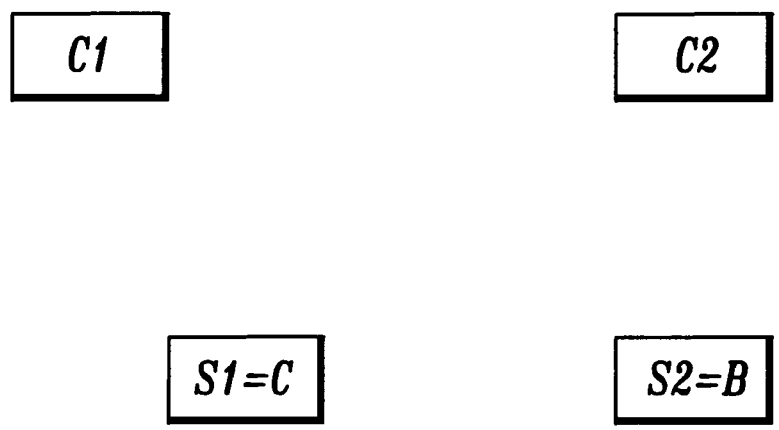

After installation, the slave unit S1 is installed with the installation code A and the installation code B, as shown in FIG. 32D. The slave unit S2 is installed with the installation code B. To verify the proper installation of the slave unit S1 and the slave unit S2, the user U2 presses the verify button on the slave unit S2. In response, all of the LEDs associated with the slave unit S2 and on the controller C2 flash for three seconds. The user U1 also depresses the verify button on the slave unit S1. In response, none of the LEDs on the controller C1 flashes. Accordingly, the user U1 will realize that the slave unit S1 was improperly installed, even though the installed LED associated with the slave unit S1 and on the controller C1 is on. Therefore, the user U1 is notified that the installation of the slave unit S1 has failed. Reinstallation of the slave unit S1 with the installation code A is required.

While the preferred embodiment of the invention has been illustrated and described, it will be appreciated that various changes can be made therein without departing from the spirit and scope of the invention. For example, an alternative embodiment of the present invention includes the use of a suitably-programmed personal computer 3302 to control the LCS 50 in accordance with the present invention. The personal computer 3302 communicates with the powerline through a powerline LAN box 3304. The powerline LAN box 3304 is described in the aforementioned U.S. patent application Ser. No. 08/511,210. The powerline LAN box 3304 communicates with the personal computer 3302 over an RS-232 communications link.

The personal computer 3302 includes a graphical user interface that allows the user, upon entry of the appropriate input to the personal computer 3302, to perform any of the functions available to the user by the master controller 100, the zone controllers 110, the IR controller 160, and the slave units 120. For example, the user could control the operation of any of the slave units through the personal computer 3302. As another example, the user could use the graphical user interface to provide any number of configurations for various slave units 120. Once the configurations are programmed at the personal computer 3302 by the user, the download button of the 348 of the master controller 100 can be depressed, enabling the master controller 100 to receive the configuration information from the personal computer 3302. The personal computer 3302 also provides real-time status monitoring of the LCS 50. In this regard, the personal computer 3302 displays to the user of the personal computer 3302 the current function and status of all of the modules of the LCS 50. The personal computer 3302 is programmed to receive a password from the user to provide security during the use of the LCS 50. The password must be entered by the user and verified by the personal computer 3302 before any of the aforementioned features can be activated by the user. During use of the personal computer 3302 to control the modules, the modules will not operate until the appropriate password is received. Furthermore, if the user wishes to operate the master controller 100, the user must first provide the password to the personal computer 3302. Otherwise, the master controller 100 will deny access to the user.

Figure 34:
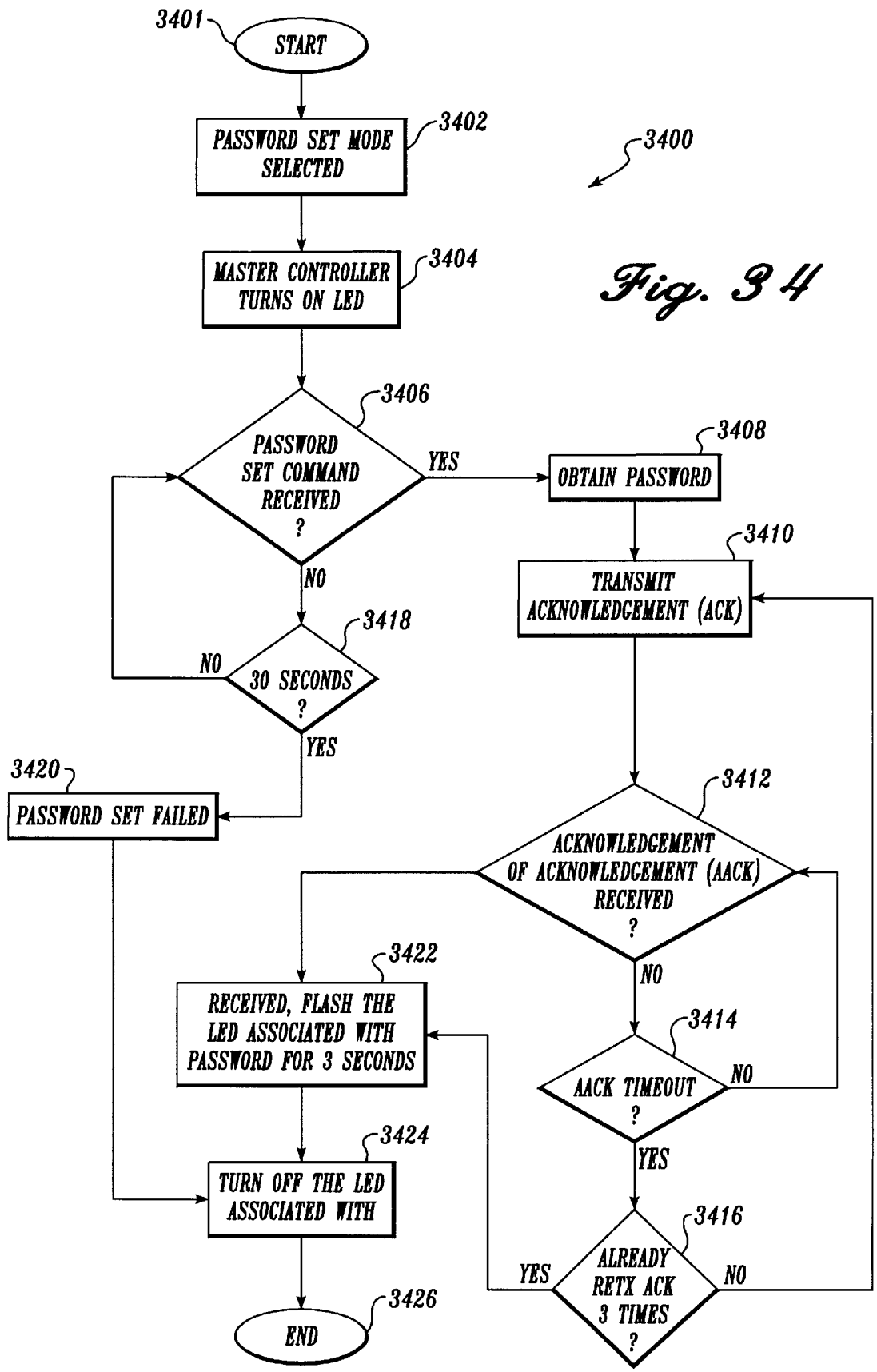
FIG. 34 is a flow diagram of a logic routine of the master controller to download a password to the master controller.

FIG. 34 illustrates a logic routine 3400 of the master controller to receive and set a password entered by the user at the personal computer 3302. The logic begins at a block 3401 and proceeds to a block 3402. At the block 3402, the master controller 100 receives a command to initiate the receipt of the password. The user initiates this process by depressing the set button 362. The logic then proceeds from the block 3402 to a block 3404. At the block 3404, the install LED 360 is turned on to indicate that the password setting process has been initiated and is in progress. The logic then proceeds from the block 3404 to a decision block 3406. At the decision block 3406, the logic determines if a password set command has been received. The password set command includes the password and the house code. The password set command is transmitted by an appropriate input to the personal computer 3302.

If the result of the decision block 3406 is positive, the logic proceeds from the decision block 3406 to the block 3408. At the block 3408, the master controller 100 receives the password as part of the password set command transmitted by the personal computer 3302. The password is stored in the EEROM of the master controller. The logic then proceeds from the block 3408 to a block 3410. At the block 3410, the master controller 100 transmits an acknowledgment signal to the personal computer 3302. The logic then proceeds from the block 3410 to a decision block 3412. At the decision block 3412, the logic determines if the acknowledgment of the acknowledgment signal sent by the personal computer 3302 has been received by the master controller 100. If the result of the decision block 3412 is positive, the logic proceeds to a block 3422. At the block 3422, the install LED 360 is flashed for three seconds, indicating that the master controller 100 has properly received its password. The logic then proceeds from the block 3422 to a block 3424. At the block 3424, the install LED 360 is turned off. The logic then proceeds from the block 3424 to a block 3426, where the logic ends.

If the result of the decision block 3406 is negative, the logic proceeds to a decision block 3418. At the decision block 3418, the logic determines if password set command has been transmitted within 30 seconds of the time that the user initiated the password setting process at the block 3402. If the result at the decision block 3418 is negative, the logic proceeds to the decision block 3406. If the result of the decision block 3418 is positive, the logic proceeds to a block 3420. At the block 3420, the logic determines that the password was not received, because the password set command was not sent within the allotted time. The logic proceeds to the block 3424.

If the result at the decision block 3412 is negative, the logic proceeds to a decision block 3414. At the decision block 3414, the master controller 100 determines whether a predetermined time interval after the transmission of the acknowledgment signal at the block 3410 has elapsed before the acknowledgment of the acknowledgment signal has been sent by the personal computer 3302. If the result at the decision block 3414 is negative, the logic proceeds to the decision block 3412. If the result of the decision block 3414 is positive, the logic proceeds to a decision block 3416. At the decision block 3416, the logic determines if the acknowledgment signal has already been transmitted to the personal computer 3302 three times. If the result at the decision block 3416 is negative, the logic proceeds to the block 3410. If the result at the decision block 3416 is positive, the logic proceeds to the block 3422. The graphical user interface of the personal computer 3302, through a pop-up window, preferably indicates to the user if the password has been properly or improperly set.

Figure 35:
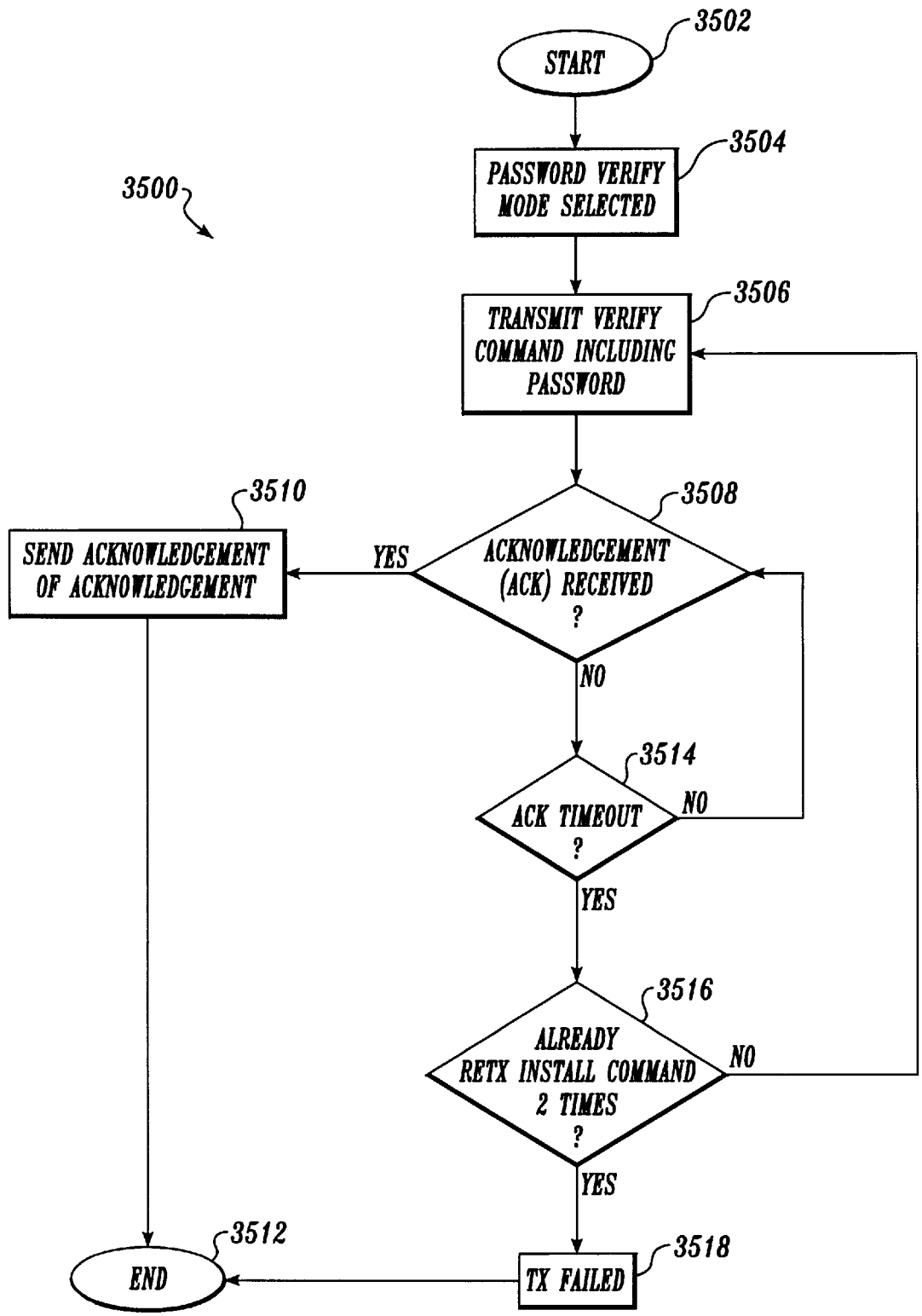
FIG. 35 is a flow diagram of a logic routine of the master controller to verify the receipt of the password.

FIG. 35 illustrates a logic routine 3500 of a master controller 100 during a verification process to confirm that the password was properly received. The logic begins at a block 3502, and proceeds to a block 3504. At the block 3504, the user initiates the verification process by an appropriate verify command to the master controller 100. The user applies the verify command by depressing the verify button 364. The verify command activates the verification process in the master controller 100. The logic proceeds from the block 3504 to a block 3506. At the block 3506, the master controller 100 transmits the verify command to the personal computer 3302. The verify command includes the password. The logic proceeds from the block 3506 to a decision block 3508. Upon receipt of the verify command, the personal computer 3302 will transmit an acknowledgment signal back to the master controller 100. At the decision block 3508, the logic determines if the acknowledgment signal transmitted by the personal computer 3302 has been received. If the result of the decision block 3508 is positive, the logic proceeds to a block 3510. At the block 3510, the logic sends an acknowledgment of the acknowledgment signal to the personal computer 3302. The logic proceeds from the block 3510 to a block 3512, where the logic ends.

If the result at the decision block 3508 is negative, the logic proceeds to a decision block 3514. At the decision block 3514, the logic determines if a predetermined time interval has elapsed from the time the verification process is initiated at the block 3504 to when the acknowledgment is received by the master controller from the personal computer 3302. If the result of the decision block 3514 is negative, the logic proceeds to the decision block 3508. If the result at the decision block 3514 is positive, the logic proceeds to a decision block 3516. At the decision block 3516, the logic determines if the master controller 100 has transmitted the verify command two times. If the result of the decision block 3516 is negative, the logic proceeds to the block 3506. If the result of the decision block 3516 is positive, the logic proceeds to a block 3518. At the block 3518, the logic determines that the verification of the password failed. The logic then proceeds from the block 3518 to the block 3512. The graphical user interface of the personal computer 3302, through a pop-up window, preferably indicates to the user if the password has been properly or improperly verified. Within the scope of the appended claims, it is to be understood that the invention can be practiced otherwise than as specifically described herein.

The embodiments of the invention in which an exclusive property or privilege is claimed are defined as follows:

1. A control system for controlling appliances in an environment having a plurality of zones comprising:
   at least one slave unit, each of the at least one slave units linked with a corresponding appliance to control the appliance, the at least one slave unit sending and receiving information over a transmission medium, each of the at least one slave units associated with one of the plurality of zones; and
   a central control system, communicatively coupled to the at least one slave unit, for sending and receiving information to and from the at least one slave unit over the transmission medium to remotely control the at least one slave unit, wherein the information includes an install command provided by the central control system to the at least one slave unit to communicatively configure and link the central control system with the at least one slave unit, the install command including a code identifying the at least one slave unit.

2. The control system of claim 1, wherein the at least one slave unit provides first acknowledgment signal to the central control system upon receipt of the install command.

3. The control system of claim 1, wherein the central control system provides a second acknowledgment signal to the at least one slave unit upon receipt of the first acknowledgment signal.

4. The control system of claim 3, wherein the central control system includes a zone controller corresponding with an associated zone of the plurality of zones, the zone controller controlling each of the at least one slave units of the associated zone.

5. The control system of claim 4, wherein the zone controller includes:
   means for comparing;
   a dawn and dusk sensor, coupled to the means for comparing, sensing light in the associated zone and providing a measured signal related to the magnitude of the light, the measured signal applied to the means for comparing to compare the measured signal with a threshold value related to a predetermined level of illumination to identify dawn and dusk.

6. The control system of claim 5, wherein the means for comparing includes a processor, the zone controller further comprising:
   an analog-to-digital converter, coupled to the dawn and dusk sensor and the processor, the dawn and dusk sensor providing the measured signal to the analog-to-digital converter to produce a digital value of the measured signal, the analog-to-digital converter providing the digital value of the measured signal to the processor; and
   a memory, coupled to the processor, storing the threshold value and providing the threshold value to the processor, the processor comparing the digital value of the measured signal to the threshold value to identify dusk and dawn.

7. The control system of claim 6, wherein the dawn and dusk sensor includes a photoresistor.

8. The control system of claim 4, wherein the zone controller includes a dawn and dusk sensor, the dawn and dusk sensor having:
   a comparator having a first input and a second input; a photoresistor, connected with the first input, for sensing light in the zone and producing a measured voltage related to the light detected in the associated zone at the first input; and
   a resistor, connected to the second input, producing a threshold voltage at the second input, the comparator comparing the measured voltage with the threshold voltage to identify dawn and dusk.

9. The control system of claim 8, wherein the resistor is variable.

10. The control system of claim 3, wherein the central control system includes a master controller, the master controller controlling all of the at least one slave units in the plurality of zones.

11. The control system of claim 10, wherein the central control system further includes at least one zone controller communicatively coupled with the master controller over the transmission medium, each of the at least one zone controllers corresponding to an associated zone and controlling the at least one slave unit of the associated zone.

12. The control system of claim 1, wherein the at least one slave unit includes a user interface for controlling the at least one slave unit, the user interface including an input device for commanding the at least one slave unit to receive the install command when the input device is suitably commanded.

13. The control system of claim 12, wherein the input device is an install button.

14. The control system of claim 1, wherein the central control system includes a zone controller corresponding with an associated zone the zone controller controlling the at least one slave unit of the associated zone.

15. The control system of claim 1, wherein the central control system includes a user interface for controlling the central control system, the user interface including an input device for commanding the central control system to provide the install command when the input device is suitably commanded.

16. The control system of claim 15, wherein the input device is an install button.

17. The control system of claim 16, wherein the at least one slave unit includes a user interface for controlling the at least one slave unit, the user interface of the at least one slave unit including an input device for commanding the at least one slave unit to receive the install command when the input device of the at least one slave unit is suitably commanded.

18. The control system of claim 17, wherein the input device is an install button.

19. The control system of claim 15, further comprising an IR controller, the central control system including an IR receiver, the IR controller for transmitting infrared commands to the IR receiver to remotely control the central control system.

20. The control system of claim 19, wherein the IR controller includes a user interface for controlling the IR controller, the user interface of the IR controller including an input device for commanding the central control system to provide the install command when the input device is suitably commanded.

21. The control system of claim 20, wherein the input device is an install button.

22. The control system of claim 14, wherein the central control system includes a master controller, the master controller controlling all of the at least one slave units in the plurality of zones.

23. A control system in an environment having a plurality of zones comprising:
a plurality of slave units each linked with a corresponding appliance to control the appliance, the plurality of slave units each sending and receiving information over a transmission medium, the plurality of slave units representing at least two kinds of slave units, the at least two kinds including a first kind and a second kind, the first kind of slave unit having multiple operating levels, the second kind of slave unit having a single operating level, the plurality of slave units each associated with one of the plurality of zones; and
a central control system, communicatively coupled to the first kind of slave unit and the second kind of slave unit, for sending and receiving information to and from each slave unit of the first kind and the second kind over the transmission medium, the central control system including a user interface having an input device for controlling the central control system and controlling the operating levels of the first kind of slave unit and the second kind of slave unit.

24. The control system of claim 23, wherein the input device includes means for incrementally increasing and decreasing the operating level of the first kind of slave unit.

25. The control system of claim 23, wherein the central control system includes a zone controller corresponding with an associated zone of the plurality of zones, the zone controller controlling the slave units of the zone.

26. The control system of claim 25, wherein the central control system includes a master controller, the master controller controlling the plurality of slave units in the plurality of zones.

27. The control system of claim 23, wherein the central control system includes a master controller, the master controller controlling the plurality of slave units in the plurality of zones.

28. The control system of claim 27, wherein the master controller includes a sliding switch for selecting a particular zone of the plurality of zones, the master controller controlling the operating levels of the slave units of the particular zone selected by the sliding switch.

29. A control system, having communicatively linked modules for controlling appliances in an environment having a plurality of zones, and installing the modules and verifying installation of the modules, the control system comprising:
at least one slave unit, linked with a corresponding appliance for controlling the appliance, sending and receiving information over a transmission medium, each of the at least one slave units associated with one of the plurality of zones; and
a central control system, communicatively coupled to the at least one slave unit, for sending and receiving information to and from the at least one slave unit over the transmission medium to remotely control the at least one slave unit, the information including a verify command provided by the at least one slave unit to the central control system to verify that the at least one slave unit is properly installed with the central control system, the verify command including a code identifying the at least one slave unit.

30. The control system of claim 29, wherein the central control system provides a first acknowledgment signal to the at least one slave unit upon receipt of the verify command.

31. The control system of claim 30, wherein the at least one slave unit provides a second acknowledgment signal to the central control system upon receipt of the first acknowledgment signal.

32. The control system of claim 29, wherein the central control system includes a master controller, the master controller controlling all of the at least one slave units in the plurality of zones.

33. The control system of claim 29, wherein the at least one slave unit includes a user interface for controlling the at least one slave unit, the user interface including an input device for commanding the at least one slave unit to transmit the verify command when the input device is suitably commanded.

34. The control system of claim 33, wherein the input device is a verify button.

35. The control system of claim 29, further comprising an IR controller communicatively coupled with the at least one slave unit, the at least one slave unit including an IR receiver, the IR controller for transmitting infrared commands to the IR receiver to remotely control the at least one slave unit.

36. The control system of claim 35, wherein the IR controller includes a user interface for controlling the IR controller, the user interface including an input device for commanding the at least one slave unit to transmit the verify command when the input device is suitably commanded.

37. A control system for controlling appliances in an environment having a plurality of zones comprising:

a plurality of slave units, each of the plurality of slave units linked with a corresponding appliance to control the appliance, for sending and receiving information over a transmission medium, the plurality of slave units each having at least one operating level; and a central control system, communicatively coupled to the plurality of slave units, for sending and receiving information to and from the plurality of slave units over the transmission medium to remotely control the plurality of slave units, the central control system monitoring the at least one operating level of the plurality of slave units, wherein the information includes a check command provided by the central control system to the plurality of slave units, the check command prompting each of the plurality of slave units to provide an indication of its operating level back to the central control system.

38. The control system of claim 37, wherein the central control system includes a memory for storing a configuration of the operating levels of the plurality of slave units at a predetermined time.

39. The control system of claim 38, wherein the central control system includes a user interface for controlling the central control system, the user interface including an input device for commanding the central control system to recall the configuration from the memory, the central control system causing the plurality of slave units to attain the operating levels associated with the configuration when the input device is suitably commanded.

40. The control system of claim 39, wherein the input device is a configuration button.

41. The control system of claim 38, wherein the central control system includes a user interface for controlling the central control system, the user interface including an input device for commanding the central control system to store the configuration into the memory.

42. The control system of claim 41, wherein the input device is a configuration button.

43. The control system of claim 37, wherein the central control system includes a user interface for displaying the operating level of the plurality of the slave units.

44. The control system of claim 43, wherein the user interface includes LEDs.

45. A control system for controlling appliances in an environment having a plurality of zones, each of the appliances linked to and controlled by a slave unit associated with one of the plurality of zones, the control system comprising:

a zone controller corresponding with an associated zone of the plurality of zones, the zone controller controlling the slave units of the zone, and sending and receiving information over a transmission medium; and a master controller, communicatively coupled with the zone controller, sending and receiving information to and from the zone controller over the transmission medium to remotely control the zone controller, the information including an install command provided by the master controller to the zone controller to communicatively configure and link the zone controller to the master controller, the install command including a code identifying the zone controller.

46. The control system of claim 45, wherein the zone controller provides a first acknowledgment signal to the master controller upon receipt of the install command.

47. The control system of claim 46, wherein the master controller provides a second acknowledgment signal to the zone controller upon receipt of the first acknowledgment signal.

48. A control system, having communicatively linked modules for controlling appliances in an environment having a plurality of zones, and installing the modules and verifying installation of the modules, the control system comprising:

a zone controller corresponding with an associated zone of the plurality of zones, the zone controller controlling the slave units of the zone, and sending and receiving information over a transmission medium; and a master controller, communicatively coupled with the zone controller, sending and receiving information to and from the zone controller over the transmission medium to remotely control the zone controller, the information including a verify command provided by the zone controller to the master controller to verify that the zone controller is properly installed with the master controller, the verify command including a code identifying the zone controller.

49. The control system of claim 48, wherein the master controller provides a first acknowledgment signal to the zone controller upon receipt of the verify command.

50. The control system of claim 49, wherein the zone controller provides a second acknowledgment signal to the master controller upon receipt of the first acknowledgment signal.

* * * * *

UNITED STATES PATENT AND TRADEMARK OFFICE
CERTIFICATE OF CORRECTION

PATENT NO. : 5,962,992
DATED : October 5, 1999
INVENTOR(S) : S.-W. Huang et al.

It is certified that error appears in the above-identified patent and that said Letters Patent is hereby corrected as shown below:

| COLUMN | LINE | |
|---|---|---|
| 39 (Claim 14, | 18 line 3) | after "zone" insert --,--. |

Signed and Sealed this

Tenth Day of October, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO. : 5,962,992
DATED : October 5, 1999
INVENTOR(S) : S.-W. Huang et al.

It is certified that error appears in the above-identified patent and that said Letters Patent is hereby corrected as shown below:

| COLUMN | LINE | | |
|---|---|---|---|
| [73] Pg. 1, col. 1 | Assignee | "Chaw Khong Co. Ltd." should read --Chaw Khong Technology Co. Ltd.-- | |

Signed and Sealed this

Second Day of January, 2001

Attest:

Attesting Officer

Q. TODD DICKINSON

Commissioner of Patents and Trademarks